US010597072B2

(12) United States Patent
Tsubaki et al.

(10) Patent No.: US 10,597,072 B2
(45) Date of Patent: Mar. 24, 2020

(54) ELECTRIC POWER STEERING APPARATUS

(71) Applicant: NSK Ltd., Tokyo (JP)

(72) Inventors: Takahiro Tsubaki, Maebashi (JP); Tomoyuki Kikuta, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 16/326,065

(22) PCT Filed: Nov. 9, 2017

(86) PCT No.: PCT/JP2017/040350
§ 371 (c)(1),
(2) Date: Feb. 15, 2019

(87) PCT Pub. No.: WO2018/088456
PCT Pub. Date: May 17, 2018

(65) Prior Publication Data
US 2019/0263446 A1 Aug. 29, 2019

(30) Foreign Application Priority Data

Nov. 11, 2016 (JP) .................. 2016-220700
Nov. 11, 2016 (JP) .................. 2016-220703
(Continued)

(51) Int. Cl.
B62D 6/00 (2006.01)
B62D 1/28 (2006.01)
(Continued)

(52) U.S. Cl.
CPC .............. *B62D 6/00* (2013.01); *B62D 1/286* (2013.01); *B62D 5/0463* (2013.01); *B62D 6/007* (2013.01);
(Continued)

(58) Field of Classification Search
USPC ......................................................... 701/41
See application file for complete search history.

(56) References Cited

U.S. PATENT DOCUMENTS 9,327,761 B2 * 5/2016 Tsubaki .............. B62D 5/0472
10,351,168 B2 * 7/2019 Tsubaki .................. B62D 6/00
(Continued)

FOREIGN PATENT DOCUMENTS

JP 2001-039325 A 2/2001
JP 2001-074571 A 3/2001
(Continued)

OTHER PUBLICATIONS

International Preliminary Report on Patentability of PCT/JP2017/040350 dated Nov. 7, 2018.
(Continued)

*Primary Examiner* — Tyler D Paige
(74) *Attorney, Agent, or Firm* — Sughrue Mion, PLLC

(57) ABSTRACT

[Problem]
An object of the present invention is to provide an electric power steering apparatus that achieves manual steering even if steering intervention is performed by a driver during automatic steering, ensures more safety when the driver steers urgently, and enables both assist control and steering angle control.
[Means for solving the problem]
An electric power steering apparatus comprises a steering angle control section that calculates a steering angle control current command value for steering angle control based on at least a steering angle command value and an actual steering angle, and a switch judging and gradual-change gain generating section that judges a steering state based on manual input judgment and performs switching of the steering state; the switch judging and gradual-change gain generating section comprises a manual input judging section
(Continued)

that performs the manual input judgment by using a threshold to a steering torque; and the electric power steering apparatus calculates a current command value by using at least the steering angle control current command value.

40 Claims, 33 Drawing Sheets

(30) Foreign Application Priority Data

Nov. 14, 2016 (JP) .................................. 2016-221782
Nov. 14, 2016 (JP) .................................. 2016-221783

(51) Int. Cl.
*B62D 15/02* (2006.01)
*B62D 5/04* (2006.01)
*B62D 6/02* (2006.01)

(52) U.S. Cl.
CPC ......... *B62D 15/024* (2013.01); *B62D 15/025* (2013.01); *B62D 6/02* (2013.01)

(56) References Cited

U.S. PATENT DOCUMENTS

| | | |
|---|---|---|
| 2001/0054519 A1 | 12/2001 | Nishiwaki et al. |
| 2011/0098890 A1 | 4/2011 | Lee et al. |
| 2013/0041557 A1* | 2/2013 | Endo ...................... B62D 6/002 701/42 |
| 2013/0261894 A1* | 10/2013 | Kojima ................ B62D 5/0463 701/41 |
| 2015/0191199 A1 | 7/2015 | Tsubaki et al. |
| 2015/0191200 A1 | 7/2015 | Tsubaki et al. |
| 2016/0001810 A1* | 1/2016 | Tsubaki ................ B62D 5/0472 701/42 |
| 2019/0039647 A1* | 2/2019 | Tsubaki ................... B62D 6/00 |
| 2019/0193782 A1* | 6/2019 | Tsubaki ................. B62D 1/286 |
| 2019/0225260 A1* | 7/2019 | Tsubaki ............. B62D 15/0235 |

FOREIGN PATENT DOCUMENTS

| | | |
|---|---|---|
| JP | 2002-002519 A | 1/2002 |
| JP | 2004-017881 A | 1/2004 |
| JP | 3912279 B2 | 5/2007 |
| JP | 3917008 B2 | 5/2007 |
| JP | 2015-020604 A | 2/2015 |
| WO | 2014/136515 A1 | 9/2014 |
| WO | 2014/162769 A1 | 10/2014 |

OTHER PUBLICATIONS

International Search Report of PCT/JP2017/040350 dated Jan. 30, 2018.

* cited by examiner

PRIOR ART

ELECTRIC POWER STEERING APPARATUS

CROSS REFERENCE TO RELATED APPLICATIONS

This application is a National Stage of International Application No. PCT/JP2017/040350 filed Nov. 9, 2017, claiming priority based on Japanese Patent Application No. 2016-220700 filed Nov. 11, 2016, Japanese Patent Application No. 2016-220703 filed Nov. 11, 2016, Japanese Patent Application No. 2016-221782 filed Nov. 14, 2016, and Japanese Patent Application No. 2016-221783 filed Nov. 14, 2016.

TECHNICAL FIELD

The present invention relates to an electric power steering apparatus that enables automatic steering by performing assist control and steering angle control to a steering system by driving and controlling a motor based on a current command value, and in particular to an electric power steering apparatus that enables safety and reduction of uncomfortable feeling even if steering intervention is performed by a driver during the automatic steering.

BACKGROUND ART

An electric power steering apparatus (EPS) which provides a steering system of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism, and performs assist control. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears (worm gears) 3 constituting the reduction mechanism, universal joints 4a and 4b, a rack-and-pinion mechanism 5, and tie rods 6a and 6b, further via hub units 7a and 7b. In addition, a torsion bar is inserted into the column shaft 2, for which a steering angle sensor 14 for detecting a steering angle θ of the steering wheel 1 by means of a twist angle of the torsion bar and a torque sensor 10 for detecting a steering torque Tt are provided, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist control command based on the steering torque Tt detected by the torque sensor 10 and a vehicle speed V detected by a vehicle speed sensor 12, and controls a current supplied to the motor 20 by means of a voltage control command value Vref obtained by performing compensation or the like to the current command value.

Moreover, the steering angle sensor 14 is not essential, it does not need to be provided, and it is possible to obtain the steering angle from a rotational angle sensor such as a resolver connected to the motor 20.

A controller area network (CAN) 40 exchanging various information of a vehicle is connected to the control unit 30, and it is possible to receive the vehicle speed V from the CAN 40. Further, it is also possible to connect a non-CAN 41 exchanging a communication, analog/digital signals, a radio wave or the like except with the CAN 40 to the control unit 30.

The control unit 30 mainly comprises a CPU (including an MPU, an MCU and so on), and general functions performed by programs within the CPU are shown in FIG. 2.

The control unit 30 will be described with reference to FIG. 2. As shown in FIG. 2, the steering torque Tt detected by the torque sensor 10 and the vehicle speed V detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 based on the inputted steering torque Tt and vehicle speed V and by using an assist map or the like. The current command value Iref1 is inputted into a current limiting section 33 through an adding section 32A. A current command value Irefm the maximum current of which is limited is inputted into a subtracting section 32B, and a deviation I (=Irefm−Im) between the current command value Irefm and a motor current Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed back to the subtracting section 32B. The inverter 37 is comprised of a bridge circuit of field effect transistors (FETs) as semiconductor switching elements.

A rotational angle sensor 21 such as a resolver is connected to the motor 20, and a rotational angle θ is detected and outputted by the rotational angle sensor 21.

Further, a compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34C and an inertia 34B at an adding section 34D, further adds the result of addition performed at the adding section 34D with a convergence 34A at an adding section 34E, and then outputs the result of addition performed at the adding section 34E as the compensation signal CM.

Research and development of automatic driving technique of a vehicle has been recently advanced, and proposals where an electric power steering apparatus (EPS) is applied to automatic steering included in the technique, have been made. In the case of achieving automatic steering by the EPS, the EPS has a mechanism for assist control performed by a conventional EPS and a mechanism for steering angle control of controlling a steering system so that a vehicle drives in a desired direction independently, and is generally configured so as to make outputs of these mechanisms possible to adjust. In the steering angle control, position and velocity control having superior performance of responsiveness to a steering angle command being a control target of a steering angle and a disturbance suppression characteristic to a road surface reaction force and so on, is used, for example, a proportional (P) control is adopted in position control, and a proportional integral (PI) control is adopted in velocity control.

In the case of performing the assist control and the steering angle control independently and performing the whole control by switching command values being outputs of both controls, switching them by a switch or the like suddenly may cause uncomfortable feeling to a driver because the command value is suddenly changed and behavior of a steering wheel becomes unnatural. In order to deal with this problem, in the case of switching between a torque control method (corresponding to the assist control) and a rotational angle control method (corresponding to the steering angle control), an apparatus disclosed in Japanese Unexamined Patent Publication No. 2004-17881 A (Patent Document 1) sets a value obtained by multiplying respective command values of both methods by coefficients (an automatic coefficient and a manual coefficient) and adding the multiplied results on a final command value, gradually changes these coefficients, and suppresses an abrupt change of the command value. The apparatus uses a P-control in position control of the rotational angle control method, and uses a PI-control in velocity control.

In the publication of Japanese Patent No. 3917008 B2 (Patent Document 2), an automatic steering control apparatus is proposed that automatically performs a steering wheel operation depending on a set steering angle and aims at parking assist in particular. This apparatus can switch between a torque control mode (corresponding to the assist control) and a parking assist mode (corresponding to the steering angle control), and performs the control by using prestored parking data in the parking assist mode. Further, the apparatus performs a P-control in position control of the parking assist mode, and performs a PI-control in velocity control.

The publication of Japanese Patent No. 3912279 B2 (Patent Document 3) does not directly apply the EPS, however, when an apparatus disclosed in Patent Document 3 starts steering angle control by switching a mode to an automatic steering mode, the apparatus reduces uncomfortable feeling to a driver caused by an abrupt change of a steering wheel at the start by gradually increasing a steering velocity (a steering angular velocity).

THE LIST OF PRIOR ART DOCUMENTS

Patent Documents

Patent Document 1: Japanese Unexamined Patent Publication No. 2004-17881 A
Patent Document 2: Japanese Patent No. 3917008 B2
Patent Document 3: Japanese Patent No. 3912279 B2

SUMMARY OF THE INVENTION

Problems to be Solved by the Invention

However, in Patent Document 1, since a command value for the steering angle control (a steering angle control command value) is limited by the coefficient and is outputted to the final command value while the method is switched, the final command value decreases by the limited amount. Since an actual velocity of a motor becomes slow because of this limitation compared with a command value for a steering angular velocity (a steering angular velocity command value) calculated by the steering angle control command value, a deviation occurs between the steering angular velocity command value and the actual velocity, an integral value of an integral (I) control in the velocity control accumulates, and a larger steering angle control command value is outputted from the velocity control. As a result, since the limitation by the coefficient is relaxed in the state where the coefficient by which a command value for the assist control (an assist control command value) is multiplied gradually increases, the steering angle control command value becomes an excessive value as the coefficient increases, a steering wheel reacts to the steering angular velocity command value excessively, and it may cause uncomfortable feeling such as catching feeling and unpleasantness to a driver.

Further, the apparatus disclosed in Patent Document 1 uses the P-control in the position control and the PI-control in the velocity control. When manual input of a driver intervenes in the steering angle control, the steering angle control operates so as to follow the steering angle control command value, and it is difficult to steer by hand until the switching from the steering angle control to the assist control is performed. Further, time delay occurs by detecting the manual input and switching, and the operation for steering intervention by a driver may not be performed sufficiently.

The apparatus disclosed in Patent Document 2 also performs the steering angle control by using the P-control in the position control and the PI-control in the velocity control. In the case of performing the steering angle control in a vehicle, a disturbance and a load state are significantly changed by a vehicle speed, friction, change of a road surface reaction force and so on, so that an apparatus must have a control configuration being resistant to them. However, in the control configuration of the apparatus described in Patent Document 2 alone, for example, in the case that the road surface reaction force changes, or in the case that a target steering angle changes rapidly, a vibration occurs by a natural vibration caused by a mass damper of a steering wheel and a spring of a torsion bar, and a driver may feel it as uncomfortable feeling or unpleasantness.

The apparatus disclosed in Patent Document 3 gradually increases a steering angular velocity at the start of the steering angle control, and since the steering angular velocity continues increasing until an upper limit after beginning to increase, an integral value of the I-control accumulates excessively. As a result, the steering angle control command value becomes an excessive value, a steering wheel reacts to the steering angular velocity command value excessively, and it may cause uncomfortable feeling to a driver.

The present invention has been developed in view of the above-described circumstances, and an object of the present invention is to provide an electric power steering apparatus that achieves manual steering even if steering intervention is performed by a driver during automatic steering, ensures more safety when the driver steers urgently, and enables both assist control and steering angle control. Further, the electric power steering apparatus reduces the uncomfortable feeling such as catching feeling and the unpleasantness to the driver when switching from the automatic steering to the manual steering.

Means for Solving the Problems

The present invention relates to an electric power steering apparatus that drives a motor based on a current command value, and performs assist control and steering angle control to a steering system by driving and controlling the motor, the above-described object of the present invention is achieved by that comprising: a steering angle control section that calculates a steering angle control current command value for the steering angle control based on at least a steering angle command value and an actual steering angle; and a switch judging and gradual-change gain generating section that judges a steering state based on manual input judgment and performs switching of the steering state; wherein the switch judging and gradual-change gain generating section comprises a manual input judging section that performs the manual input judgment by using a threshold to a steering torque; and wherein the electric power steering apparatus calculates the current command value by using at least the steering angle control current command value.

The above-described object of the present invention is more effectively achieved by that wherein the manual input judging section performs the manual input judgment by using the threshold to the steering torque that is smoothed by a smoothing filter; or wherein the manual input judging section uses a plurality of the thresholds to the steering torque, and has a plurality of judgment results as a judgment result indicating that manual input is performed; or wherein the manual input judging section has a plurality of smoothing filters that have a different characteristic, calculates a plurality of smoothed steering torques by smoothing the steering torque using the smoothing filters respectively, and performs the manual input judgment by using the threshold to the smoothed steering torques; or wherein the manual input judging section uses a plurality of the thresholds to at least one of the smoothed steering torques, and has a plurality of judgment results as a judgment result indicating that manual input is performed; or wherein the switch judging and gradual-change gain generating section comprises a steering state judging section that judges the steering state based on a switch signal for switching an operation mode to an assist control mode or a steering angle control mode, and a judgment result of the manual input judging section, and a gradual-change gain generating section that generates a gradual-change gain that adjusts a control amount of the assist control and a control amount of the steering angle control, depending on the steering state; or wherein the steering state judging section judges that the steering state is manual steering in a case that the switch signal is the assist control mode, or in a case that a previous steering state is first automatic steering or second automatic steering and the judgment result is that third level manual input is performed; or wherein the steering state judging section judges that the steering state is the first automatic steering in a case that the previous steering state is the manual steering or the second automatic steering, the switch signal is the steering angle control mode, and the judgment result is that manual input is not performed; or wherein the gradual-change gain generating section sets the gradual-change gain to a predetermined first gain value in the first automatic steering, sets the gradual-change gain to a predetermined second gain value in the manual steering, changes the gradual-change gain to the first gain value in a case that the steering state changes to the first automatic steering, and changes the gradual-change gain to the second gain value in a case that the steering state changes to the manual steering.

The above-described object of the present invention is achieved by that comprising: a steering angle control section that calculates a steering angle control current command value for the steering angle control based on at least a steering angle command value and an actual steering angle; and a switch judging and gradual-change gain generating section that judges a steering state based on manual input judgment and performs switching of the steering state; wherein the switch judging and gradual-change gain generating section comprises a manual input judging section that comprises a first judging section that performs the manual input judgment by using an error threshold to an error between an estimated steering angle which is estimated based on the steering angle command value and the actual steering angle; and wherein the electric power steering apparatus calculates the current command value by using at least the steering angle control current command value.

The above-described object of the present invention is more effectively achieved by that wherein the first judging section has a plurality of smoothing filters for an error that have a different characteristic, calculates a plurality of smoothed errors by smoothing the error using the smoothing filters for an error respectively, and performs the manual input judgment by using the error threshold to the smoothed errors; or wherein the first judging section uses a plurality of the error thresholds to at least one of the smoothed errors, and has a plurality of judgment results as a judgment result indicating that manual input is performed; or wherein the manual input judging section further comprises a second judging section that performs the manual input judgment by using a torque threshold to a steering torque; or wherein the second judging section has a plurality of smoothing filters for a torque that have a different characteristic, calculates a plurality of smoothed steering torques by smoothing the steering torque using the smoothing filters for a torque respectively, and performs the manual input judgment by using the torque threshold to the smoothed steering torques; or wherein the second judging section uses a plurality of the torque thresholds to at least one of the smoothed steering torques, and has a plurality of judgment results as a judgment result indicating that manual input is performed; or wherein the switch judging and gradual-change gain generating section comprises a steering state judging section that judges the steering state based on a switch signal for switching an operation mode to an assist control mode or a steering angle control mode, a first judgment result of the first judging section, and a second judgment result of the second judging section, and a gradual-change gain generating section that generates a gradual-change gain that adjusts a control amount of the assist control and a control amount of the steering angle control, depending on the steering state; or wherein the steering state judging section judges that the steering state is manual steering in a case that the switch signal is the assist control mode, or in a case that a previous steering state is first automatic steering or second automatic steering, and the first judgment result or the second judgment result is that third level manual input is performed; or wherein the steering state judging section judges that the steering state is the first automatic steering in a case that the previous steering state is the manual steering or the second automatic steering, the switch signal is the steering angle control mode, and the first judgment result and the second judgment result are that manual input is not performed; or wherein the gradual-change gain generating section sets the gradual-change gain to a predetermined first gain value in the first automatic steering, sets the gradual-change gain to a predetermined second gain value in the manual steering, changes the gradual-change gain to the first gain value in a case that the steering state changes to the first automatic steering, and changes the gradual-change gain to the second gain value in a case that the steering state changes to the manual steering; or wherein the gradual-change gain generating section generates a steering angle command gradual-change gain by which the steering angle command value is multiplied, and changes the steering angle command gradual-change gain to the second gain value in a case that the steering state is changed to the second automatic steering.

Effects of the Invention

The electric power steering apparatus of the present invention enables safety and reduction of uncomfortable feeling even if steering intervention is performed during automatic steering, and can switch from the automatic steering to the manual steering, in which the uncomfortable feeling is suppressed, because it performs the switch of the steering state by utilizing the manual input judgment.

MODE FOR CARRYING OUT THE INVENTION

An electric power steering apparatus (EPS) according to the present invention performs assist control being a function of a conventional EPS and steering angle control necessary to automatic steering in automatic driving. The assist control and the steering angle control are performed at an assist control section and a steering angle control section respectively, and the EPS calculates a current command value for driving and controlling a motor by using an assist control current command value and a steering angle control current command value outputted from respective sections. Both of the steering angle control and the assist control are performed in automatic steering (an automatic steering state), and the assist control is performed in manual steering (a manual steering state) when a driver takes part in steering. A switch between the automatic steering and the manual steering is generally performed by a switch signal from a control unit (ECU) or the like equipped with a vehicle. The present invention performs manual input judgment based on a steering torque and/or an error between an estimated steering angle and an actual steering angle, performs judgment of the switch between the automatic steering and the manual steering by also using a result of the manual input judgment, and performs the switching operation, so that the steering state is changed to the manual steering quickly and smoothly even if steering intervention is performed by a driver during the automatic steering. The switch judgment is performed at a switch judging and gradual-change gain generating section. In order to reduce uncomfortable feeling caused by the steering intervention during the automatic steering, the EPS can perform steering intervention compensation corresponding to the steering torque. Specifically, the EPS compensates a steering angular velocity command value by means of a compensation value (a compensatory steering angular velocity command value) obtained at a steering intervention compensating section.

Hereinafter, an embodiment of the present invention will be described with reference to the accompanying drawings.

First, a whole vehicle system including the electric power steering apparatus according to the present invention will be described.

Figure 3:
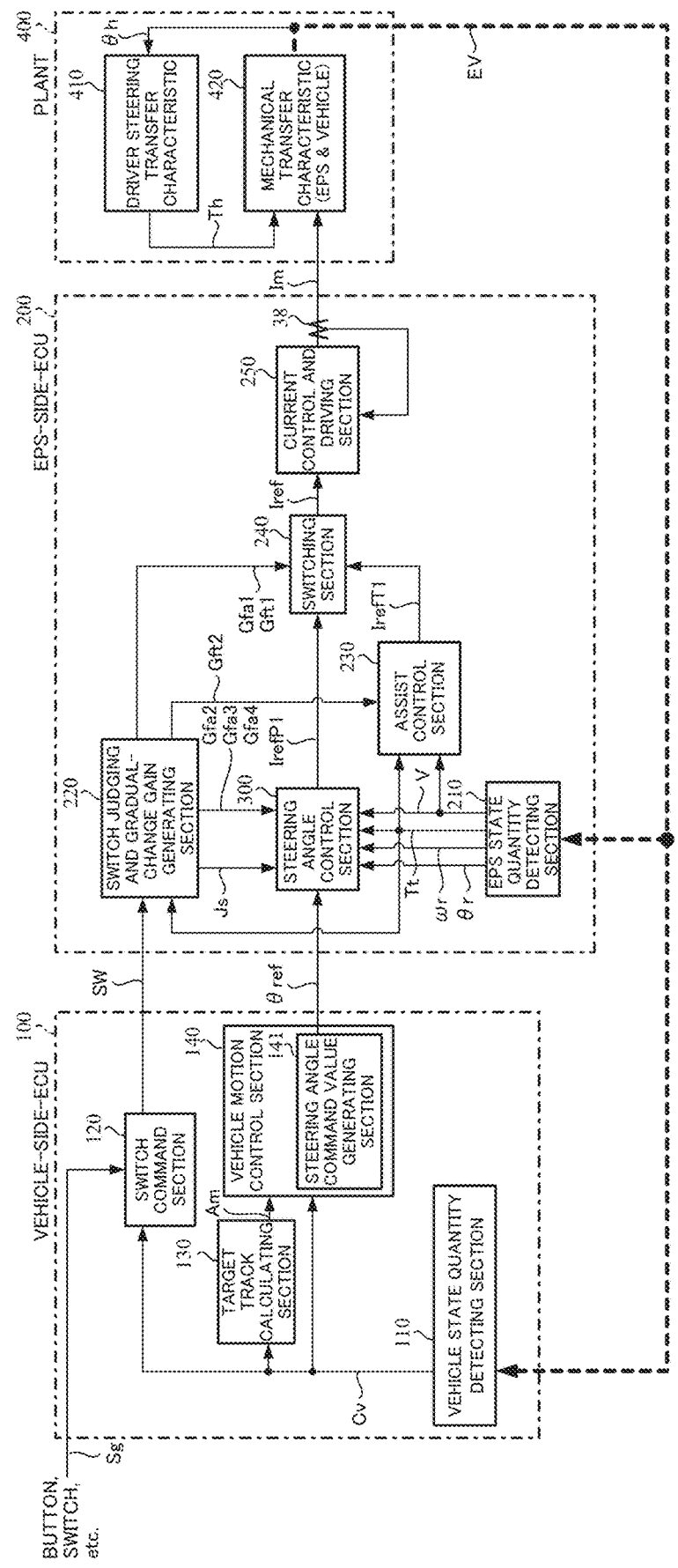
FIG. 3 is a block diagram showing a configuration example (a first embodiment) of a whole vehicle system relating to the present invention.

FIG. 3 shows a configuration example (a first embodiment) of the whole vehicle system relating to the present invention, which comprises an ECU equipped for a vehicle (hereinafter referred to a "vehicle-side-ECU") 100, an ECU equipped for the EPS (hereinafter referred to an "EPS-side-ECU") 200, and a plant 400.

The vehicle-side-ECU 100 comprises a vehicle state quantity detecting section 110, a switch command section 120, a target track calculating section 130 and a vehicle motion control section 140.

The vehicle state quantity detecting section 110 outputs data detected by an on-vehicle camera, a distance sensor, an angular velocity sensor, an acceleration sensor and so on as a vehicle state quantity Cv to the switch command section 120, the target track calculating section 130 and the vehicle motion control section 140.

The switch command section 120 inputs a signal Sg for switching an operation mode from a button, a switch or the like provided for a dashboard or the like with the vehicle state quantity Cv, and outputs a switch signal SW to the EPS-side-ECU 200. The operation mode has an "assist control mode" and a "steering angle control mode", the "assist control mode" is a mode corresponding to manual steering, and the "steering angle control mode" is a mode corresponding to automatic steering. The switch command section 120 determines the operation mode considering respective data included in the vehicle state quantity Cv based on the signal Sg which shows an intention of a driver, and outputs the determined operation mode as the switch signal SW.

The target track calculating section 130 calculates a target track Am by an existing method based on the vehicle state quantity Cv, and outputs it to the vehicle motion control section 140.

The vehicle motion control section 140 comprises a steering angle command value generating section 141. The steering angle command value generating section 141 generates a steering angle command value $\theta$ref being a control target value of a steering angle based on the target track Am and the vehicle state quantity Cv, and outputs it to the EPS-side-ECU 200.

The EPS-side-ECU 200 comprises an EPS state quantity detecting section 210, a switch judging and gradual-change gain generating section 220, a steering angle control section 300, an assist control section 230, a switching section 240, a current control and driving section 250 and a motor current detector 38.

The EPS state quantity detecting section 210 inputs signals from an angle sensor, a torque sensor and a speed sensor, and detects an EPS state quantity. Specifically, the angle sensor detects a steering wheel angle (an angle at an upper side of a torsion bar) $\theta$h as an actual steering angle $\theta$r, the torque sensor detects a steering torque Tt, and the speed sensor detects a vehicle speed V. The EPS state quantity detecting section 210 calculates an actual steering angular velocity $\omega$r by performing differential calculation to the actual steering angle $\theta$r. The actual steering angle $\theta$r and the actual steering angular velocity $\omega$r are inputted into the steering angle control section 300, the steering torque Tt is inputted into the switch judging and gradual-change gain generating section 220, the steering angle control section 300 and the assist control section 230, and the vehicle speed V is inputted into the steering angle control section 300 and the assist control section 230. Moreover, it is possible to use a column angle (an angle at a lower side of a torsion bar) as the actual steering angle θr, and also to use a rotational angle of a motor as the actual steering angle θr by comprising a motor angle sensor (a rotational angle sensor). Furthermore, the actual steering angle θr and the vehicle speed V may be detected at the vehicle-side-ECU 100, and may be sent to the EPS-side-ECU 200. The actual steering angular velocity ωr may be calculated by performing difference calculation with respect to the rotational angle detected by the motor angle sensor and using a gear ratio, or may be calculated by performing difference calculation with respect to the actual steering angle θr. It is possible to insert a low pass filter (LPF) at the final stage of the EPS state quantity detecting section 210 to reduce a high frequency noise, and in this case, it is possible to calculate the actual steering angular velocity ωr by a high pass filter (HPF) and a gain.

The switch judging and gradual-change gain generating section 220 performs switch judging between the automatic steering and the manual steering based on the switch signal SW from the vehicle-side-ECU 100 and the steering torque Tt, and determines gradual-change gains based on the judgment result. The switch judging and gradual-change gain generating section 220 obtains a steering angle control output gradual-change gain Gfa1, a velocity control gradual-change gain Gfa2, a velocity command gradual-change gain Gfa3, a steering angle command gradual-change gain Gfa4, an assist control output gradual-change gain Gft1 and an assist map gradual-change gain Gft2 as the gradual-change gain, the Gfa1 and the Gft1 are inputted into the switching section 240, the Gfa2, the Gfa3 and the Gfa4 is inputted into the steering angle control section 300, and the Gft2 is inputted into the assist control section 230. A judgment result of the switch judging is inputted as a steering state judgment signal Js into the steering angle control section 300. The detail of the switch judging and gradual-change gain generating section 220 will be described later.

The steering angle control section 300 calculates a steering angle control current command value IrefP1 by using the steering angle command value θref from the vehicle-side-ECU 100, the actual steering angle θr, the actual steering angular velocity ωr, the steering torque Tt, the vehicle speed V, the gradual-change gains Gfa2, Gfa3 and Gfa4, and the steering state judgment signal Js in order to perform the steering angle control. The steering angle control current command value IrefP1 is inputted into the switching section 240. Moreover, it is possible to calculate the actual steering angular velocity ωr not at the EPS state quantity detecting section 210 but at steering angle control section 300. The detail of the steering angle control section 300 will be described later.

Figure 1:
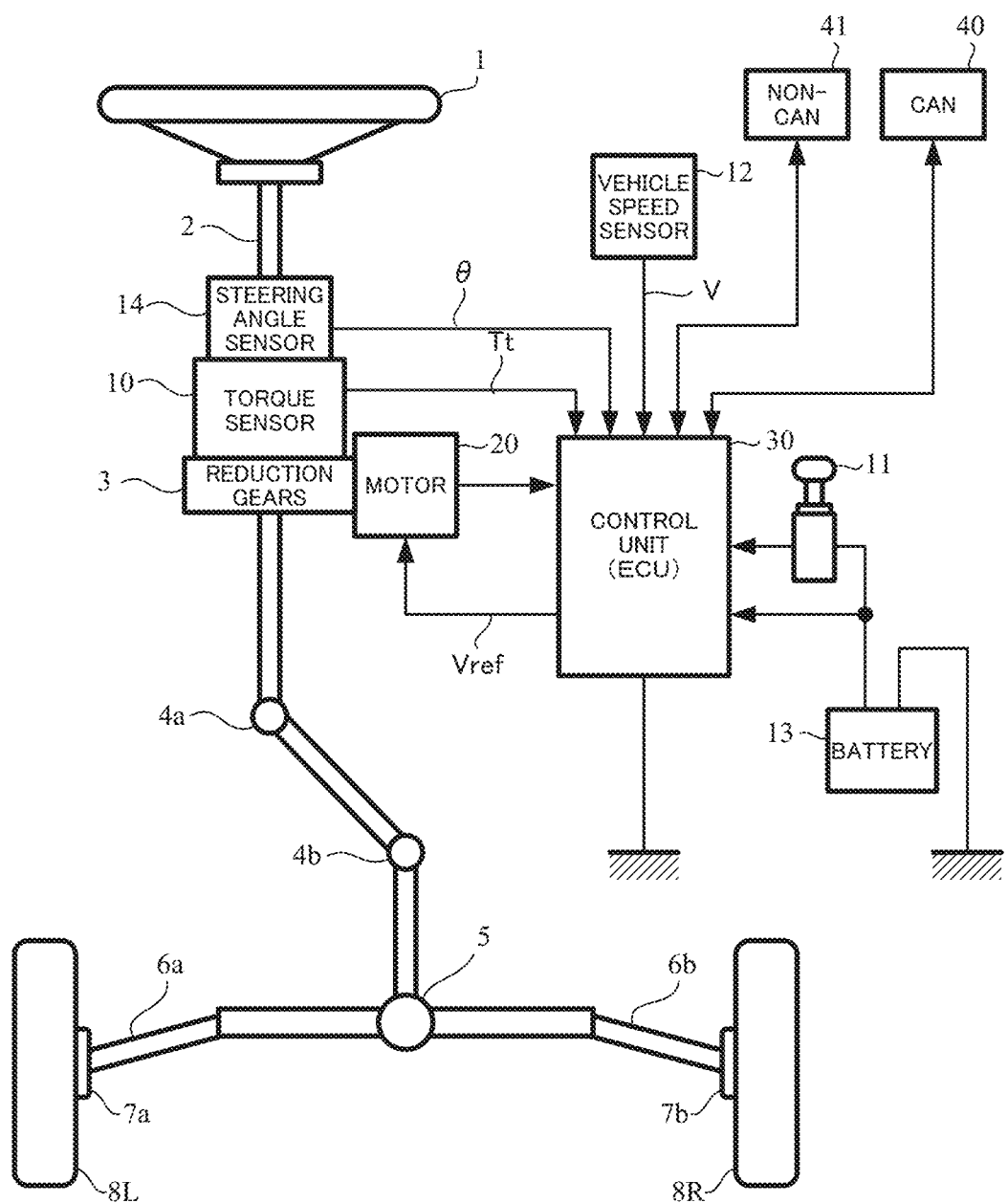
FIG. 1 is a configuration diagram illustrating a general outline of an electric power steering apparatus.
Figure 2:
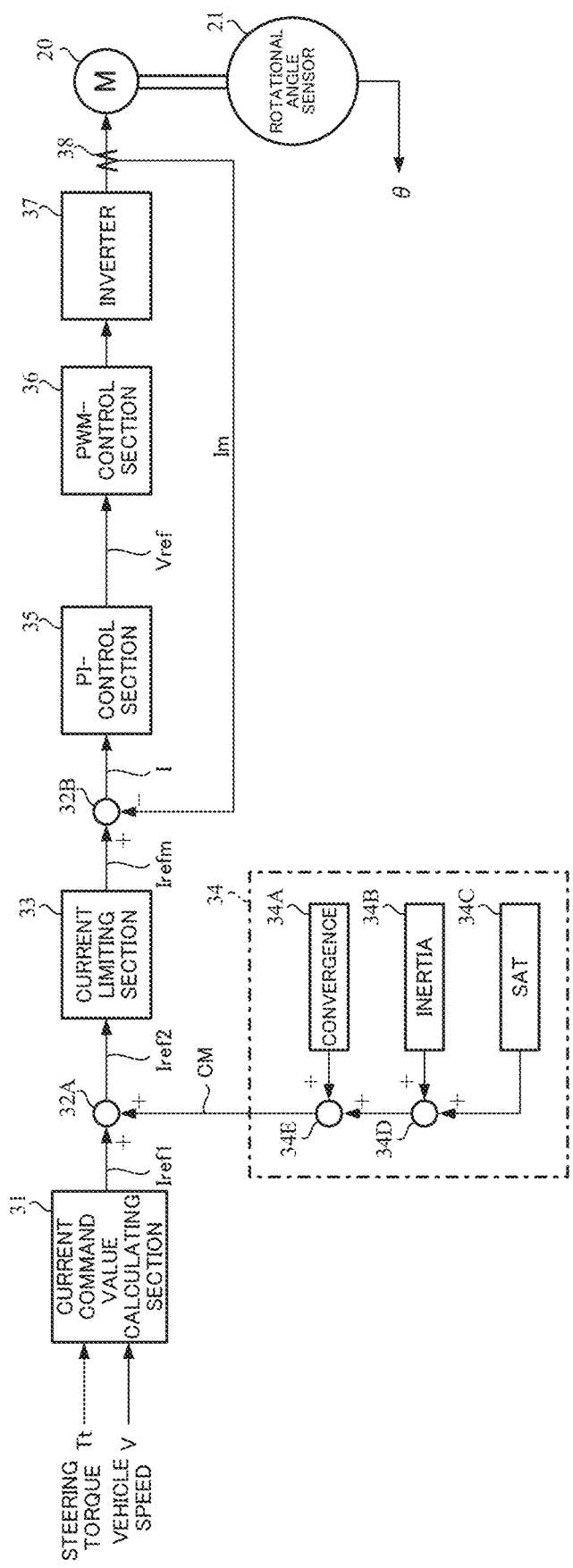
FIG. 2 is a block diagram showing a configuration example of a control unit (ECU) of the electric power steering apparatus.

The assist control section 230 comprises, for example, a current command value calculating section 31, a current limiting section 33, a compensation signal generating section 34 and an adding section 32A in a configuration example shown in FIG. 2 in order to perform the assist control, and calculates an assist control current command value IrefT1 equivalent to a current command value Irefm shown in FIG. 2, based on the steering torque Tt and the vehicle speed V and by using an assist map. However, the assist control section 230 is different from the configuration example shown in FIG. 2, inputs the assist map gradual-change gain Gft2 outputted from the switch judging and gradual-change gain generating section 220, multiplies an output (an assist map output current) from the current command value calculating section 31 by the Gft2, and inputs the multiplied result into the adding section 32A. The assist map used at the current command value calculating section 31 is a map that defines a characteristic of a current command value corresponding to the steering torque Tt, is vehicle speed sensitive, and has a characteristic that the current command value decreases as the vehicle speed V increases. Moreover, the current limiting section 33 and/or the compensation signal generating section 34 may be removed.

The switching section 240 calculates a current command value Iref by using the steering angle control current command value IrefP1, the assist control current command value IrefT1 and the gradual-change gains Gfa1 and Gft1. The detail of the switching section 240 will be described later.

The current control and driving section 250 comprises, for example, a subtracting section 32B, a PI-control section 35, a PWM-control section 36 and an inverter 37 in the configuration example shown in FIG. 2, and drives and controls the motor by using the current command value Iref and a motor current Im detected by the motor current detector 38 and by the same operations as the configuration example shown in FIG. 2.

The plant 400 is a physical model of a control target that simulates a characteristic of a driver in steering of a steering wheel and a mechanical characteristic of an EPS and a vehicle, and comprises a driver steering transfer characteristic 410 and a mechanical transfer characteristic 420. A mechanical system operates based on a steering wheel manual input torque Th caused by the steering of the driver and the motor current Im from the EPS-side-ECU 200, and this causes a state information EV with respect to the vehicle and the EPS, so that the mechanical transfer characteristic 420 outputs the state information EV. The vehicle state quantity detecting section 110 in the vehicle-side-ECU 100 and the EPS state quantity detecting section 210 in the EPS-side-ECU 200 detect the vehicle state quantity Cv and the EPS state quantity respectively from the state information EV. Since the steering wheel manual input torque Th caused by steering of the driver occurs depending on the steering wheel angle θh included in the state information EV, the driver steering transfer characteristic 410 outputs the steering wheel manual input torque Th.

Next, the switch judging and gradual-change gain generating section 220, the steering angle control section 300 and the switching section 240 in the EPS-side-ECU 200 will be described in detail.

Figure 4:
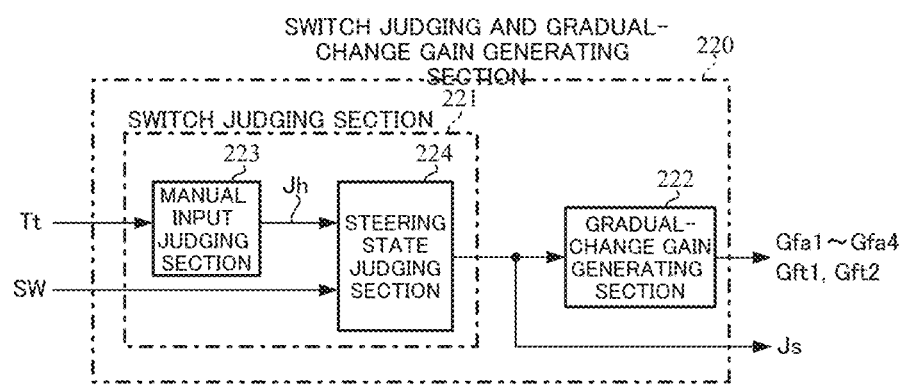
FIG. 4 is a block diagram showing a configuration example (the first embodiment) of a switch judging and gradual-change gain generating section.

FIG. 4 shows a configuration example of the switch judging and gradual-change gain generating section 220, the switch judging and gradual-change gain generating section 220 comprises a switch judging section 221 and a gradual-change gain generating section 222, and the switch judging section 221 comprises a manual input judging section 223 and a steering state judging section 224.

Figure 5:
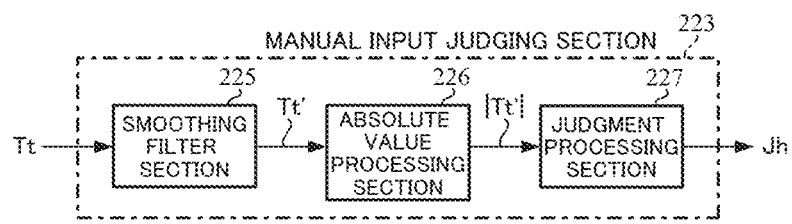
FIG. 5 is a block diagram showing a configuration example (the first embodiment) of a manual input judging section.

The manual input judging section 223 performs the manual input judgment by using the steering torque Tt. A configuration example of the manual input judging section 223 is shown in FIG. 5. The manual input judging section 223 comprises a smoothing filter section 225, an absolute value processing section 226 and a judgment processing section 227. The smoothing filter section 225 has a smoothing filter, smooths the steering torque Tt by the smoothing filter, and outputs a steering torque Tt' obtained after the smoothing. The steering torque Tt' is inputted into the absolute value processing section 226, and the absolute value processing section 226 outputs an absolute value (an absolute value data) |Tt'| of the steering torque Tt'. The absolute value |Tt'| is inputted into the judgment processing section 227. The judgment processing section 227 judges three kinds of judgment that "manual input is performed"

and one kind of judgment that "manual input is not performed" by using plural predetermined thresholds Tth1, Tth2 and Tth3 (0≤Tth1≤Tth2≤Tth3). Specifically, in the case that "the absolute value |Tt'| is equal to or more than the threshold Tth3", the judgment processing section 227 judges "third level manual input is performed". In the case that "the absolute value |Tt'| is equal to or more than the threshold Tth2 and is less than the threshold Tth3", the judgment processing section 227 judges "second level manual input is performed". In the case that "the absolute value |Tt'| is equal to or more than the threshold Tth1 and is less than the threshold Tth2", the judgment processing section 227 judges "first level manual input is performed". In the case that "the absolute value |Tt'| is less than the threshold Tth1", the judgment processing section 227 judges "manual input is not performed". The judgment result is outputted as a manual input judgment signal Jh.

Although the judgment processing section 227 performs the judgment by using the three thresholds, the number of the thresholds is not limited to three, and the judgment may be performed by using the thresholds whose number is not three. Thereby, flexible judgment can be performed.

The steering state judging section 224 judges a steering state by the switch signal SW from the vehicle-side ECU 100 and the manual input judgment signal Jh. The steering state has "first automatic steering", "second automatic steering" and "manual steering". The "first automatic steering" corresponds to a normal automatic steering state. The latest steering state is judged by the following conditions based on the switch signal SW, the manual input judgment signal Jh and the steering state when inputting the data (accurately, this state is the steering state in the preceding sample. Hereinafter, this state is referred to as a "previous steering state").

[Condition 1]

In the case that the previous steering state is "first automatic steering" or "second automatic steering", and the switch signal SW is "assist control mode" or the manual input judgment signal Jh is "third level manual input is performed", the steering state is judged as "manual steering".

[Condition 2]

In the case that the previous steering state is "first automatic steering", the switch signal SW is "steering angle control mode", and the manual input judgment signal Jh is "second level manual input is performed", the steering state is judged as "second automatic steering".

[Condition 3]

In the case that the previous steering state is "second automatic steering", the switch signal SW is "steering angle control mode", and the manual input judgment signal Jh is "first manual input is performed" or "second manual input is performed", the steering state is not changed and is judged as "second automatic steering".

[Condition 4]

In the case that the previous steering state is "second automatic steering", the switch signal SW is "steering angle control mode", and the manual input judgment signal Jh is "manual input is not performed", the steering state is judged as "first automatic steering".

[Condition 5]

In the case that the previous steering state is "manual steering", the switch signal SW is "steering angle control mode", and the manual input judgment signal Jh is "manual input is not performed", the steering state is judged as "first automatic steering".

In detail, the above conditions 1 to 5 are represented by the following table 1. In the table 1, "-" means any value (that is, this value is not involved in the judgment), and "continue" means that the steering state is not changed. The conditions in the respective columns are coupled with the "AND" condition, and the steering state is judged.

TABLE 1

| previous steering state | switch signal SW | manual input judgment signal Jh | judgment result |
|---|---|---|---|
| first automatic steering | assist control mode | — | manual steering |
|  | steering angle control mode | third level manual input is performed | manual steering |
|  |  | second level manual input is performed | second automatic steering |
|  |  | first level manual input is performed | (continue) |
|  |  | manual input is not performed | (continue) |
| second automatic steering | assist control mode | — | manual steering |
|  | steering angle control mode | third level manual input is performed | manual steering |
|  |  | second level manual input is performed | (continue) |
|  |  | first level manual input is performed | (continue) |
|  |  | manual input is not performed | first automatic steering |
| manual steering | assist control mode | — | (continue) |
|  | steering angle control mode | manual input is not performed | first automatic steering |
|  |  | otherwise | (continue) |

The steering state is judged in accordance with the above table 1, and the judgment result is outputted to the gradual-change gain generating section 222 and the steering angle control section 300 as the steering state judgment signal Js. In the steering angle control section 300, the steering state judgment signal Js is used in setting a limit value at a variable rate limiting section 320 described below. The steering state may be judged without using the switch signal SW.

The gradual-change gain generating section 222 determines the gradual-change gains based on the steering state judgment signal Js. The gradual-change gains take various values depending on the steering state, and the gradual-change gain generating section 222 judges the steering state by the steering state judgment signal Js. "First automatic steering" is judged as the automatic steering state, and in the case of "second automatic steering", the gradual-change gains take the previous values.

Figure 6A:
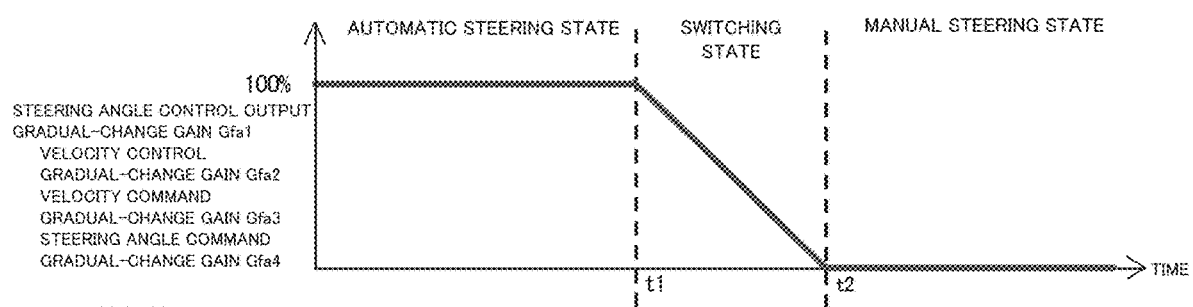
FIGS. 6A, 6B and 6C are graphs showing an example of changing gradual-change gains corresponding to a steering state.

The gradual-change gains Gfa1, Gfa2, Gfa3 and Gfa4 are 100% in the automatic steering state, are 0% in the manual steering state, and are gradually changed in the case of transferring from the automatic steering state to the manual steering state and in the case of transferring from the manual steering state to the automatic steering state. For example, in the case of transferring from the automatic steering state to the manual steering state, the gradual-change gains Gfa1 to Gfa4 are changed as shown in FIG. 6A. That is, the gradual-change gains successively decrease from the time point t1 when the steering state judgment signal Js is changed from the "first automatic steering" to the "manual steering", and become 0% at the time point t2. On the contrary, in the case of transferring from the manual steering state to the automatic steering state, the gradual-change gains successively increase from the time point when the steering state judgment signal Js is changed to the "first automatic steering". In the case that the steering state judgment signal Js is changed to the "manual steering" during the decrease or the increase in the gradual-change gains (hereinafter this state of the decrease or the increase is referred to a "switching state"), the gradual-change gains turn to decrease. In the case that the steering state judgment signal Js is changed to the "first automatic steering" during the switching state, the gradual-change gains turn to increase. In the case that the steering state judgment signal Js is changed to the "second automatic steering" during the switching state, the gradual-change gains do not change. Moreover, the gradual-change gains are changed linearly in the switching state in FIG. 6A, however, in order to make the switching operation smooth, they may be changed like an S-shaped bend, and it is possible to use the gradual-change gains changed linearly through such an LPF as a primary LPF whose cutoff frequency is 2 Hz. Further, the gradual-change gains Gfa1 to Gfa4 do not need to similarly change in conjunction, and may change independently.

Figure 6B:
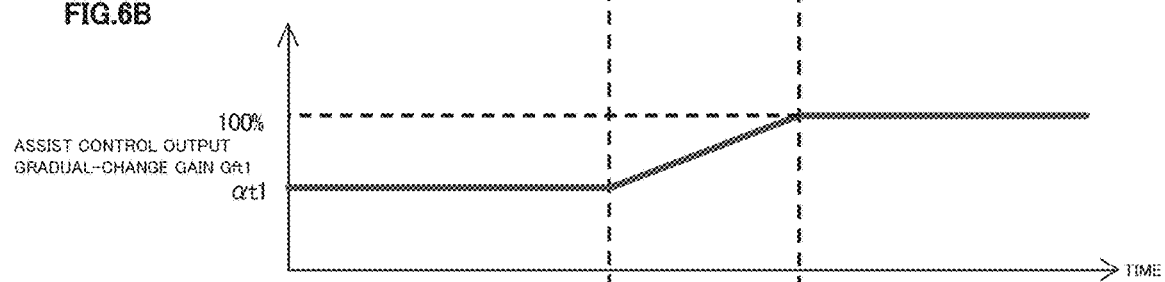

The assist control output gradual-change gain Gft1 is αt1 [%] (0≤αt1≤150) in the automatic steering state, is 100% in the manual steering state, and is gradually changed in the switching state as with the gradual-change gains Gfa1 to Gfa4, as shown in FIG. 6B.

Figure 6C:
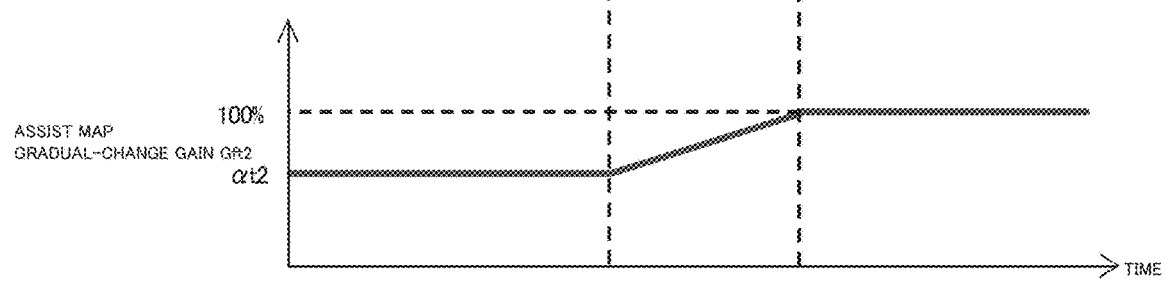

The assist map gradual-change gain Gft2 is αt2 [%] (0≤αt2≤150) in the automatic steering state, is 100% in the manual steering state, and is gradually changed in the switching state as with the gradual-change gains Gfa1 to Gfa4, as shown in FIG. 6C.

The judgment result of the manual input judgment includes "first level manual input is performed", and the judgment of the steering state and further the determination of the gradual-change gains are performed based on the above judgment result. Thereby, chattering which occurs when the state is changed from "second level manual input is performed" to "manual input is not performed", can be suppressed.

Figure 7:
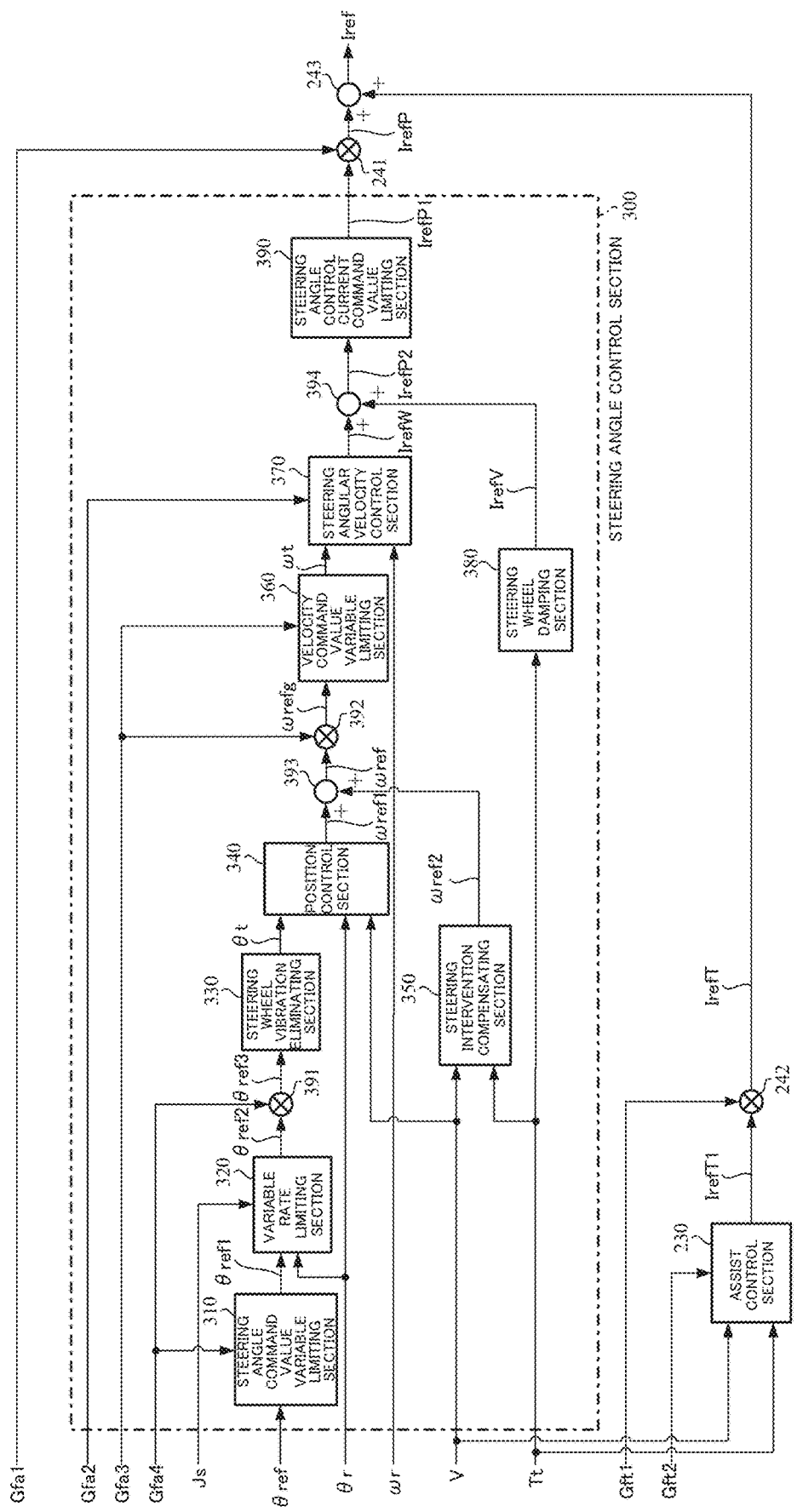
FIG. 7 is a block diagram showing a configuration example (the first embodiment) of a steering angle control section and a switching section.

A configuration example of the steering angle control section 300 and the switching section 240 is shown in FIG. 7. The steering angle control section 300 comprises a steering angle command value variable limiting section 310, a variable rate limiting section 320, a steering wheel vibration eliminating section 330, a position control section 340, a steering intervention compensating section 350, a velocity command value variable limiting section 360, a steering angular velocity control section 370, a steering wheel damping section 380, a steering angle control current command value limiting section 390, multiplying sections 391 and 392, and adding sections 393 and 394. The switching section 240 comprises multiplying sections 241 and 242, and an adding section 243.

Figure 8:
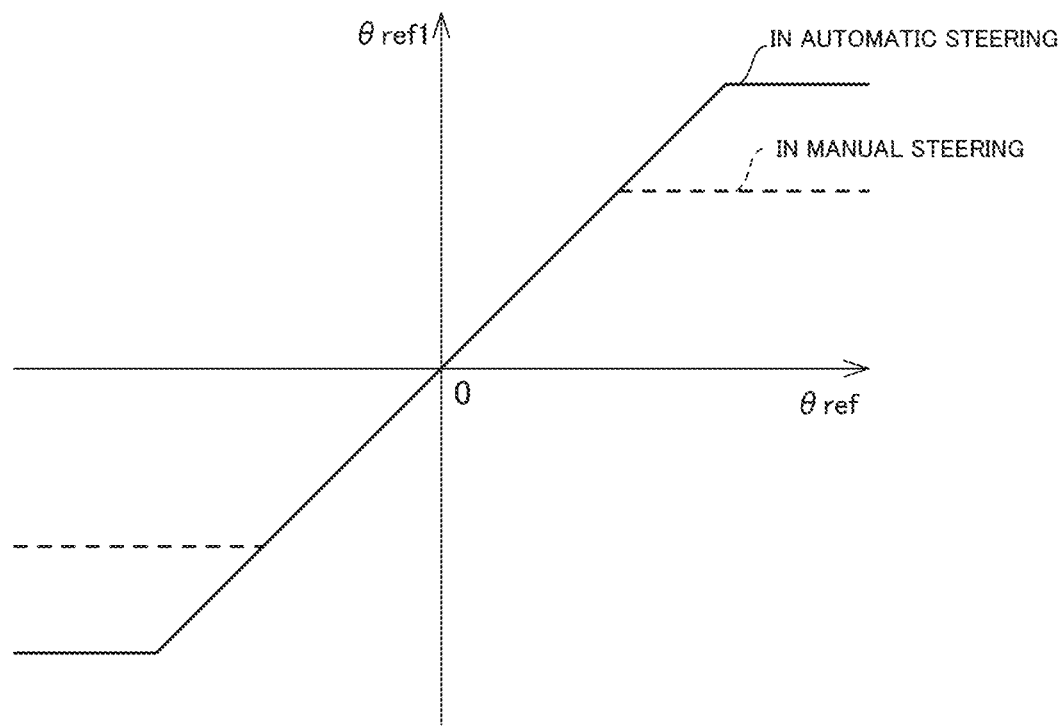
FIG. 8 is a characteristic diagram showing an example of a limit value in a steering angle command value variable limiting section.

The steering angle command value variable limiting section 310 of the steering angle control section 300 limits the steering angle command value θref which is received from the vehicle-side-ECU 100 and is used for the automatic steering or the like by setting limit values (an upper limit value and a lower limit value) in order to prevent an abnormal value and an excessive value caused by a communication error or the like from being inputted into the steering control, and outputs the limited value as a steering angle command value θref1. The steering angle command value variable limiting section 310 sets the limit values depending on the steering angle command gradual-change gain Gfa4 so as to set appropriate limit values in the automatic steering state and the manual steering state. For example, as shown in FIG. 8, the steering angle command value variable limiting section 310 judges the case where the steering angle command gradual-change gain Gfa4 is 100% to be the automatic steering state, and limits the steering angle command value θref with the limit value shown by the solid line. The steering angle command value variable limiting section 310 judges the case where the steering angle command gradual-change gain Gfa4 is 0% to be the manual steering state, and limits the steering angle command value θref with the limit value, as shown by the broken line, whose absolute value is smaller than that of the automatic steering state. The steering angle command value variable limiting section 310 judges the case where the steering angle command gradual-change gain Gfa4 is between 0% and 100% to be the switching state, and limits the steering angle command value θref with a value between the solid line and the broken line. In the switching state, it is possible to limit the steering angle command value θref with the limit value of the automatic steering state shown by the solid line or the limit value of the manual steering state shown by the broken line. Moreover, a magnitude (an absolute value) of the upper limit value and a magnitude of the lower limit value may be different.

In order to avoid sharply changing a steering angle control current command value being an output of the steering angle control by a sudden change of the steering angle command value θref, the variable rate limiting section 320 limits a change amount of the steering angle command value θref1 by setting a limit value, and outputs a steering angle command value θref2. For example, a difference between the previous and the present steering angle command values θref1 is defined as the change amount. In the case that the absolute value of the change amount is larger than a predetermined value (a limit value), the variable rate limiting section 320 performs addition or subtraction to the steering angle command value θref1 so that the absolute value of the change amount becomes the limit value, and outputs the result as the steering angle command value θref2. In the case that the absolute value of the change amount is smaller than or equal to the limit value, the variable rate limiting section 320 outputs the steering angle command value θref1 as the steering angle command value θref2 without changing it. As with the steering angle command value variable limiting section 310, an appropriate limit value is set in the automatic steering state and the manual steering state. Since it is possible to change the limit value not synchronized with the gradual-change gains, the limit value is set depending on the steering state judgment signal Js outputted from the switch judging and gradual-change gain generating section 220. In the case that the steering state judgment signal Js is the "first automatic steering", the limit value is set to a predetermined value, and in the case that the steering state judgment signal Js is the "second automatic steering" or the "manual steering", the limit value is set to zero, so that the steering angle command value θref2 is not changed and becomes constant. Moreover, it is possible to limit the change amount by setting an upper limit value and a lower limit value instead of setting the limit value for the absolute value of the change amount.

At the multiplying section 391, the steering angle command value θref2 is multiplied by the steering angle command gradual-change gain Gfa4, and the multiplied result is outputted as a steering angle command value θref3. This makes a target steering angle θt which is outputted from the steering wheel vibration eliminating section 330, described below, in the switching state from the automatic steering state to the manual steering state, gradually approximate zero, and can make the steering angle control operate to a neutral state.

The steering wheel vibration eliminating section 330 reduces a vibration frequency component included in the steering angle command value θref3. In the automatic steering, when the steering command is changed, a frequency component (around 10 Hz) exciting a vibration caused by springiness of a torsion bar and an inertia moment of a steering wheel, occurs in the steering angle command value θref3. The steering wheel vibration eliminating section 330 reduces the steering wheel vibration frequency component included the steering angle command value θref3 by a filter processing using an LPF, a notch filter and so on or phase delay compensation, and outputs the target steering angle θt. As a filter, any filter may be used if it lowers a gain in a band of the steering wheel vibration frequency and is possible to provide for the ECU. The steering wheel vibration eliminating section 330 enables reduction of the steering wheel vibration frequency component caused by multiplying the steering angle command gradual-change gain Gfa4, which is output from the multiplying section 391 provided in front of the steering wheel vibration eliminating section 330. The target steering angle θt is outputted to the position control section 340. Moreover, it is possible to omit the steering wheel vibration eliminating section 330 in such a case that the steering wheel vibration frequency component is minute.

The position control section 340 calculates a steering angular velocity command value ωref1 for making the actual steering angle θr approximate the target steering angle θt based on the target steering angle θt and the actual steering angle θr. The position control section 340 uses a reference model and a feedforward (FF) filter in order to extend a band where the actual steering angle θr is controlled with respect to the target steering angle θt to a high frequency side. This enables improvement of responsiveness (followability) of the steering angle control.

Figure 9:
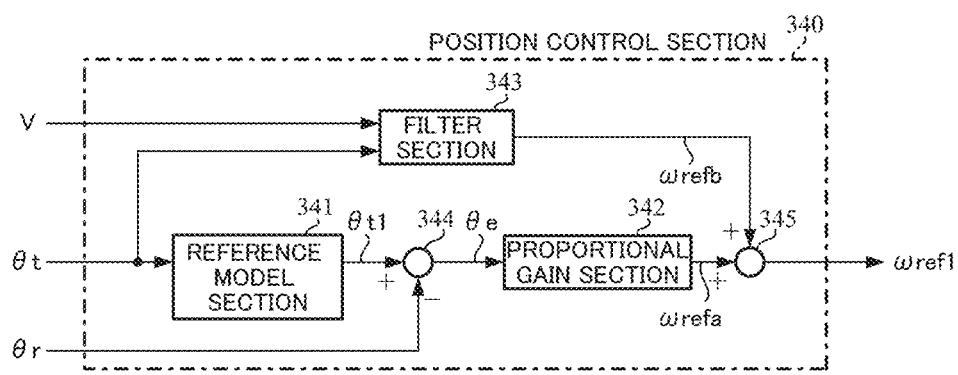
FIG. 9 is a block diagram showing a configuration example of a position control section.

A configuration example of the position control section 340 is shown in FIG. 9. The position control section 340 comprises a reference model section 341, a proportional gain section 342, a filter section 343, a subtracting section 344 and an adding section 345.

The reference model section 341 has a transfer function $G_{model}$ defined by the following expression 1, and transforms the target steering angle θt into a target steering angle θt1 by using the transfer function $G_{model}$.

$$G_{model} = \frac{1}{(T_{m1}s + 1)^4 (T_{m2}s + 1)^2} \quad \text{[Expression 1]}$$

Here, $T_{m1}=1/(2\pi \times f_{m1})$, $T_{m2}=1/(2\pi \times f_{m2})$, $f_{m1}$ and $f_{m1}$ are cutoff frequencies, and "s" is a Laplace operator. The transfer function $G_{model}$ defines a desired transfer characteristic in a method of a model reference control. Though the order of the denominator is 6 and the order of the numerator is 0 in the above expression 1, the orders are not limited to these.

The deviation θe between the target steering angle θt1 and the actual steering angle θr is obtained at the subtracting section 344, and the deviation θe is inputted into the proportional gain section 342. The proportional gain section 342 multiplies the deviation θe by the proportional gain Kpp, and calculates a steering angular velocity command value ωrefa by a P-control.

The filter section 343 has a FF filter, and transforms the target steering angle θt into a steering angular velocity command value ωrefb by the FF filter. A transfer function Gf of the FF filter is defined by the following expression 2.

$$G_f = K_{ff} \frac{G_{model}}{P_{\omega\theta}} \quad \text{[Expression 2]}$$

Figure 10:
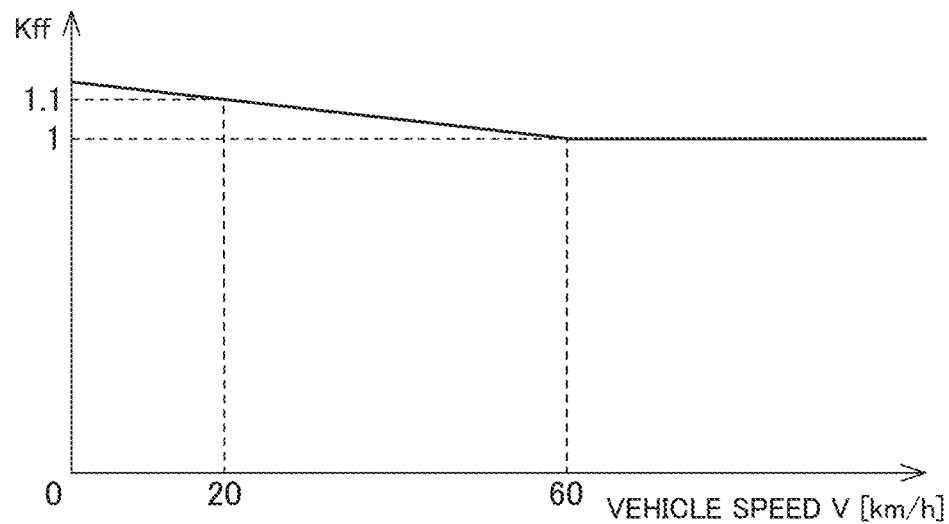
FIG. 10 is a characteristic diagram showing an example of changing a gain of a feedforward (FF) filter at the position control section depending on a vehicle speed.

Kff is an FF filter gain. $P_{\omega\theta}$ is a transfer function from the steering angular velocity command value ωref, which is outputted from the adding section 393 described below, to the actual steering angle θr, and is predefined by an identification by fitting, and so on. The FF filter gain Kff is changed depending on the vehicle speed V. Since the responsiveness of the actual steering angle to the steering angle command value is changed by changing a road surface reaction force and a steering intervention compensation map described below depending on the vehicle speed, the FF filter gain Kff is made vehicle speed sensitive. This enables the responsiveness of the actual steering angle to the steering angle command value to be almost constant without depending on the vehicle speed. As shown in FIG. 10, for example, the FF filter gain Kff is changed so as to monotonically decrease as the vehicle speed V increases from 0 km/h, to become 1.1 when the vehicle speed V is 20 km/h, to become 1 when the vehicle speed V is 60 km/h, and to be kept constant at 1 after that.

The steering angular velocity command values ωrefa and ωrefb are added at the adding section 345, and the added result is outputted as the steering angular velocity command value ωref1.

Moreover, the processing by the reference model and the FF filter is not essential, and it is possible to calculate the steering angular velocity command value ωref1 only by a P-control performed by the subtracting section 344 and the proportional gain section 343.

The steering intervention compensating section 350 calculates a steering angular velocity command value (a compensatory steering angular velocity command value) ωref2 for compensating steering intervention corresponding to the steering torque Tt. A value obtained by adding the steering angular velocity command value ωref2 and the steering angular velocity command value ωref1 from the position control section 340 becomes a steering angular velocity command value ωref. The function of the steering intervention compensating section 350 enables generation of the steering angular velocity command value to mitigate occurrence of the steering torque, and can achieve the steering intervention during the automatic steering. The steering intervention compensating section 350 can achieve appropriate feeling by compensating to the steering torque Tt by a steering intervention compensation map being vehicle speed sensitive, and phase-compensating to the steering torque Tt.

Figure 11:
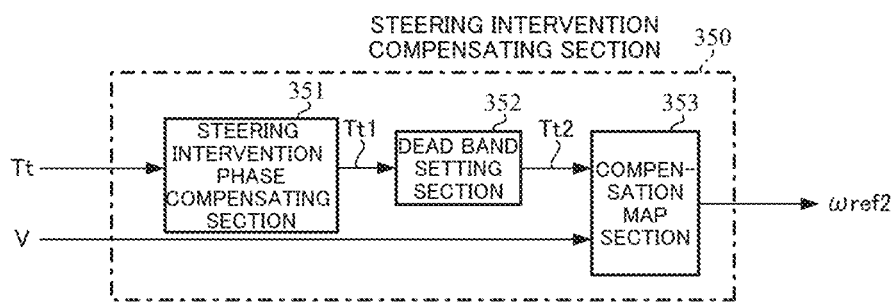
FIG. 11 is a block diagram showing a configuration example of a steering intervention compensating section.

A configuration example of the steering intervention compensating section 350 is shown in FIG. 11. The steering intervention compensating section 350 comprises a steering intervention phase compensating section 351, a dead band setting section 352 and a compensation map section 353.

The steering intervention phase compensating section 351 sets phase advance compensation as phase compensation, and transforms the steering torque Tt into the steering torque Tt1. The steering intervention phase compensating section 351 performs the phase advance compensation, for example, by a primary filter where a cutoff frequency of a numerator is 1.0 Hz and a cutoff frequency of a denominator is 1.3 Hz. This enables improvement of feeling without resistance and catching feeling in such a case of suddenly steering. Moreover, the steering intervention phase compensating section 351 may be omitted in such a case of focusing on a cost.

Figure 12:
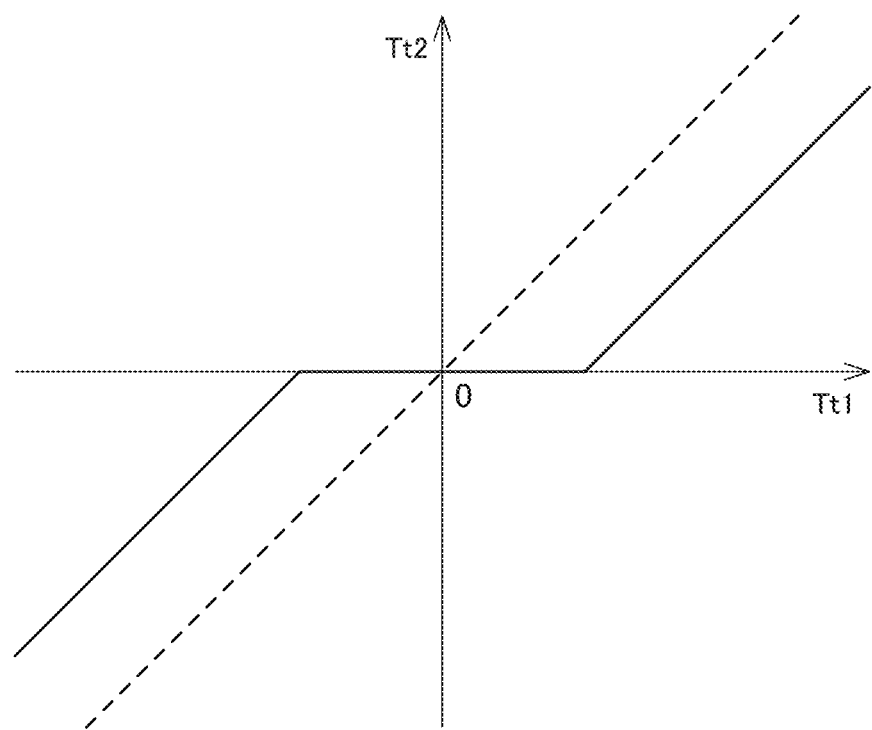
FIG. 12 is a characteristic diagram showing a setting example of a dead band to a steering torque at the steering intervention compensating section.

The dead band setting section 352 sets the dead band to the steering torque Tt1, and outputs the operated steering torque as the steering torque Tt2. For example, the dead band shown in FIG. 12 is set. That is, in the case of not setting the dead band, the steering torque Tt1 is outputted as the steering torque Tt2, as shown by the broken line. By setting the dead band in the range where the steering torque Tt1 is in the vicinity of zero, as shown by the solid line, the value of the steering torque Tt2 is zero in the above range and changes the value with the same gradient of the broken line out of the above range so that the steering torque Tt2 changes in conjunction with the steering torque Tt1. By setting such a dead band, the steering angular velocity command value ωref2 outputted from the subsequent compensation map section 353 is also zero in the above range and the steering intervention compensation is not performed. Thus, when the steering intervention by the driver is occurred, the steering torque easily increases up to the threshold of the dead band. As a result, the manual input judgment is performed at an early timing. The magnitude of the positive threshold in the dead band may not the same as that of the negative threshold in the dead band.

Figure 13:
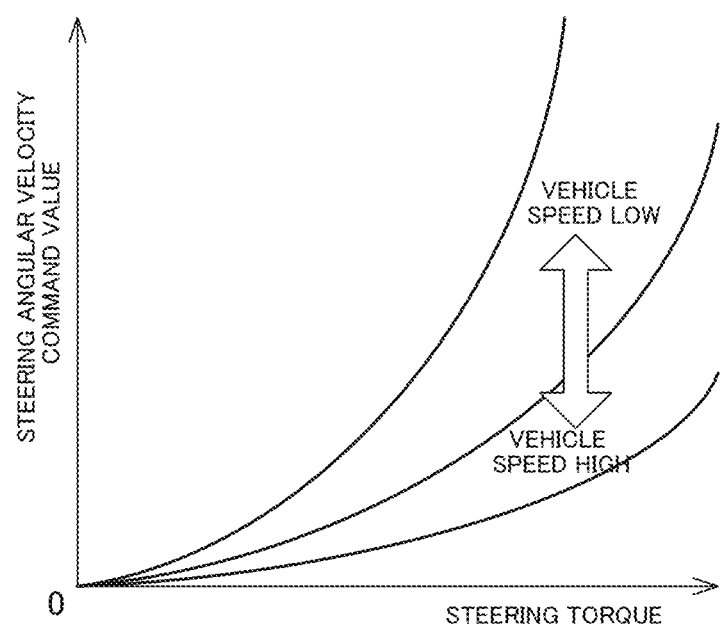
FIG. 13 is a characteristic diagram showing an example of a steering intervention compensation map.

The compensation map section 353 has the steering intervention compensation map and calculates the steering angular velocity command value ωref2 by using the steering intervention compensation map. The steering intervention compensation map is a map by which the characteristic of the steering angular velocity command value to the steering torque is determined, changes its value depending on the vehicle speed, and calculates the steering angular velocity command value ωref2 by using the steering torque Tt2 and the vehicle speed V. The steering intervention compensation map is adjusted by tuning. For example, as shown in FIG. 13, the steering angular velocity command value increases as the steering torque increases, and decreases as the vehicle speed increases. This enables heavy feeling at a higher vehicle speed. The assist map used at the assist control section 230 also has a characteristic where the assist control current command value decreases as the vehicle speed increases. In the case that the steering intervention is performed by a driver at high-speed running, increases in the steering angular velocity command value and the assist control current command value are suppressed, the steering does not become sudden, and safe steering is enabled.

The steering intervention phase compensating section 351 may be disposed at the subsequent stage of the dead band setting section 352 or the compensation map section 353. It is necessary that the dead band setting section 352 is disposed at the preceding stage of the compensation map section 353. Also when the dead band setting section 352 is removed and a map having the dead band is used as the steering intervention compensation map (the map where the output value within the set range is zero to the input torque), the same effect can be obtained. Assuming that the straight line passing the origin is used as the steering intervention compensation map, a simple method that the steering torque is multiplied by the predetermined gain may be used instead of the steering intervention compensation map.

The steering angular velocity command value ωref1 outputted from the position control section 340 and the steering angular velocity command value ωref2 outputted from the steering intervention compensating section 350 are added at the adding section 393, and the added result is outputted as the steering angular velocity command value ωref.

The steering angular velocity command value ωref is multiplied by the velocity command gradual-change gain Gfa3 at the multiplying section 392, and the multiplied result is outputted as a steering angular velocity command value ωrefg. The velocity command gradual-change gain Gfa3 is used in order to achieve smooth switching in the case of switching from the manual steering state to the automatic steering state. Moreover, the velocity command gradual-change gain Gfa3 is changed synchronizing with the steering angle control output gradual-change gain Gfa1 by which the steering angle control current command value IrefP1 is multiplied (the synchronization may not be perfect).

Figure 14:
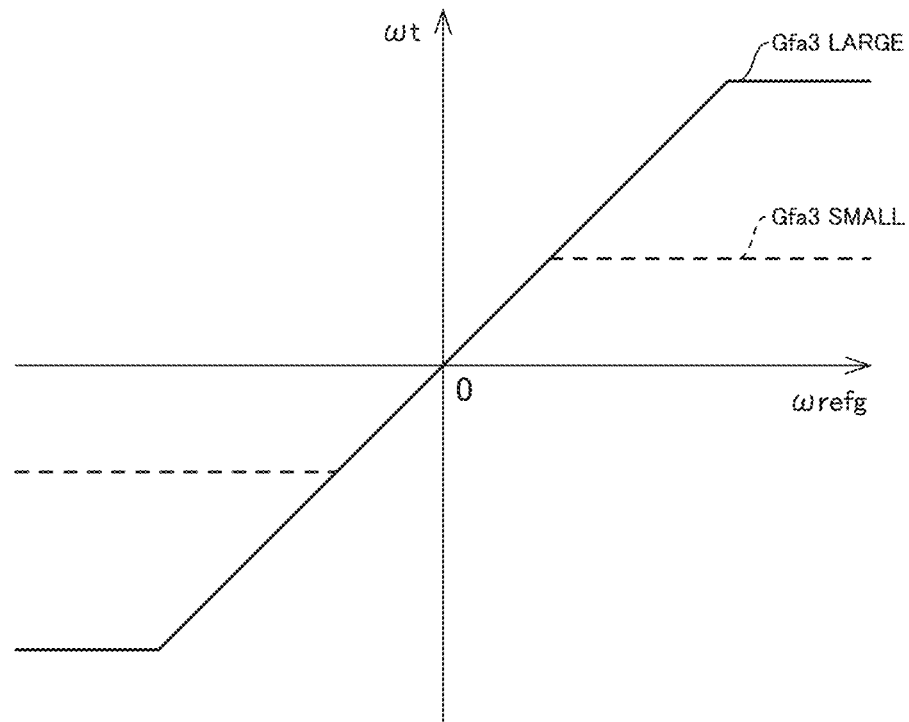
FIG. 14 is a characteristic diagram showing an example of a limit value at a velocity command value variable limiting section.

The velocity command value variable limiting section 360 limits the steering angular velocity command value ωrefg by setting limit values (an upper limit value and a lower limit value), and outputs a target steering angular velocity ωt. The limit values are set depending on the velocity command gradual-change gain Gfa3. For example, when the velocity command gradual-change gain Gfa3 is smaller than a predetermined threshold, magnitudes (absolute values) of the limit values are small values as shown by the broken line in FIG. 14, and when it is larger than or equal to the predetermined threshold, the magnitudes of the limit values are increased to the values shown by the solid line. Moreover, it is possible that the predetermined threshold is set to any value of the velocity command gradual-change gain Gfa3 in the switching state, the magnitudes of the limit values are fixed at the small values shown by the broken line when the Gfa3 is smaller than the predetermined threshold, and the magnitudes of the limit values are gradually increased to the values shown by the solid line. The magnitude of the upper limit value and the magnitude of the lower limit value may be different.

The steering angular velocity control section 370 inputs the target steering angular velocity ωt, the actual steering angular velocity ωr and the velocity control gradual-change gain Gfa2, and calculates a steering angle control current command value IrefW by a proportional preceding type PI (I-P) control so that the actual steering angular velocity ωr follows the target steering angular velocity ωt.

Figure 15:
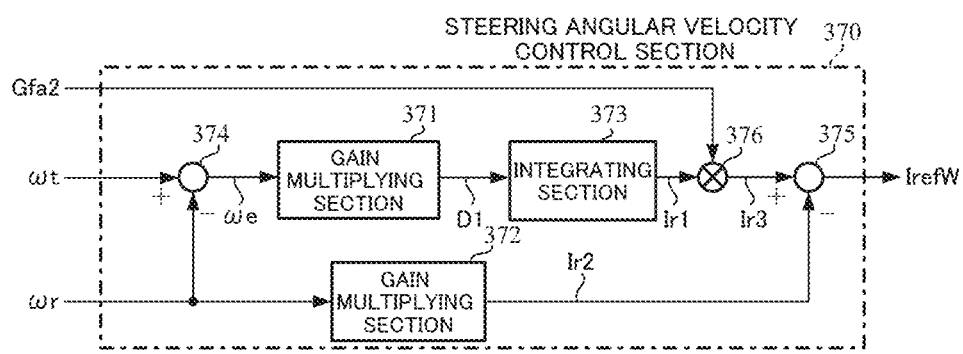
FIG. 15 is a block diagram showing a configuration example (the first embodiment) of a steering angular velocity control section.

A configuration example of the steering angular velocity control section 370 is shown in FIG. 15. The steering angular velocity control section 370 comprises gain multiplying sections 371 and 372, an integrating section 373, subtracting sections 374 and 375, and a multiplying section 376.

The gain multiplying section 371 multiplies a deviation ωe (=ωt−ωr) between the target steering angular velocity ωt and the actual steering angular velocity ωr, which is calculated at the subtracting section 374, by a gain Kvi, and outputs an operation amount D1. The integrating section 373 integrates the operation amount D1, and calculates a control amount Ir1. At the multiplying section 376, the control amount Ir1 is multiplied by the velocity control gradual-change gain Gfa2, and the multiplied result is outputted as a control amount Ir3. The multiplication of the velocity control gradual-change gain Gfa2 is performed in order to achieve smooth switching between the manual steering state and the automatic steering state, and this can relax an influence of accumulating an integral value in steering angular velocity control at the time of the switching. The gain multiplying section 372 multiplies the actual steering angular velocity ωr by a gain Kvp, and outputs a control amount Ir2. At the subtracting section 375, a deviation (Ir3−Ir2) between the control amounts Ir3 and Ir2 is calculated, and is outputted as the steering angle control current command value IrefW. Moreover, as the integral of the integrating section 373, any method can be used if it is an integral method possible to achieve in the implementation, and the integrating section 373 can be constituted of a primary delay transfer function and a gain in the case of using pseudo-integral. Further, the velocity control gradual-change gain Gfa2 may be changed synchronizing with the steering angle control output gradual-change gain Gfa1.

Moreover, the steering angular velocity control section 370 uses the I-P control, however, a control method generally used may be used if it can make the actual steering angular velocity follow the target steering angular velocity. For example, it is possible to use a PI-control, a two-degree of freedom PI-control, a model reference control, a model matching control, a robust control, a control method that estimates a disturbance and combines a compensating means for counteracting a disturbance component with a part of it, and so on.

The steering wheel damping section 380 damps a steering wheel vibration based on the steering torque Tt being a torsion bar torque signal. Though the steering wheel vibration eliminating section 330 also has an effect on the steering wheel vibration in the automatic steering, the steering wheel damping section 380 can further improve the effect. The steering wheel damping section 380 damps the steering wheel vibration by a gain and phase compensation, and outputs a steering angle control current command value IrefV operating to eliminate a twist of a torsion bar. Further, the steering wheel damping section 380 operates to reduce a twist angle, and has also an effect of reducing catching uncomfortable feeling occurring when manual input of a driver intervenes.

Figure 16:
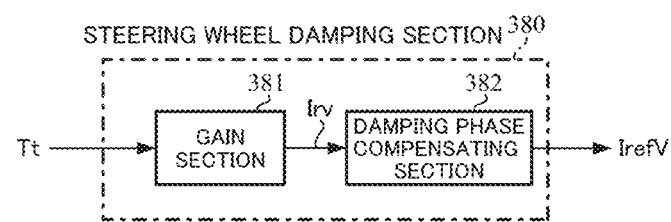
FIG. 16 is a block diagram showing a configuration example of a steering wheel damping section.

A configuration example of the steering wheel damping section 380 is shown in FIG. 16. The steering wheel damping section 380 comprises a gain section 381 and a damping phase compensating section 382. The gain section 381 multiplies the steering torque Tt by a gain Kv, and outputs a control amount Irv. The damping phase compensating section 382 is constituted of, for example, a primary filter, and transforms the control amount Irv into the steering angle control current command value IrefV. The damping phase compensating section 382 may be constituted of a phase compensation filter whose order is larger than or equal to two instead of the primary filter.

At the adding section 394, the steering angle control current command value IrefW outputted from the steering angular velocity control section 370 and the steering angle control current command value IrefV outputted from the steering wheel damping section 380, are added, and the added result is outputted as a steering angle control current command value IrefP2.

Figure 17:
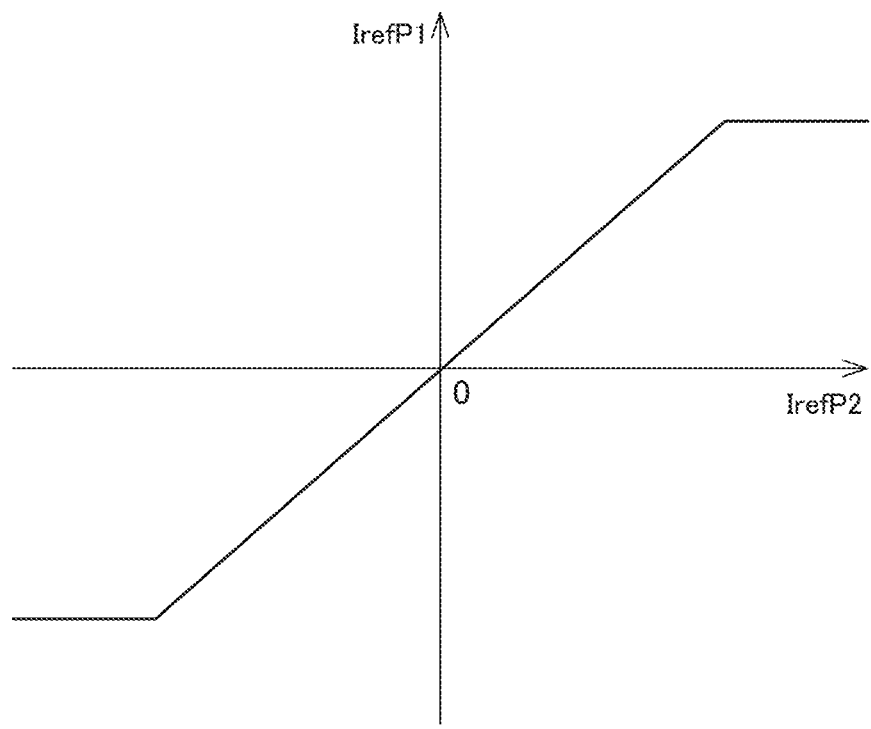
FIG. 17 is a characteristic diagram showing an example of a limit value at a steering angle control current command value limiting section.
Figure 18:
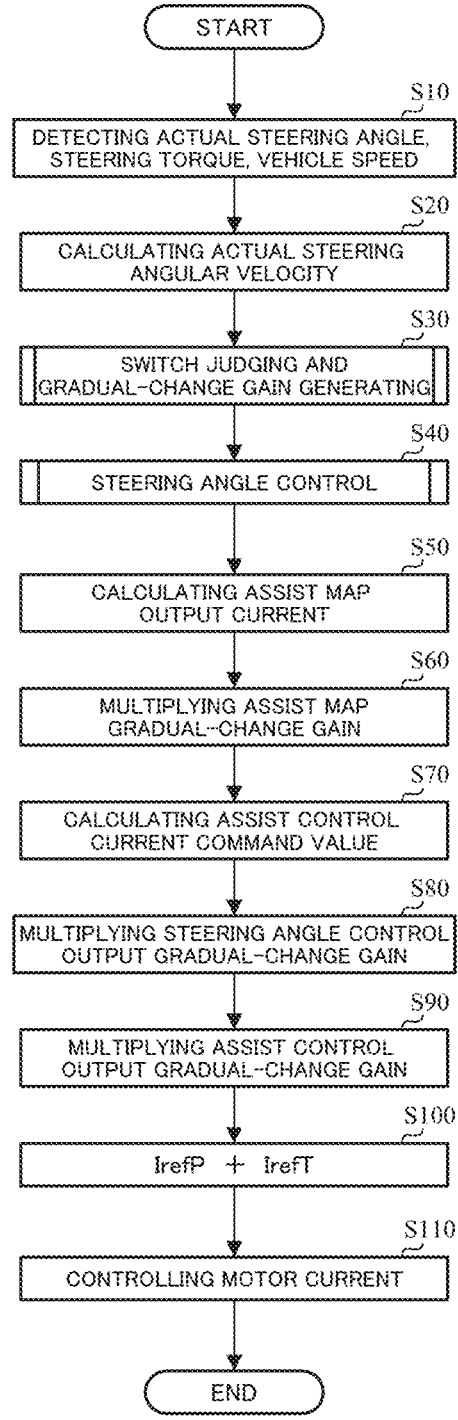
FIG. 18 is a flowchart showing an operating example of an EPS-side-ECU.

The steering angle control current command value limiting section 390 limits the steering angle control current command value IrefP2 by setting limit values (an upper limit value and a lower limit value) in order to prevent an excessive output, and outputs the steering angle control current command value IrefP1. For example, the steering angle control current command value limiting section 390 limits the steering angle control current command value IrefP2 by setting the upper limit value and the lower limit value as shown in FIG. 17. Moreover, a magnitude (an absolute value) of the upper limit value and a magnitude of the lower limit value may be different.

The switching section 240 comprises the multiplying sections 241 and 242, and the adding section 243.

At the multiplying section 241 of the switching section 240, the steering angle control current command value IrefP1 outputted from the steering angle control section 300 is multiplied by the steering angle control output gradual-change gain Gfa1 outputted from the switch judging and gradual-change gain generating section 220, and the multiplied result is outputted as a steering angle control current command value IrefP. The steering angle control output gradual-change gain Gfa1 is used in order to smoothly perform the switching operation between the manual steering state and the automatic steering state and to achieve uncomfortable feeling to a driver, safety and so on. At the multiplying section 242, the assist control current command value IrefT1 outputted from the assist control section 230 is multiplied by the assist control output gradual-change gain Gft1, and the multiplied result is outputted as an assist control current command value IrefT. The assist control output gradual-change gain Gft1 is used in order to smoothly perform the switching operation between the manual steering state and the automatic steering state and to achieve steering intervention by a driver in the automatic steering. At the adding section 243, the steering angle control current command value IrefP and the assist control current command value IrefT are added, and the added result is outputted as the current command value Iref.

The assist map gradual-change gain Gft2 used in the above assist control section 230 is also used for the same purpose as the assist control output gradual-change gain Gft1. In the automatic steering state, setting the Gft1 to the αt1 and the Gft2 to the αt2 as shown in FIGS. 6B and 6C and adjusting the αt1 and the αt2, enable improvement of safety of the system and suppression of occurrence of the vibration. Further, if it is possible to maintain the safety of the system in the automatic steering state, simply, the αt1 may be set to 0% and the αt2 may be set to 100%. In this case, since the αt1 is 0%, the assist control current command value IrefT becomes a zero command, and this means to achieve the steering intervention even without the assist control.

In such a configuration, an operating example of the EPS-side-ECU 200 will be described with reference to flowcharts shown in FIGS. 18 to 21.

When the operation is started, the EPS state quantity detecting section 210 detects the actual steering angle θr, the steering torque Tt and the vehicle speed V (Step S10), outputs the actual steering angle θr to the steering angle control section 300, outputs the steering torque Tt to the switch judging and gradual-change gain generating section 220, the steering angle control section 300 and the assist control section 230, and outputs the vehicle speed V to the steering angle control section 300 and the assist control section 230. Furthermore, the EPS state quantity detecting section 210 calculates the actual steering angular velocity ωr by the actual steering angle θr (Step S20), and outputs the actual steering angular velocity ωr to the steering angle control section 300.

The switch judging and gradual-change gain generating section 220 inputting the steering torque Tt judges the switching between the automatic steering and the manual steering considering the input of switch signal SW outputted from the vehicle-side-ECU 100, determines the gradual-change gains based on the judgment result (Step S30), outputs the gradual-change gains Gfa2, Gfa3 and Gfa4 to the steering angle control section 300, outputs the Gft2 to the assist control section 230, and outputs the Gfa1 and the Gft1 to the switching section 240. Further, the switch judging and gradual-change gain generating section 220 outputs the steering state judgment signal Js to the steering angle control section 300. A detailed operation of the switch judging and gradual-change gain generating section 220 will be described below.

The steering angle control section 300 inputs the steering angle command value θref outputted from the vehicle-side-ECU 100, the actual steering angle θr, the actual steering angular velocity ωr, the steering torque Tt and the vehicle speedV which are outputted from the EPS state quantity detecting section 210, and the gradual-change gains Gfa2, Gfa3 and Gfa4 and the steering state judgment signal Js which are outputted from the switch judging and gradual-change gain generating section 220, calculates the steering angle control current command value IrefP1 by using them (Step S40), and outputs the steering angle control current command value IrefP1 to the switching section 240. A detailed operation of the steering angle control section 300 will be described below.

The assist control section 230 inputs the steering torque Tt, the vehicle speed V and the assist map gradual-change gain Gft2, and calculates the assist map output current (current value) by the same operation as the current command value calculating section 31 shown in FIG. 2 (Step S50). The assist control section 230 multiplies the assist map output current by the assist map gradual-change gain Gft2 (Step S60), performs the same operations as the adding section 32A, the current limiting section 33 and the compensation signal generating section 34 which are shown in FIG. 2 to the multiplied result, calculates the assist control current command value IrefT1 (Step S70), and outputs the assist control current command value IrefT1 to the switching section 240.

The switching section 240 multiplies the inputted steering angle control current command value IrefP1 by the steering angle control output gradual-change gain Gfa1 at the multiplying section 241 (Step S80), and outputs the steering angle control current command value IrefP being the multiplied result to the adding section 243. Further, the switching section 240 multiplies the inputted assist control current command value IrefT1 by the assist control output gradual-change gain Gft1 at the multiplying section 242 (Step S90), and outputs the assist control current command value IrefT being the multiplied result to the adding section 243. The adding section 243 adds the steering angle control current command value IrefP and the assist control current command value IrefT (Step S100), and outputs the current command value Iref being the added result to the current control and driving section 250.

By using the current command value Iref and the motor current Im detected by the motor current detector 38, the current control and driving section 250 performs the control so that the motor current Im follows the current command value Iref by the same operations as the subtracting section 32B, the PI-control section 35, the PWM-control section 36 and the inverter 37 which are shown in FIG. 2 (Step S110), and drives and controls the motor.

Figure 19:
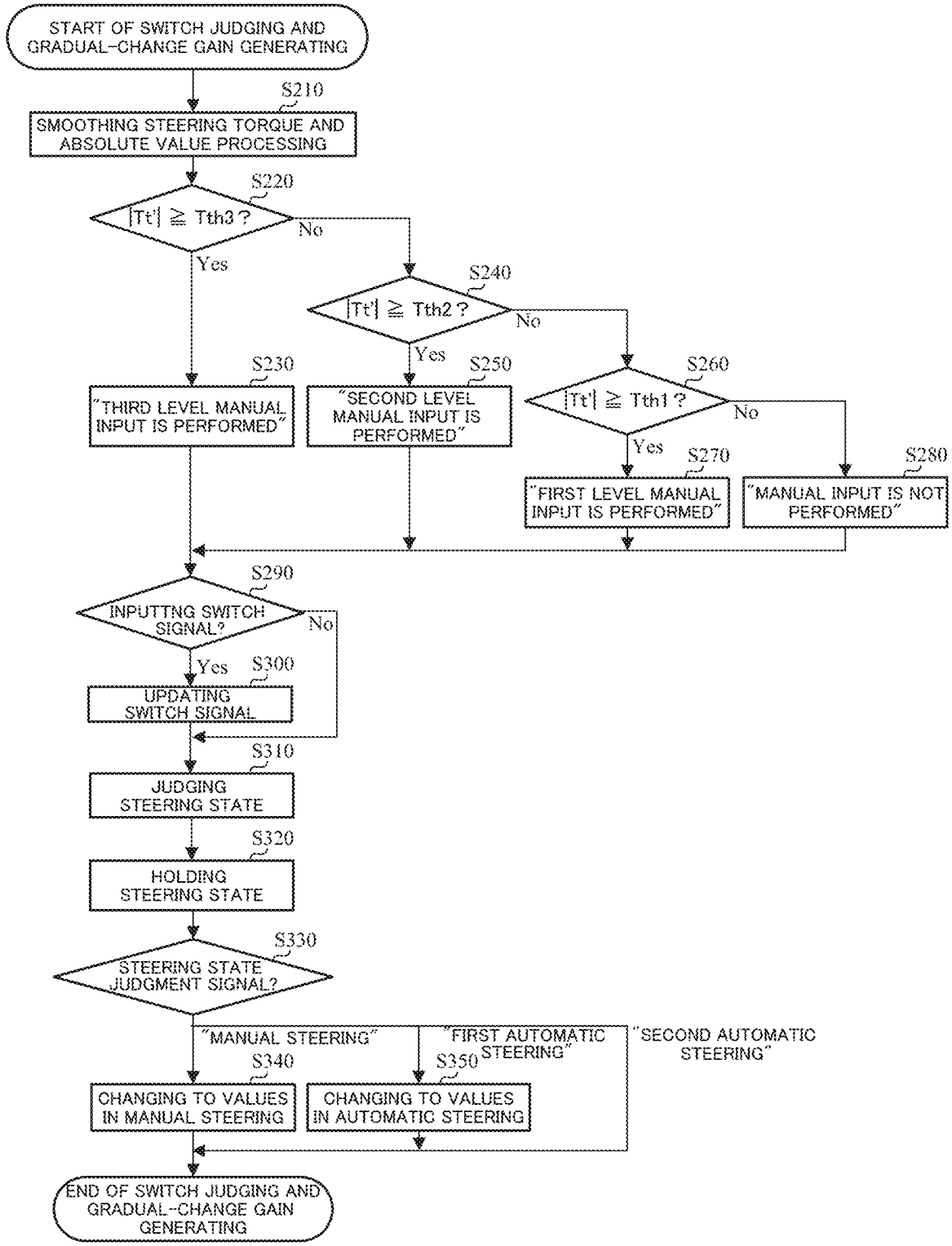
FIG. 19 is a flowchart showing an operating example (the first embodiment) of the switch judging and gradual-change gain generating section.

The detail of the operating example of the switch judging and gradual-change gain generating section 220 will be described with reference to a flowchart shown in FIG. 19. Moreover, the "manual steering", the "assist control mode" and the "manual steering" are set on the previous steering state, the held switch signal SW and the steering state judgment signal Js as an initial value in the steering state judging section 224, respectively.

The inputted steering torque Tt is inputted into the manual input judging section 223 in the switch judging section 221. The manual input judging section 223 smooths the steering torque Tt at the smoothing filter section 225, and obtains the absolute value |Tt'| of the steering torque Tt', which is obtained by the smoothing, at the absolute value processing section 226 (Step S210). The absolute value |Tt'| is inputted into the judgment processing section 227. When the absolute value |Tt'| is larger than or equal to the threshold Tth3 (Step S220), the judgment processing section 227 judges that "third level manual input is performed" (Step S230). When the absolute value |Tt'| is smaller than the threshold Tth3 and is larger than or equal to the threshold Tth2 (Step S240), the judgment processing section 227 judges that "second level manual input is performed" (Step S250). When the absolute value |Tt'| is smaller than the threshold Tth2 and is larger than or equal to the threshold Tth1 (Step S260), the judgment processing section 227 judges that "first level manual input is performed" (Step S270). When the absolute value |Tt'| is smaller than the threshold Tth1 (Step S260), the judgment processing section 227 judges that "manual input is not performed" (Step S280). The judgment result is outputted to the steering state judging section 224 as the manual input judgment signal Jh.

The steering state judging section 224 confirms whether the switch signal SW is inputted or not (Step S290). In the case of inputting the switch signal SW, the steering state judging section 224 updates the value of the held switch signal SW (Step S300), and performs the judgment of the steering state in accordance with the condition judgment of the table 1 by using the inputted manual input judgment signal Jh, the previous steering state and the switch signal SW (Step S310). The judgment result is outputted to the gradual-change gain generating section 222 and the steering angle control section 300 as the steering state judgment signal Js, and is held as the previous steering state in the subsequent judgment (Step S320).

The gradual-change gain generating section 222 confirms the value of the steering state judgment signal Js (Step S330). When the steering state judgment signal Js is the "manual steering", the gradual-change gain generating section 222 changes the respective gradual-change gains (Gfa1 to Gfa4, Gft1 and Gft2) to the values in the manual steering state (0% for Gfa1 to Gfa4, and 100% for Gft1 and Gft2) (Step S340). When the steering state judgment signal Js is the "first automatic steering", the gradual-change gain generating section 222 changes the respective gradual-change gains to the values in the automatic steering state (100% for Gfa1 to Gfa4, αt1 for Gft1, and αt2 for Gft2) (Step S350). When the steering state judgment signal Js is the "second automatic steering", the gradual-change gain generating section 222 does not change the respective gradual-change gains.

Figure 20:
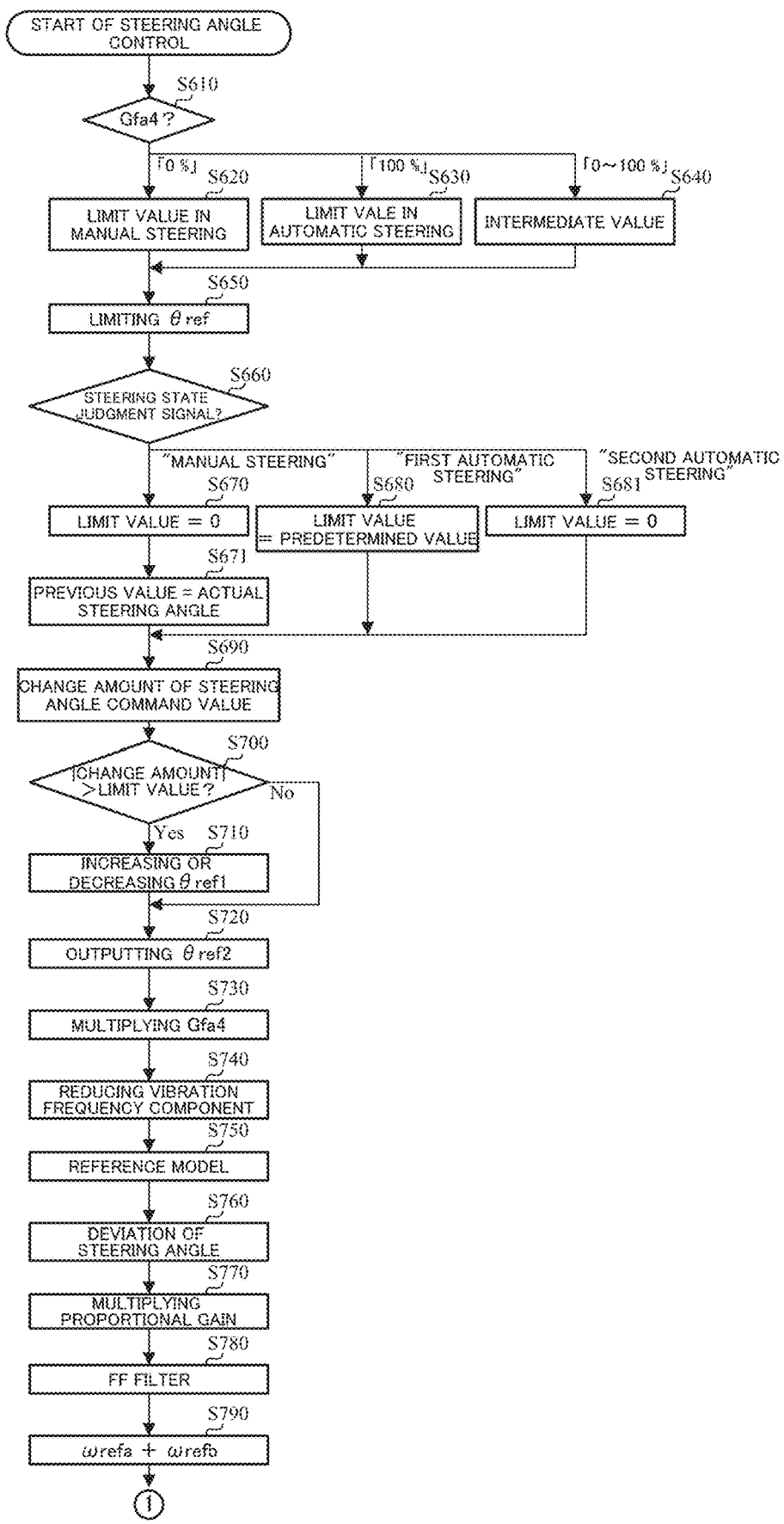
FIG. 20 is a flowchart showing a part of an operating example (the first embodiment) of the steering angle control section.

The detail of the operating example of the steering angle control section 300 will be described with reference to flowcharts shown in FIGS. 20 and 21.

The steering angle command value variable limiting section 310 confirms the value of the inputted steering angle command gradual-change gain Gfa4 (Step S610). The steering angle command value variable limiting section 310 sets the limit values to the limit values "in the manual steering" shown in FIG. 8 (Step S620) when the Gfa4 is 0%, sets the limit values to the limit values "in the automatic steering" shown in FIG. 8 (Step S630) when the Gfa4 is 100%, and sets the limit values to intermediate values (Step S640) when the Gfa4 is between 0% and 100%. The steering angle command value variable limiting section 310 limits the steering angle command value θref inputted from the vehicle-side-ECU 100 by using the set limit values (Step S650), and outputs the steering angle command value θref1.

The steering angle command value θref1 is inputted into the variable rate limiting section 320 with the steering state judgment signal Js and the actual steering angle θr. The variable rate limiting section 320 confirms the value of the steering state judgment signal Js (Step S660). When the steering state judgment signal Js is the "manual steering" or the "second automatic steering", the variable rate limiting section 320 sets the limit value to zero (Steps S670 and S681), in addition, when the steering state judgment signal Js is the "manual steering", the variable rate limiting section 320 sets the value of the stored previous steering angle command value θref1 to the value of the actual steering angle θr (Step S671). The step S671 is a step for suppressing a sudden change of the steering angle command value by starting in a state of matching the steering angle command value θref1 with the actual steering angle θr because a value at the time of terminating the previous steering angle control remains at the time of starting the steering angle control, and because a steering wheel may suddenly move by the sudden change if using its value as it is. When the steering state judgment signal Js is the "first automatic steering", the variable rate limiting section 320 sets the limit value to the predetermined value (Step S680). The variable rate limiting section 320 calculates the difference (the change amount) between the steering angle command value θref1 and the previous steering angle command value θref1 (Step S690). When the absolute value of the change amount is larger than the limit value (Step S700), the variable rate limiting section 320 increases or decreases the steering angle command value θref1 so that the absolute value of the change amount becomes the limit value (Step S710), and outputs the result as the steering angle command value θref2 (Step S720). When the absolute value of the change amount is smaller than or equal to the limit value (Step S700), the variable rate limiting section 320 outputs the steering angle command value θref1 as the steering angle command value θref2 (Step S720).

The steering angle command value θref2 is multiplied by the steering angle command gradual-change gain Gfa4 at the multiplying section 391 (Step S730), and the multiplied result is outputted as the steering angle command value θref3. The steering angle command value θref3 is inputted into the steering wheel vibration eliminating section 330.

The steering wheel vibration eliminating section 330 reduces the vibration frequency component of the steering angle command value θref3 (Step S740), and outputs the reduction result as the target steering angle θt to the position control section 340.

The target steering angle θt is inputted into the reference model section 341 and the filter section 343 in the position control section 340. The reference model section 341 transforms the target steering angle θt into the target steering angle θt1 by using the expression 1 (Step S750). The target steering angle θt1 is addition-inputted into the subtracting section 344, the actual steering angle θr is subtraction-inputted into the subtracting section 344, and the deviation θe between the target steering angle θt1 and the actual steering angle θr is obtained (Step S760). The deviation θe is inputted into the proportional gain section 342. The proportional gain section 342 multiplies the deviation θe by the proportional gain Kpp, and calculates the steering angular velocity command value ωrefa (Step S770). The filter section 343 inputting the target steering angle θt inputs also the vehicle speed V, obtains the FF filter gain Kff from the vehicle speed V by using the characteristic shown in FIG. 10, and transforms the target steering angle θt into the steering angular velocity command value ωrefb by using the expression 2 (Step S780). The steering angular velocity command values ωrefa and ωrefb are added at the adding section 345 (Step S790), and the steering angular velocity command value ωref1 is outputted. The steering angular velocity command value ωref1 is inputted into the adding section 393.

Meanwhile, the steering intervention compensating section 350 inputs the vehicle speed V and the steering torque Tt, the vehicle speed V is inputted into the compensation map section 353, and the steering torque Tt is inputted into the steering intervention phase compensating section 351. The steering intervention phase compensating section 351 transforms the steering torque Tt into the steering torque Tt1 by the phase compensation (Step S800). The steering torque Tt1 is inputted into the dead band setting section 352. The dead band setting section 352 sets the dead band to the steering torque Tt1 by using the characteristic shown in FIG. 12 (Step S810), and outputs the steering torque Tt2. The steering torque Tt2 and the vehicle speed V are inputted into the compensation map section 353. The compensation map section 353 calculates the steering angular velocity command value ωref2 by using a steering intervention compensation map determined with the vehicle speed V and the steering torque Tt2 based on the characteristic shown in FIG. 13 (Step S820). The steering angular velocity command value ωref2 is inputted into the adding section 393.

The steering angular velocity command values ωref1 and ωref2, which have been inputted into the adding section 393, are added (Step S830), and the added result is outputted as the steering angular velocity command values ωref. The steering angular velocity command values ωref is multiplied by the velocity command gradual-change gain Gfa3 at the multiplying section 392 (Step S840), and the multiplied result is inputted as the steering angular velocity command values ωrefg into the velocity command value variable limiting section 360.

The velocity command value variable limiting section 360 inputs the velocity command gradual-change gain Gfa3 with the steering angular velocity command values ωrefg, and confirms the value of the velocity command gradual-change gain Gfa3 (Step S850). The velocity command value variable limiting section 360 sets the limit values to the limit values shown by "Gfa3 SMALL" in FIG. 14 (Step S860) when the Gfa3 is smaller than the predetermined threshold, and sets the limit values to the limit values shown by "Gfa3 LARGE" (Step S870) when the Gfa3 is larger than or equal to the predetermined threshold. The velocity command value variable limiting section 360 limits the steering angular velocity command values ωrefg by using the set limit values (Step S880), and outputs the target steering angular velocity ωt. The target steering angular velocity ωt is inputted into the steering angular velocity control section 370.

The steering angular velocity control section 370 inputs the actual steering angular velocity ωr and the velocity control gradual-change gain Gfa2 with the target steering angular velocity ωt. The target steering angular velocity ωt is addition-inputted into the subtracting section 374, the actual steering angular velocity ωr is subtraction-inputted into the subtracting section 374, and the deviation ωe between the target steering angular velocity ωt and the actual steering angular velocity ωr is inputted into the gain multiplying section 371 (Step S890). The gain multiplying section 371 multiplies the deviation ωe by the gain Kvi (Step S900), and outputs the operation amount D1. The operation amount D1 is inputted into the integrating section 373. The integrating section 373 calculates the control amount Ir1 by integrating the operation amount D1 (Step S910), and outputs the control amount Ir1 to the multiplying section 376. The multiplying section 376 multiplies the control amount Ir1 by the velocity control gradual-change gain Gfa2 (Step S920), and outputs the control amount Ir3. The control amount Ir3 is addition-inputted into the subtracting section 375. The actual steering angular velocity ωr is inputted also into the gain multiplying section 372. The gain multiplying section 372 multiplies the actual steering angular velocity ωr by the gain Kvp (Step S930), and outputs the control amount Ir2. The control amount Ir2 is subtraction-inputted into the subtracting section 375. At the subtracting section 375, the deviation between the control amounts Ir3 and Ir2 is calculated (Step S940), and is outputted as the steering angle control current command value IrefW to the adding section 394.

The steering torque Tt is inputted also into the steering wheel damping section 380. In the steering wheel damping section 380, the gain section 381 multiplies the inputted steering torque Tt by the gain Kv (Step S950), and outputs the control amount Irv. The control amount Irv is phase-compensated at the damping phase compensating section 382 (Step S960), and the phase compensation result is outputted as the steering angle control current command value IrefV. The steering angle control current command value IrefV is outputted to the adding section 394.

The steering angle control current command values IrefW and IrefV, which have been inputted into the adding section 394, are added (Step S970), and the added result is inputted as the steering angle control current command value IrefP2 into the steering angle control current command value limiting section 390.

The steering angle control current command value limiting section 390 limits the steering angle control current command value IrefP2 by using the limit values of the characteristic shown in FIG. 17, and outputs the steering angle control current command value IrefP1 (Step S980).

Moreover, the order of the operation of the steering angle control section 300 and the operation of the assist control section 230 may be reversed, or the operations may be performed in parallel. In the operation of the steering angle control section 300, the order of the operation to the calculation of the steering angular velocity command value ωref1 and the operation to the calculation of the steering angular velocity command value ωref2, which are inputted into the adding section 393, the order of the operation to the calculation of the steering angle control current command value IrefW and the operation to the calculation of the steering angle control current command value IrefV, which are inputted into the adding section 394, and so on, may be reversed respectively, or both operations may be performed in parallel respectively.

Effects of the present embodiment will be described based on results of simulations.

Figure 22:
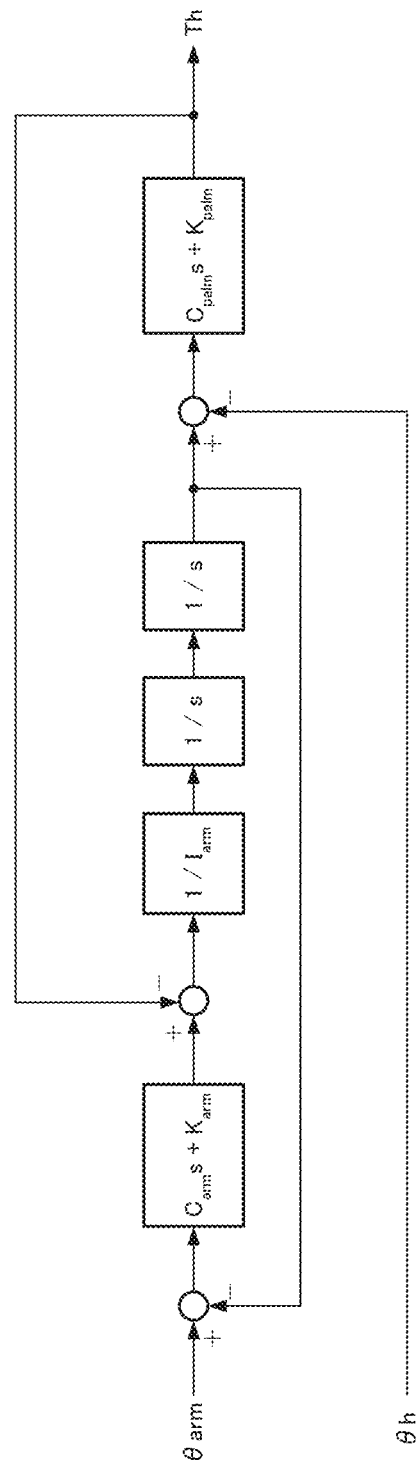
FIG. 22 is a block diagram showing an example of a steering model of a driver used in simulations.

In the simulations, a vehicle motion model and a steering model of a driver are set as a plant model of the plant 400. It is possible to use a model shown in, for example, "Motion and control of an automobile", Masato Abe, Tokyo Denki University, Tokyo Denki University Press, published on Sep. 20, 2009, second impression of first edition, chapter 3 (p. 49-105), chapter 4 (p. 107-130) and chapter 5 (p. 131-147), as the vehicle motion model, and use a model shown in, for example, "A study with respect to an estimation of steering feeling of a vehicle considering a musculoskeletal characteristic of an arm", Daisuke Yokoi, master's thesis, Master's Programs, Mechanical Engineering, Graduate School of Engineering, Mie University, received on Feb. 6, 2007, chapter 2 (p. 3-5) and chapter 3 (p. 6-9) (Reference Document) as the steering model. It is possible to use another model without limited to these. The steering model used in the present simulation is shown in FIG. 22 as a reference. In FIG. 22, $C_{arm}$ and $C_{palm}$ are viscosity coefficients, $K_{arm}$ and $K_{palm}$ are spring constants, and $I_{arm}$ is an inertia moment of an arm. The steering wheel angle θh, which is outputted from a mechanical model (a mechanical transfer characteristic), is inputted to the steering model (a steering transfer characteristic of a driver), and the steering wheel manual input torque Th, which is outputted from the steering model, is outputted to the mechanical model. Hereinafter, a target angle described in Reference Document is referred to a driver's target angle (steering target angle) θarm. Further, the model shown in Reference Document adds a mass system of an arm to a column inertia moment, however, by defining a force applied from a palm to a steering wheel as the steering wheel manual input torque Th, no hindrance occurs even if performing a simulation assuming that the spring constant $K_{palm}$ and the viscosity coefficient $C_{palm}$ which operate between an angle of a palm and the steering wheel angle θh are large enough, and the present simulation is performed in this way. It is also assumed that followability of a motor current to a current command value is fast enough, an influence by the operation of the current control and driving section 250 is slight, and the current command value is equal to the motor current. Furthermore, the vehicle speed is assumed constant.

First, an effect of the steering intervention compensation will be described.

Figure 23:
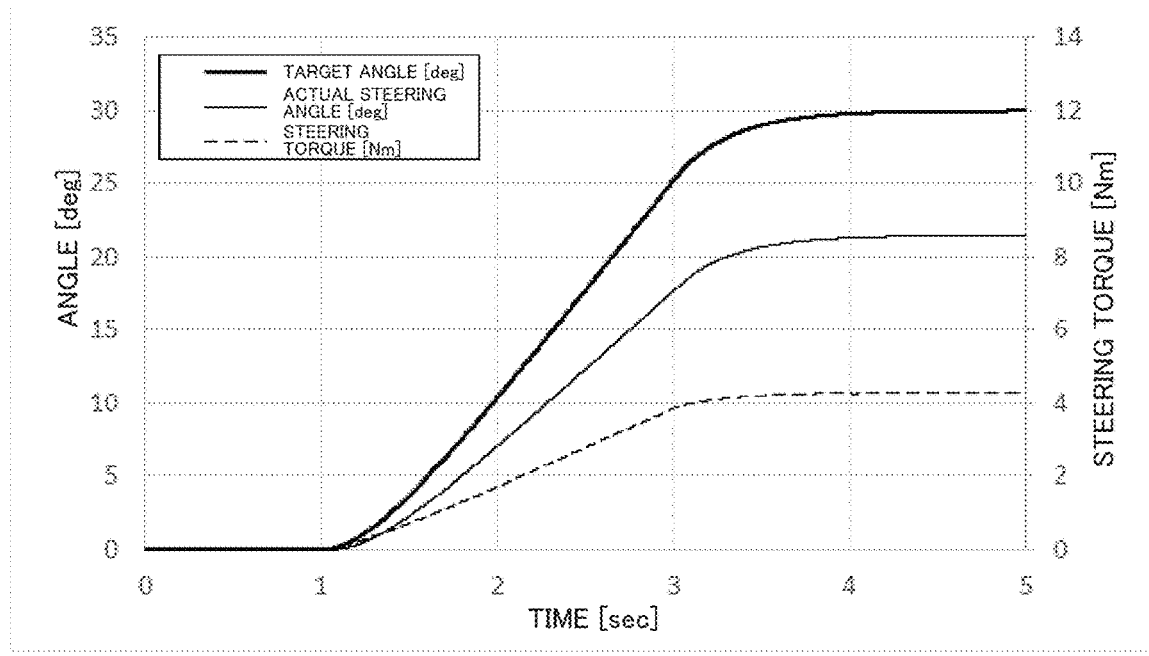
FIG. 23 is a graph showing an example of time responses of a target angle, an actual steering angle and a steering torque in a simulation with respect to steering intervention compensation.

Assuming the steering angle command value θref to be constant at 0 [deg], a simulation of the automatic steering where the driver's target angle θarm is inputted is performed. As a reference, time responses of the actual steering angle θr and the steering torque Tt to a time change of the driver's target angle θarm in a simulation considering the steering model of the driver under the same conditions, are shown in FIG. 23. In FIG. 23, the vertical axis indicates an angle [deg] and a steering torque [Nm], the horizontal axis indicates a time [sec], the thick solid line shows the driver's target angle θarm, the thin solid line shows the actual steering angle (the steering wheel angle in the present embodiment) θr, and the broken line shows the steering torque Tt. Moreover, in FIG. 23, the assist control output gradual-change gain Gft1 is 0%, that is, the assist control does not operate. Further, FIG. 23 shows an example of a simulation for describing a situation where the actual steering angle θr and the steering torque Tt are changed as the driver's target angle θarm is changed.

With respect to changes of the actual steering angle θr and the steering torque Tt in the case of inputting the driver's target angle θarm like this, the case of performing velocity control by a PI-control without the steering intervention compensation and the case of performing the steering intervention compensation are compared. In the former case, the assist control output gradual-change gain Gft1 and the assist map gradual-change gain Gft2 are set to 100% for comparison with the present embodiment, and difference between the integral methods is verified. In the latter case, the assist control output gradual-change gain Gft1 is set to 0%. Further, in a conventional prior art (for example, Patent Document 1), an assist control command value is 0 [deg] in the steering control before the switching, however, since the steering intervention in this case is presumed to be more difficult than in the former case, this case is omitted.

Figure 24:
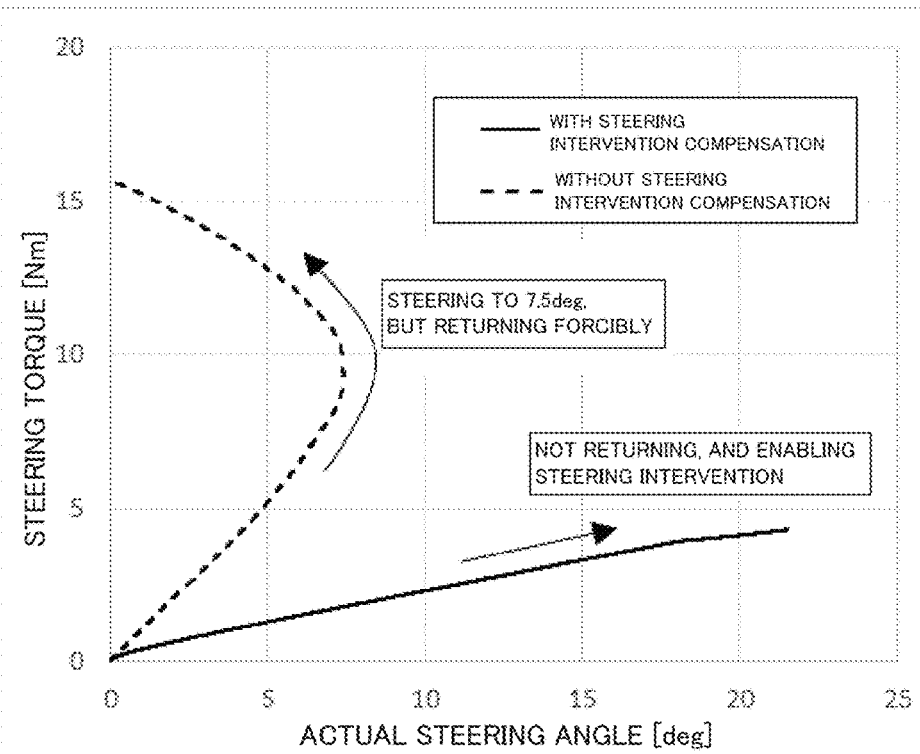
FIG. 24 is a graph showing an example of changing the actual steering angle and the steering torque in the simulation with respect to the steering intervention compensation.

A result of the simulation is shown in FIG. 24. The vertical axis indicates a steering torque [Nm], the horizontal axis indicates an actual steering angle [deg], the broken line shows the case without the steering intervention compensation, and the solid line shows the case with the steering intervention compensation. In the steering intervention compensating section 350, the width of the dead band is set to zero, and the steering intervention compensation map is set so as to linearly change from an origin (that is, this is the same as the case of multiplying the steering torque by the constant gain).

As shown by the broken line in FIG. 24, in the case without the steering intervention compensation, the steering can be performed until the actual steering angle θr becomes 7.5 [deg], however, since a velocity deviation (a deviation between the steering angular velocity command value and the actual steering angular velocity) is continuously stored by the influence of the integral of the PI-control in the velocity control, the steering forcibly returns to the position corresponding to the steering angle command value θref (=0 [deg]) eventually. Moreover, a very large steering torque being larger than or equal to 15 [Nm] occurs, and the steering by the driver becomes difficult.

On the other hand, as shown by the solid line in FIG. 24, in the case with the steering intervention compensation, the steering can be performed until the actual steering angle θr becomes about 22 [deg], and does not return to the position corresponding to the steering angle command value θref (=0 [deg]). This is because the steering angular velocity command value ωref2 outputted from the steering intervention compensating section 350 is added to the steering angular velocity command value ωref1 outputted from the position control section 340, and the velocity deviation, which is a difference value the steering angular velocity command value ωref and the actual steering angular velocity ωr in the steering state, balances in the vicinity of 0. Thus, the function of the steering intervention compensating section 350 enables the steering intervention by the driver. Further, an increase in a gain of an output from the steering intervention compensating section 350 enables easier steering.

Next, an effect of the dead band in the steering intervention compensation will be described.

Figure 25:
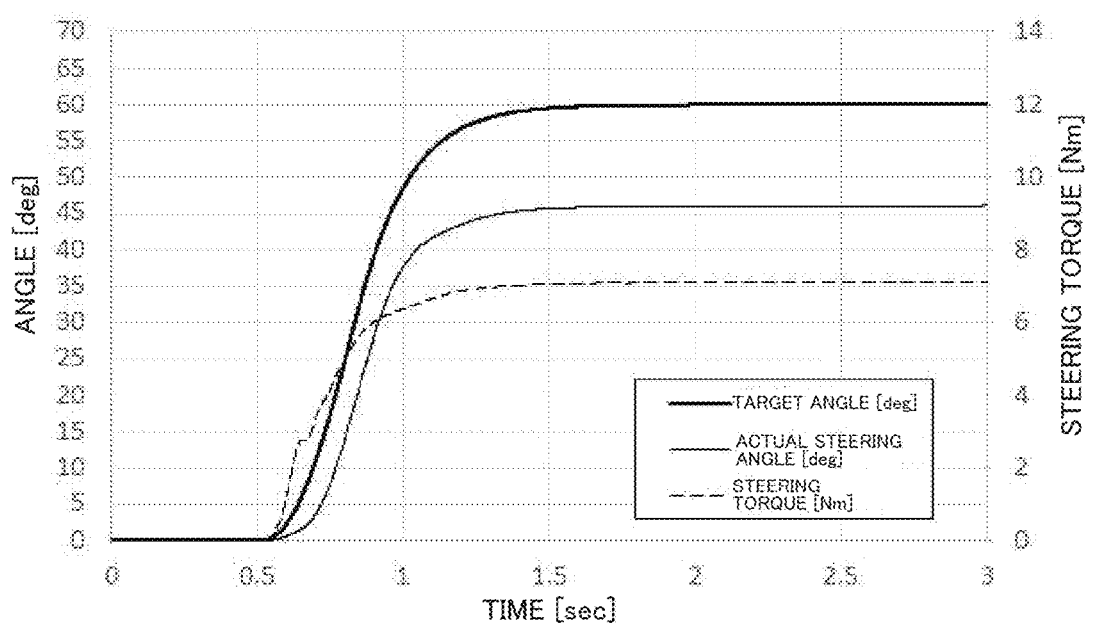
FIG. 25 is a graph showing an example of time responses of a target angle, an actual steering angle and a steering torque in a simulation with respect to the dead band.

Assuming that the steering for emergency avoidance is performed, the simulation is performed by inputting the driver's target angle θarm as shown in FIG. 25. In FIG. 25 as well as FIG. 23, the vertical axis indicates the angle [deg] and the steering torque [Nm], the horizontal axis indicates the time [sec], the thick solid line shows the driver's target angle θarm, and the thin solid line and the broken line show the time responses of the actual steering angle θr and the steering torque Tt to the time change of the driver's target angle θarm, respectively. As shown in the thick solid line of FIG. 25, the driver's target angle θarm rises from 0.5 [sec] and changes up to 60 [deg].

Figure 26:
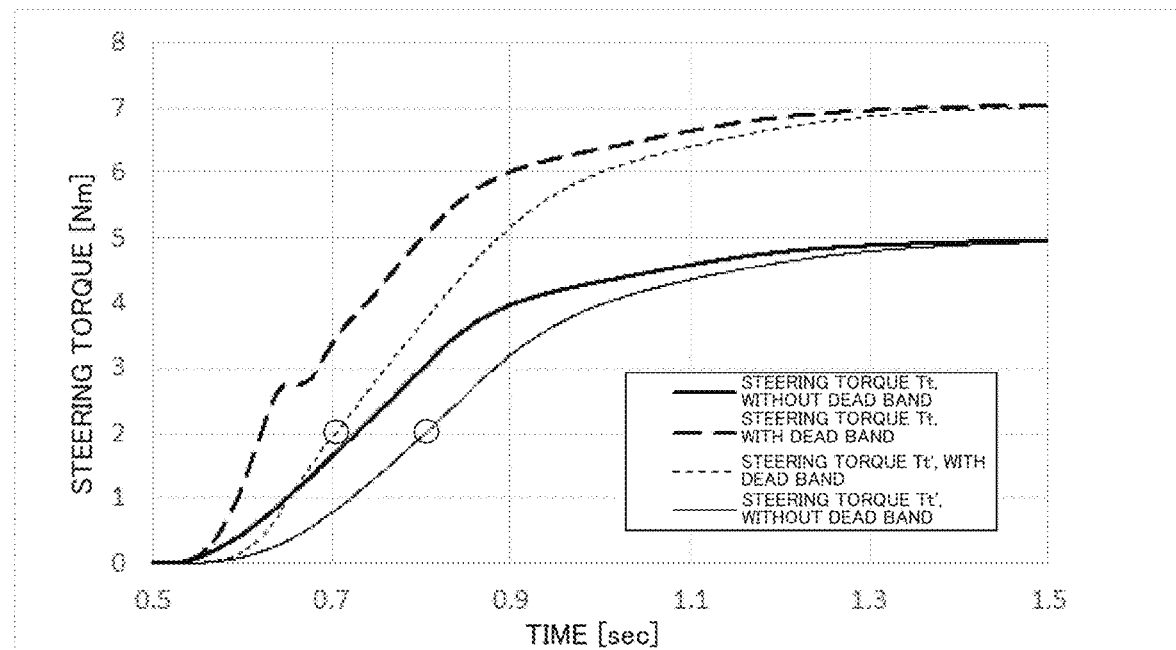
FIG. 26 is a graph showing a result of time response of the steering torque in the simulation with respect to the dead band.

In the case that such a driver's target angle θarm is inputted, the case that positive and negative thresholds having +2.5 Nm and −2.5 Nm of the steering torque Tt1 are set as the dead band is compared with the case of no dead band. The comparison result is shown in FIG. 26. The manual input judging section 223 in the switch judging and gradual-change gain generating section 220 smooths the steering torque Tt by using the smoothing filter section 225 where the primary LPF whose cutoff frequency is 1.5 Hz and the primary LPF whose cutoff frequency is 3.0 Hz are connected in series. When the absolute value |Tt'| of the smoothed steering torque Tt1 is larger than or equal to the threshold Tth3 that is set to 2 [Nm], it is judged that "manual input is performed (third level manual input is performed)".

In FIG. 26, the vertical axis indicates the steering torque [Nm], the horizontal axis indicates the time [sec], the thick solid line shows the steering torque Tt in the case without the dead band, the broken line shows the steering torque Tt in the case with the dead band, the dotted line shows the steering torque Tt1 in the case with the dead band, and the thin solid line shows the steering torque Tt1 in the case without the dead band. In FIG. 26, the portions that are enclosed in the circles are the time when the absolute value of the steering torque Tt1 reaches the threshold Tth3. The timings when "the manual input is performed" is judged are about 0.7 [sec] in the case with the dead band and about 0.8 [sec] in the case without the dead band. The case with the dead band can be verified by about 0.1 [sec] faster than the case without the dead band. Thus, by disposing the dead band, faster judgement can be performed.

Next, an effect for a steering wheel vibration occurring in the steering angle control performed during the automatic steering in the case of performing only the steering angle control without the steering intervention by the driver (the steering wheel manual input torque Th=0 [Nm]) and the steering intervention compensation, will be described.

Before describing the effect for the steering wheel vibration, followability to the steering angle command value θref and an effect by the reference model and the FF filter at the position control section 340 will be described in order to describe a situation where the actual steering angle θr follows the steering angle command value θref. Even in the simulation for verifying the present effects, in order to verify only the steering angle control characteristic, setting where neither the steering intervention by the driver nor the steering intervention compensation is performed is adopted.

Figure 27:
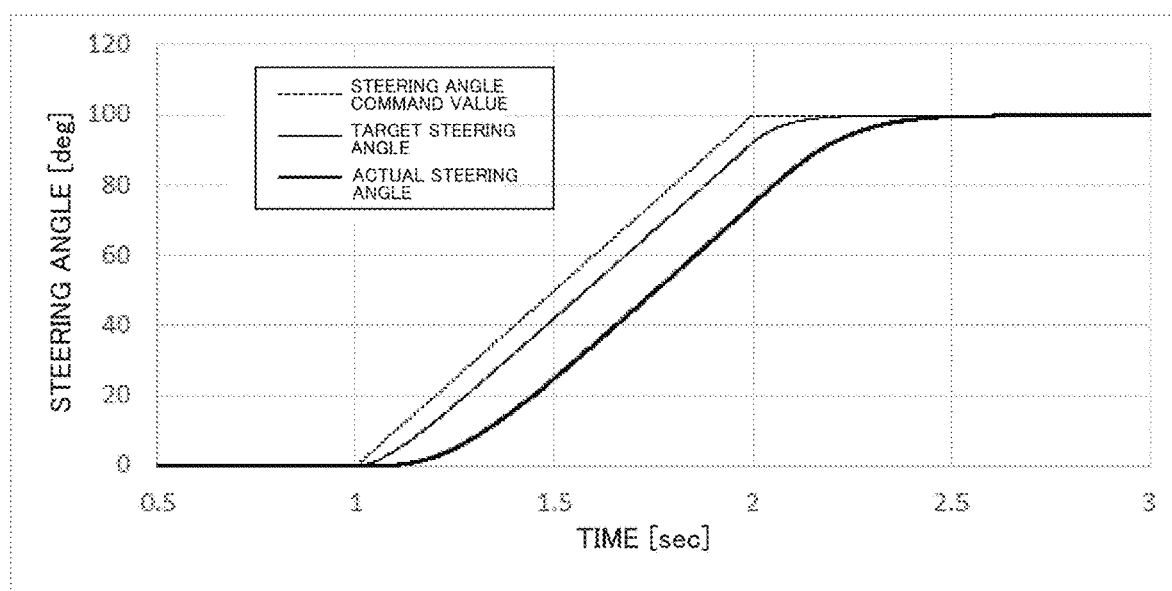
FIG. 27 is a graph showing a result of a simulation with respect to followability to a steering angle command value.

FIG. 27 shows an example of a time response in the case of changing the steering angle command value θref from 0 [deg] to 100 [deg] in a ramp state. In FIG. 27, the vertical axis indicates a steering angle [deg], the horizontal axis indicates a time [sec], and the dotted line shows the steering angle command value θref. Situations of responses of the target steering angle θt outputted from the steering wheel vibration eliminating section 330 having a primary LPF whose cutoff frequency is 2 Hz and the actual steering angle θr to the steering angle command value θref, are shown by the thin solid line and the thick solid line respectively. From FIG. 27, it is found out that the target steering angle θt and the actual steering angle θr follow the steering angle command value θref.

From the above description, it can be said that both the steering intervention and the follow-up of the steering angle during the automatic steering can be achieved.

Figure 28A:
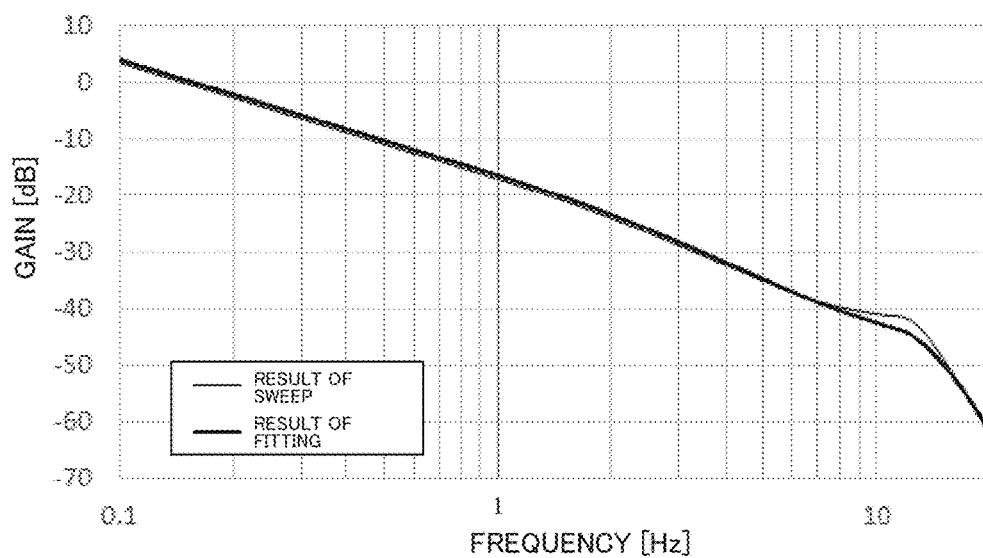
FIGS. 28A and 28B are characteristic diagrams showing an example of a frequency characteristic of a transfer function from a steering angular velocity command value to an actual steering angle in a simulation with respect to a reference model and the FF filter.
Figure 28B:
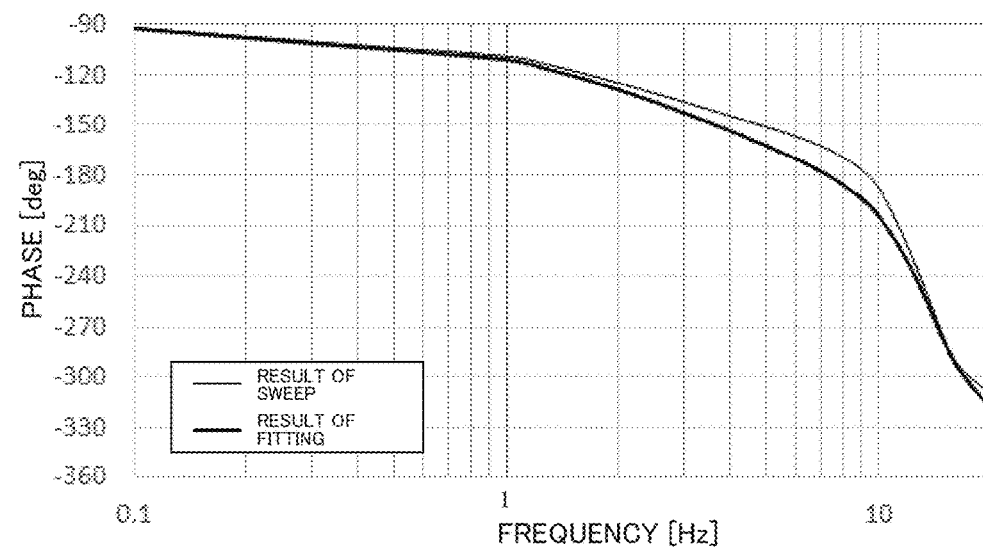

The simulation of the reference model and the FF filter of the position control section 340, first, specifies the frequency characteristic of the transfer function $P_{\omega\theta}$ from the steering angular velocity command value ωref to the actual steering angle θr by a frequency sweep or the identification by fitting with a transfer function. The result is shown in FIGS. 28A and 28B. FIG. 28A shows a gain characteristic of the transfer function $P_{\omega\theta}$ FIG. 28B shows a phase characteristic of the transfer function $P_{\omega\theta}$ the thin solid line shows the result of the frequency sweep, and the thick solid line shows the result of the fitting. Moreover, the transfer function $P_{\omega\theta}$ of the result of the fitting is the following expression 3.

$$P_{\omega\theta} = \frac{\theta r}{\omega_{ref}} = \frac{7316.2}{0.053516s^4 + 3.4464s^3 + 437.25s^2 + 7316.2s} \qquad [\text{Expression 3}]$$

Figure 29A:
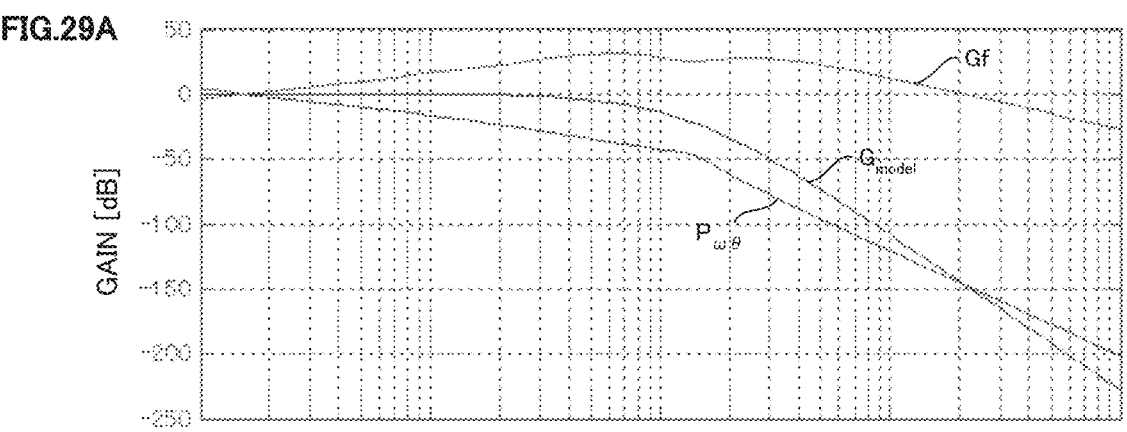
FIGS. 29A and 29B are characteristic diagrams showing an example of frequency characteristics of respective transfer functions in the simulation with respect to the reference model and the FF filter.
Figure 29B:
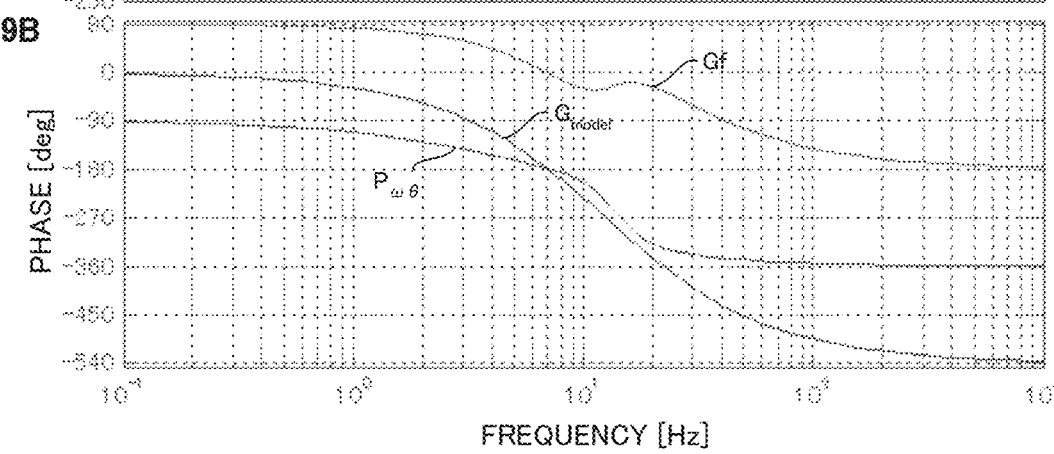

In the transfer function $G_{model}$ of the reference model section 341 defined by the expression 1, the cutoff frequencies $f_{m1}$ and $f_{m2}$ are set to 10 Hz and 20 Hz respectively. The transfer function Gf of the FF filter is calculated based on the expression 2. Frequency characteristics of the transfer function $G_{model}$, the transfer function $P_{\omega\theta}$ and the transfer function Gf of the FF filter are shown in FIGS. 29A and 29B under such settings. FIG. 29A shows gain characteristics, and FIG. 29B shows phase characteristics.

Figure 30:
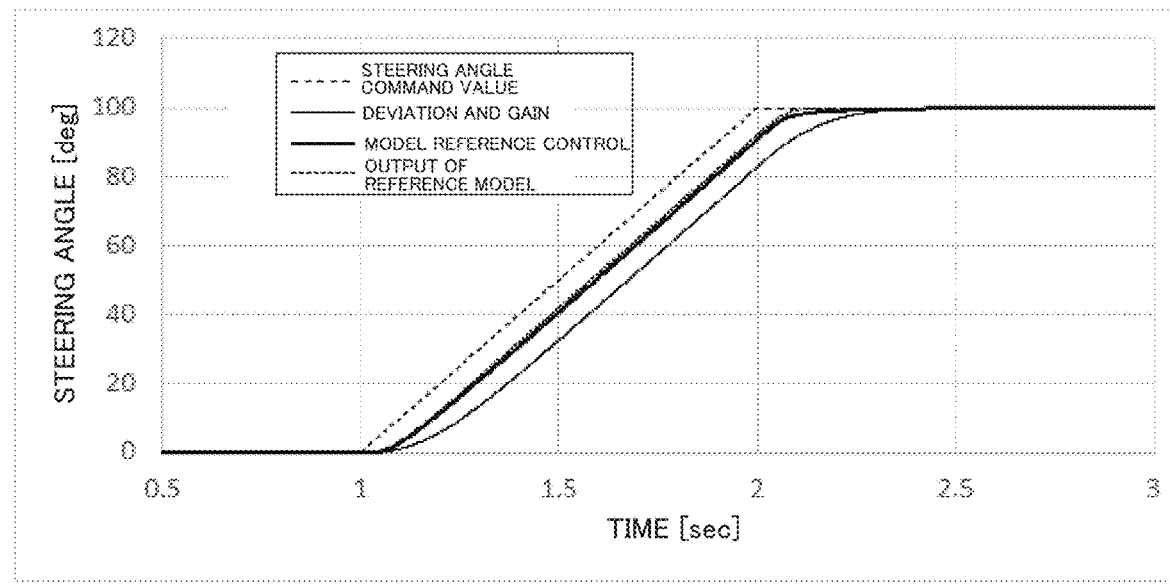
FIG. 30 is a graph showing a result of the simulation with respect to the reference model and the FF filter.

Since the followability of the steering angle control (the followability of the actual steering angle θr to the steering angle command value θref) can be cited as an effect by the reference model and the FF filter, a simulation of changing the steering angle command value θref from 0 [deg] to 100 [deg] in a ramp state at the vehicle speed equal to 60 [km/h] under the above settings, is performed. The result is shown in FIG. 30. In FIG. 30, the vertical axis indicates a steering angle [deg], the horizontal axis indicates a time [sec], and the broken line shows the steering angle command value θref. With respect to this steering angle command value θref, a time response of an actual steering angle calculated based on a value obtained by simply multiplying a steering angle deviation (a deviation between the target steering angle θt and the actual steering angle θr) by a gain, is shown by the thin solid line, a time response of an actual steering angle calculated by the model reference control performed by the reference model and the FF filter in the position control section 340, is shown by the thick solid line, and a time response of the target steering angle θt1 outputted from the reference model section 341 is shown by a dotted line. From FIG. 30, it is found out that the followability is improved by the set reference model and FF filter, and the actual steering angle of the model reference control corresponds well with the target steering angle θt1 being an output of the reference model, compared with the result obtained by simply multiplying the gain, which is shown by the thin solid line. Though the effect by the reference model and the FF filter is shown in FIG. 30, it can be verified that the actual steering angle θr sufficiently follows the steering angle command value θref even in the case of simply multiplying the steering angle deviation by the gain (shown by the thin solid line).

Figure 31:
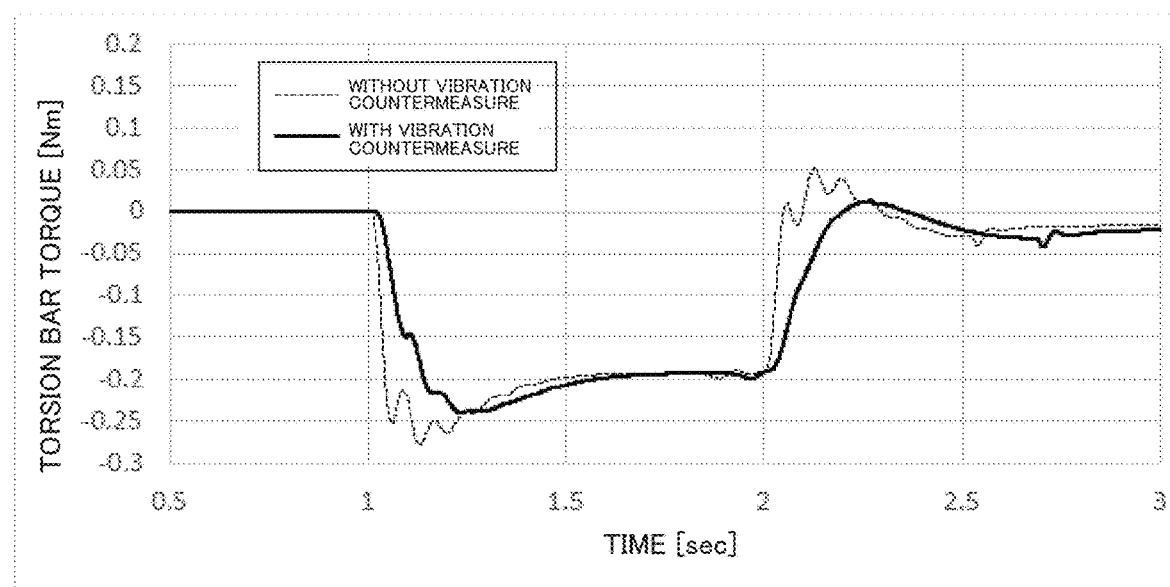
FIG. 31 is a graph showing a result of a simulation with respect to steering wheel vibration.

In the simulation for verifying the effect for the steering wheel vibration, a difference of a time response of a torsion bar torque between with and without the steering wheel vibration eliminating section 330 and the steering wheel damping section 380, is examined in the case of performing the steering angle control with respect to the same steering angle command value θref as shown in FIG. 30. The steering wheel vibration eliminating section 330 uses the primary LPF whose cutoff frequency is 2 Hz. The steering wheel damping section 380 uses the gain Kv by which a torque converted into a column shaft becomes equivalent to 10 Nm for the torsion bar torque being 1 Nm, and performs phase advance compensation by a primary filter where a cutoff frequency of a numerator is 10 Hz and a cutoff frequency of a denominator is 20 Hz. The result is shown in FIG. 31. In FIG. 31, the vertical axis indicates a torsion bar torque [Nm], the horizontal axis indicates a time [sec], the solid line shows the case with the vibration countermeasure by the steering wheel vibration eliminating section 330 and the steering wheel damping section 380, and the dotted line shows the case without the vibration countermeasure. From FIG. 31, it is found out that the steering wheel vibration is suppressed by the steering wheel vibration eliminating section 330 and the steering wheel damping section 380.

As the last of the description of the effect, an effect for a problem that the integral value of the I-control accumulates excessively by increase in the steering angular velocity at the start of the steering angle control and the steering angle control command value may become excessive (a problem in Patent Document 3 and so on), will be described.

Figure 32:
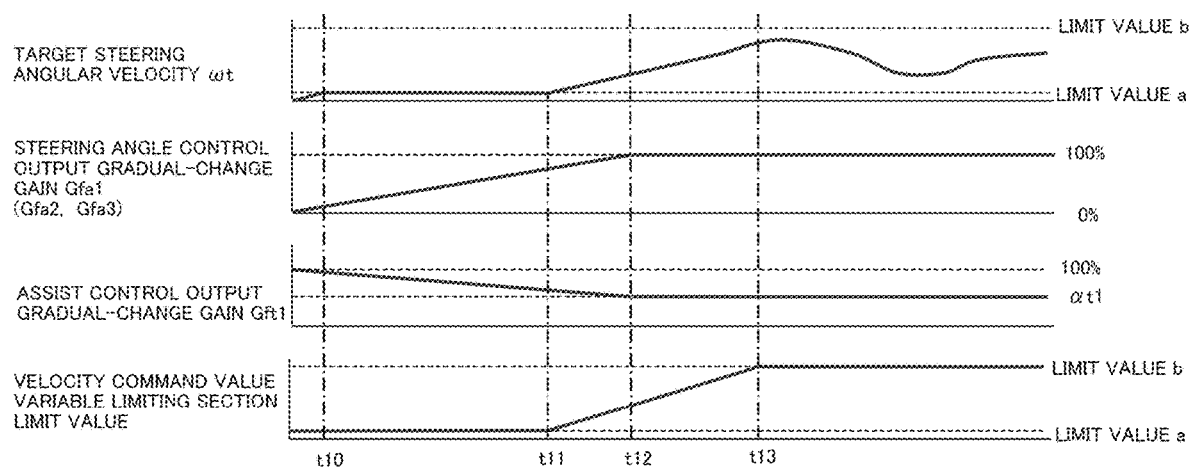
FIG. 32 is a graph showing an example (the first embodiment) of changing a target steering angular velocity, gradual-change gains and a limit value in the case of transferring a steering state.

FIG. 32 shows time changes of the target steering angular velocity ωt, the gradual-change gains and the limit value used at the velocity command value variable limiting section 360 when the state changes from the manual steering state to the automatic steering state. Assuming that the velocity control gradual-change gain Gfa2 and the velocity command gradual-change gain Gfa3 are changed synchronizing with the steering angle control output gradual-change gain Gfa1, only the Gfa1 is shown in FIG. 32. Assuming that the assist control output gradual-change gain Gft1 and the assist map gradual-change gain Gft2 are also changed synchronizing with the Gfa1, only the situation of the change of the Gft1 is shown as a reference. Further, the magnitude of the limit value used at the velocity command value variable limiting section 360 is set so as to be fixed at a small value when the Gfa3 is smaller than the predetermined threshold, and gradually increase when the Gfa3 is larger than or equal to the predetermined threshold.

The steering angular velocity command value ωref is multiplied by the velocity command gradual-change gain Gfa3, is limited at the velocity command value variable limiting section 360, and becomes the target steering angular velocity ωt. When the transference from the manual steering state to the automatic steering state starts, the Gfa3 gradually increases from 0, and the target steering angular velocity ωt also gradually increases from 0. After that, when the steering angular velocity command value ωrefg inputted into the velocity command value variable limiting section 360 reaches the limit value (the limit value "a") at the time point t10, the target steering angular velocity ωt becomes constant at the limit value "a", however, the Gfa3 continuously increases. When the Gfa3 becomes the predetermined threshold at the time point t11, the limit value gradually increases, and the target steering angular velocity ωt also increases correspondingly. When the Gfa3 becomes 100% at the time point t12, in addition, the limit value becomes the limit value "b" at the time point t13, the target steering angular velocity ωt changes within the limit value "b". Since the target steering angular velocity ωt is limited by the limit value "a" and is limited by multiplication of the velocity control gradual-change gain Gfa2 at the steering angular velocity control section 370 between the time points t10 and t13, excessive accumulation of the integral value in the steering angular velocity control section 370 is suppressed, and the current command value causing uncomfortable feeling to a driver as an output of the steering angle control can be reduced. After the transition of the limit value is ended (that is, after the time point t13), the steering angular velocity command value ωref is not limited by the Gfa3 and the velocity command value variable limiting section 360, and a signal in the steering angular velocity control section 370 is not also limited by the Gfa2, so that it is possible to shift to the normal steering angle control.

A second embodiment of the present invention will be described.

In the second embodiment, the steering torque is filter-processed by a plurality of smoothing filters having the different characteristic, and the manual input judgment is performed based on the steering torque (the smoothed steering torque) calculated by the respective filter processes, at the manual input judging section in the switch judging and gradual-change gain generating section. Thereby, for example, by using the high-speed response filter to the outputted signal in addition to using the filter for removing the noise components in the high frequency band, the response to the abrupt manual input torque for emergency avoidance and so on can be performed, and the accuracy in the manual input judgment can be improved. The plural thresholds, as with the first embodiment, can be adapted to the respective smoothed steering torques. Thereby, appropriate handling in harmony with the magnitude of the manual input torque can be performed.

Figure 33:
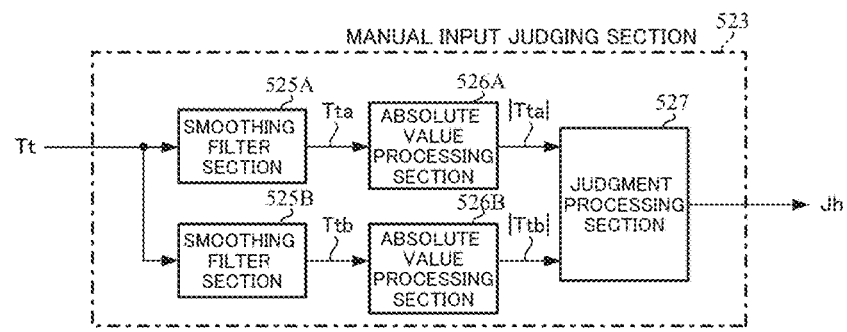
FIG. 33 is a block diagram showing a configuration example (a second embodiment) of a manual input judging section.

FIG. 33 shows the configuration example of a manual input judging section 523 in the second embodiment. Compared with the manual input judging section 223 in the first embodiment shown in FIG. 5, two smoothing filter sections and two absolute value processing sections are provided.

Smoothing filter sections 525A and 525B have smoothing filters, smooth the steering torque Tt by a smoothing filer A and a smoothing filter B respectively, and output steering torques (smoothed steering torques) Tta and Ttb obtained after the smoothing respectively. The smoothing filter A has a slower response to the outputted signal than the smoothing filter B, and has a more excellent characteristic in removing the noise components in the high frequency band than the smoothing filter B. The smoothing filter B has a higher response to the outputted signal than the smoothing filter A, and has a little inferior characteristic in removing the noise components in the high frequency band to the smoothing filter A. By concurrently using the smoothing filter A and the smoothing filter B whose characteristic is a high-speed response, the judgment in the case of performing the steering by the manual input can be easier performed responding to the abrupt manual input torque in steering for emergency avoidance and so on. The steering torques Tta and Ttb are inputted into absolute value processing sections 526A and 526B respectively. The absolute processing section 526A outputs the absolute value (the absolute value data) |Tta| of the steering torque Tta to a judgment processing section 527. The absolute processing section 526B outputs the absolute value (the absolute value data) |Ttb| of the steering torque Ttb to the judgment processing section 527. The judgment processing section 527 judges three kinds of judgment that "the manual input is performed" and one kind of judgment that "manual input is not performed" by using plural predetermined thresholds TthA1, TthA2, TthA3 and TthB ($0 \leq TthA1 \leq TthA2 \leq TthA3 \leq TthB$). Specifically, in the case that "the absolute value |Tta| is equal to or more than the threshold TthA3" or "the absolute value |Ttb| is equal to or more than the threshold TthB", the judgment processing section 527 judges "third level manual input is performed". In the case that "the absolute value |Tta| is equal to or more than the threshold TthA2 and is less than the threshold TthA3", the judgment processing section 527 judges "second level manual input is performed". In the case that "the absolute value |Tta| is equal to or more than the threshold TthA1 and is less than the threshold TthA2", the judgment processing section 527 judges "first level manual input is performed". In the case that "the absolute value |Tta| is less than the threshold TthA1", the judgment processing section 527 judges "manual input is not performed". The judgment result is outputted as the manual input judgment signal Jh.

If the smoothing filter sections 525A and 525B have the above filter characteristics, a filter other than the smoothing filter may be used. Further, in harmony with the manual input torque in which the filter is responded, the manual input judging section 523 may have three filter sections or more. Although the judgment processing section 527 performs the judgment by using the four thresholds, the number of the thresholds is not limited to four, the judgment may be performed by using the thresholds whose number is not four, and plural thresholds to the steering torque Ttb may be used. Thereby, more flexible judgment can be performed.

Compared with the operating example of the first embodiment, an operation of the manual input judging section of an operating example of the second embodiment is different from that of the operating example of the first embodiment.

Figure 34:
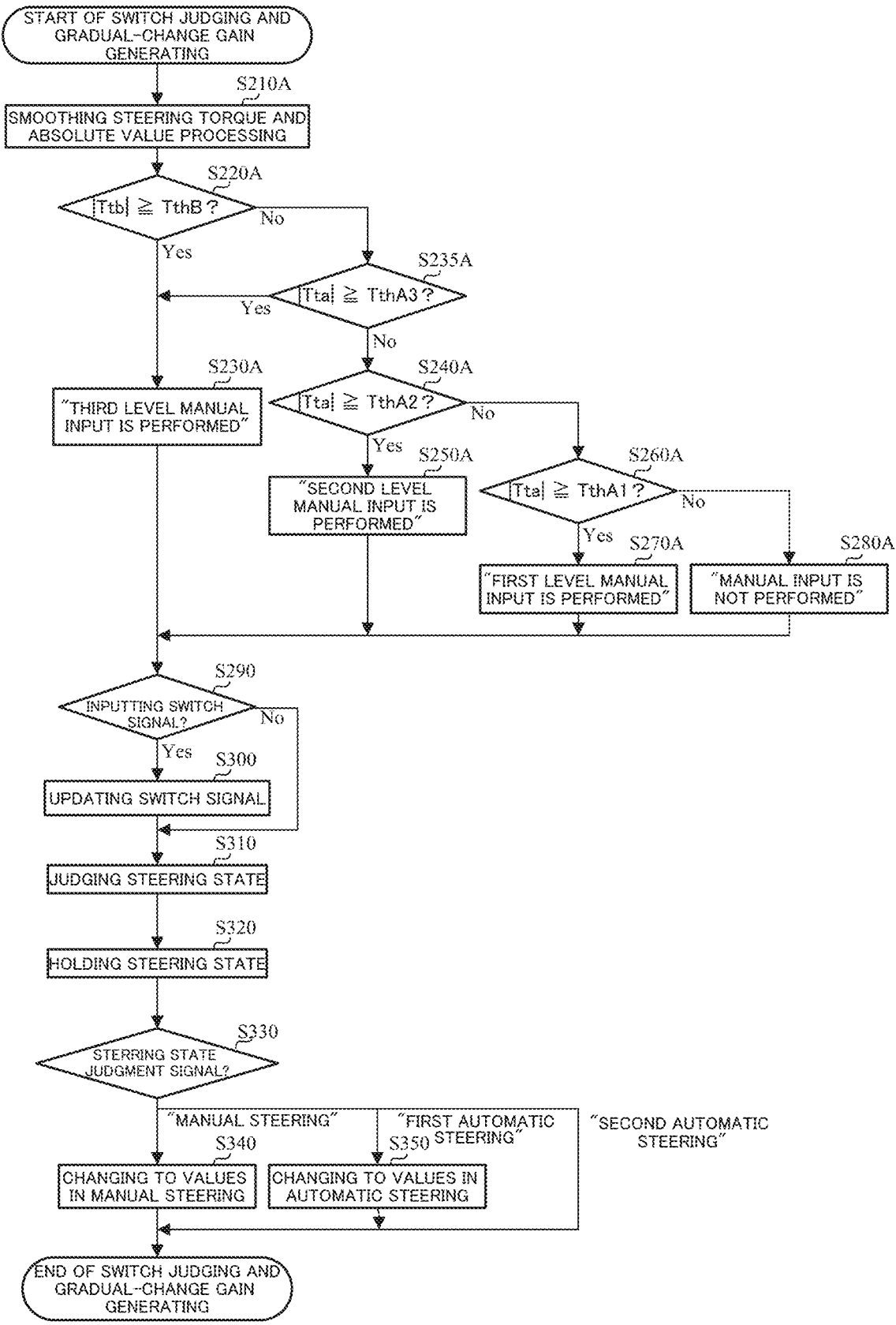
FIG. 34 is a flowchart showing an operating example (the second embodiment) of a switch judging and gradual-change gain generating section.

An operating example of the switch judging and gradual-change gain generating sect ion comprising the manual input judging section 523 in the second embodiment will be described with reference to the flowchart of FIG. 34.

The inputted steering torque Tt is inputted into the manual input judging section 523. The steering torque Tt is smoothed at the smoothing filter sections 525A and 525B in the manual input judging section 523, and the absolute values |Tta| and |Ttb| of the steering torques Tta and Ttb after smoothing are obtained at the absolute value processing sections 526A and 526B in the manual input judging section 523 (Step S210A). The absolute values |Tta| and |Ttb| are inputted into the judgment processing section 527. In the case that "the absolute value |Ttb| is equal to or more than the threshold TthB" (Step S220A), the judgment processing section 527 judges "third level manual input is performed" (Step S230A). In the case that "the absolute value |Ttb| is less than the threshold TthB" (Step S220A), and "the absolute value |Tta| is equal to or more than the threshold |TthA3|" (Step S235A), the judgment processing section 527 judges "third level manual input is performed" (Step S230A). In the case that "the absolute value |Ttb| is less than the threshold TthB" (Step S220A), and "the absolute value |Tta| is equal to or more than the threshold TthA2 and is less than the threshold TthA3" (Step S240A), the judgment processing section 527 judges "second level manual input is performed" (Step S250A). In the case that "the absolute value |Ttb| is less than the threshold TthB" (Step S220A), and "the absolute value |Tta| is equal to or more than the threshold TthA1 and is less than the threshold TthA2" (Step S260A), the judgment processing section 527 judges "first level manual input is performed" (Step S270A). In the case that "the absolute value |Ttb| is less than the threshold TthB" (Step S220A), and "the absolute value |Tta| is less than the threshold TthA1" (Step S260A), the judgment processing section 527 judges "manual input is not performed" (Step S280A). The judgment result is outputted to the steering state judging section 224 as the manual input judgment signal Jh. The operations (from Step S290 to Step S350) after that are the same as the first embodiment.

A third embodiment of the present invention will be described.

The manual input judging section performs the manual input judgment by using the steering torque in the first and second embodiments. In the third embodiment, the manual input judgment is performed by using the steering torque and an error between the estimated steering angle and the actual steering angle. Comparing with the second embodiment, in the third embodiment, the manual input judgment using the error between the estimated steering angle and the actual steering angle is added. Moreover, the manual input judgment may be performed by using only the error between the estimated steering angle and the actual steering angle.

Figure 35:
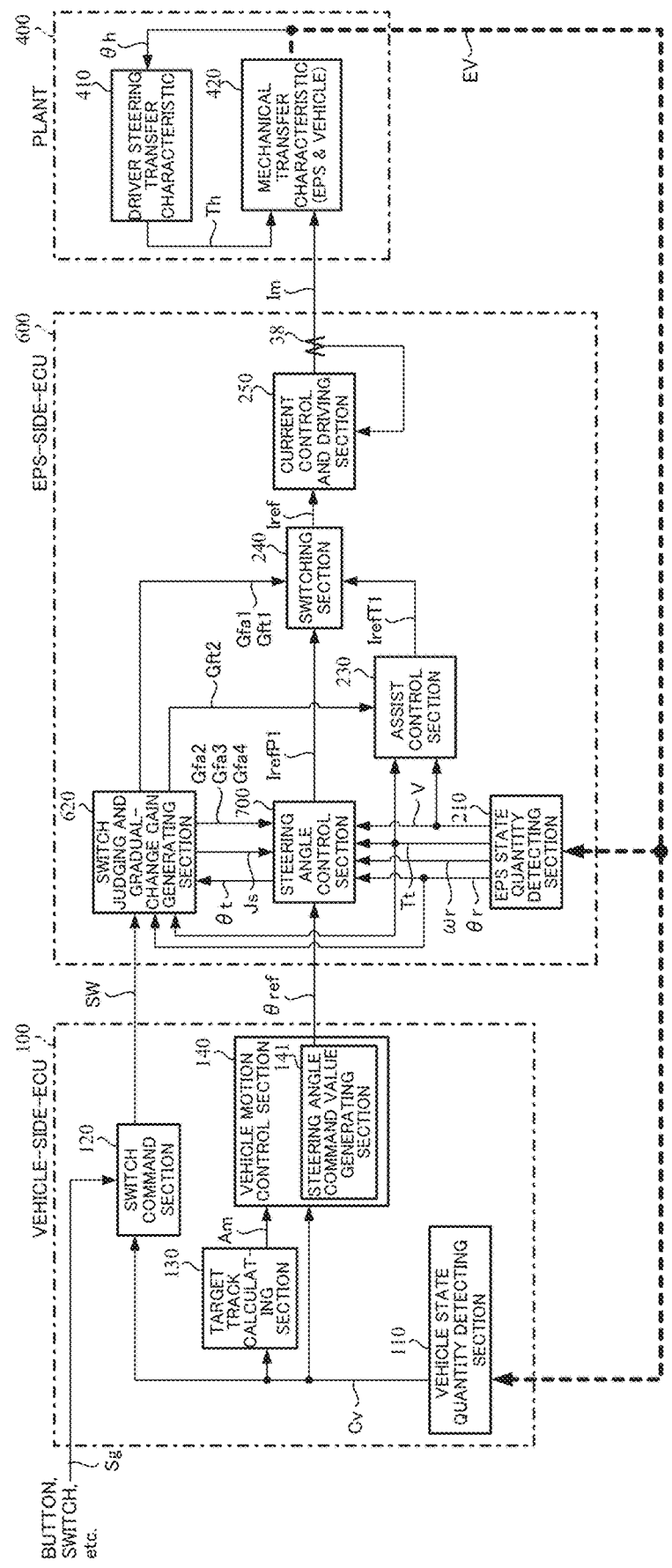
FIG. 35 is a block diagram showing a configuration example (a third embodiment) of a whole vehicle system relating to the present invention.

FIG. 35 shows the configuration example of the whole vehicle system in the third embodiment. The steering angle control current command value IrefP1 and the target steering angle θt are outputted from a steering angle control section 700. The target steering angle θt is inputted into a switch judging and gradual-change gain generating section 620. The configuration and the operation of the steering angle control section 700 are the same as those of the steering angle control section 300 in the second embodiment, except that the target steering angle θt from the steering wheel vibration eliminating section 330 is outputted to the position control section 340 and the switch judging and gradual-change gain generating section 620.

Figure 36:
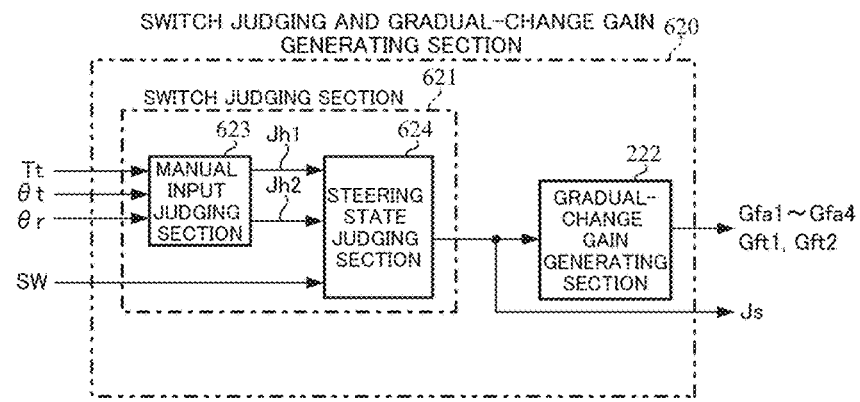
FIG. 36 is a block diagram showing a configuration example (the third embodiment) of a switch judging and gradual-change gain generating section.

FIG. 36 shows the configuration example of the switch judging and gradual-change gain generating section 620 in the third embodiment. The switch judging and gradual-change gain generating section 620 comprises a switch judging section 621 and the gradual-change gain generating section 222, and the switch judging section 621 comprises a manual input judging section 623 and a steering state judging section 624. Since the gradual-change gain generating section 222 is the same as that of the second embodiment, the explanation is omitted.

The manual input judging section 623 judges whether manual input is performed or not, by using the steering torque Tt, the actual steering angle θr and the target steering angle θt.

Figure 37:
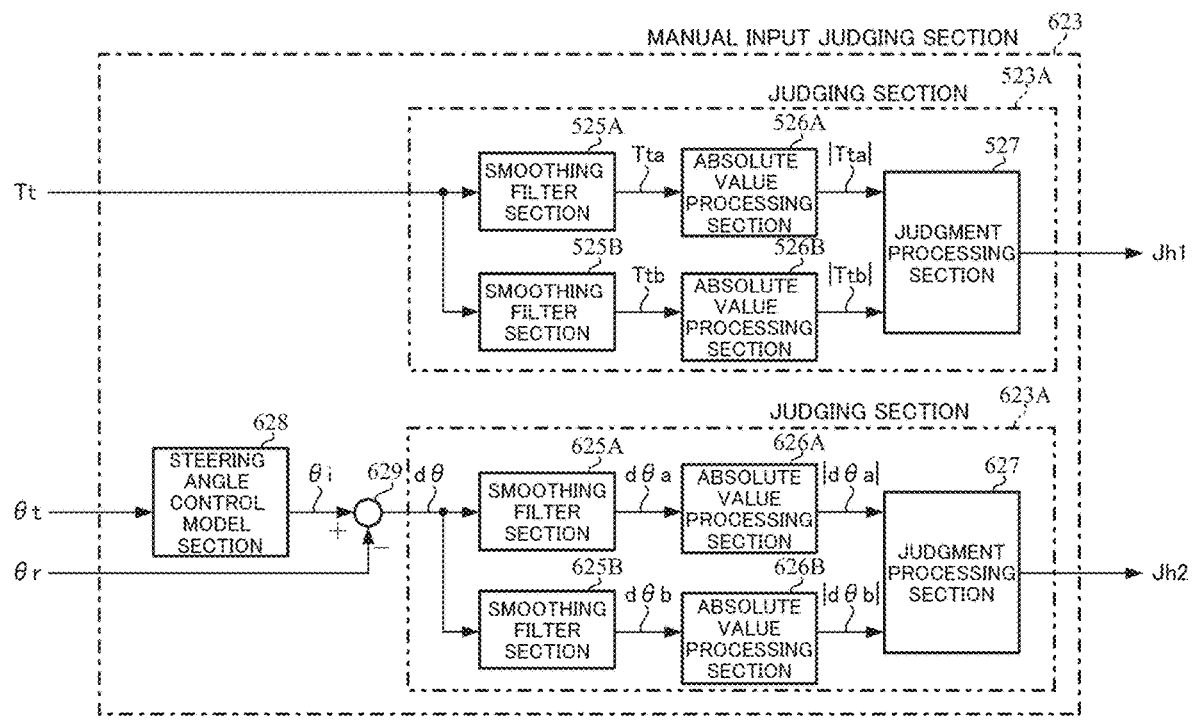
FIG. 37 is a block diagram showing a configuration example (the third embodiment) of a manual input judging section.

FIG. 37 shows the configuration example of the manual input judging section 623. Compared with the manual input judging section 523 in the second embodiment shown in FIG. 33, the manual input judging section 623 comprises a judging section 523A whose configuration is the same as that of the manual input judging section 523, a judging section 623A, a steering angle control model section 628 and a subtracting section 629. The judging section 623A comprises smoothing filter sections 625A and 625B, absolute value processing sections 626A and 626B, and a judgment processing section 627.

By using the same operation in the manual input judging section 523, the judging section 523A outputs a manual input judgment signal Jh1 (corresponding to the manual input judgment signal Jh in the second embodiment). Smoothing filters which the smoothing filter sections 525A and 525B have, function as a smoothing filter for a torque. The plural predetermined thresholds are used as a torque threshold in the judgment processing section 527.

The steering angle control model section 628 calculates an estimated steering angle θi from the target steering angle θt, and the estimated steering angle θi is addition-inputted into the subtracting section 629. In order to estimate the actual steering angle θr in the automatic steering state, the steering angle control model section 628 sets a transfer characteristic of the actual steering angle θr to the target steering angle θt, and estimates the actual steering angle by using the transfer characteristic. When a deviation between the estimated steering angle θi, which is the estimated actual steering angle, and the actual steering angle θr is existed, it can be judged that the steering intervention is performed by a driver. The transfer characteristic of the actual steering angle θr to the target steering angle θt is defined by a transfer function, a difference equation (a differential equation), or the like. To simply achieve it, the reference model section 341 in the position control section 340 can be substituted. In the case of estimating the actual steering angle more accurately, the transfer characteristic is obtained by an experiment or a simulation where the target steering angle θt is inputted, the actual steering angle θr is outputted, and a general identification method is used. In the case of more improving the estimation accuracy, the transfer characteristic is identified every vehicle speed. The transfer function may be expressed by an expression based on a plant model which represents a frequency characteristic of a vehicle and an EPS, and a control model which represents a frequency characteristic of the steering angle control section.

The estimated steering angle θi is addition-inputted into the subtracting section 629, and the actual steering angle θr is subtraction-inputted into the subtracting section 629. An error dθ between the estimated steering angle θi and the actual steering angle θr is calculated at the subtracting section 629, and is inputted into the judging section 623A.

The judging section 623A, which has the same configuration and performs the same operation as the judging section 523A, operates to the error dθ, and smooths the error dθ at smoothing filter sections 625A and 625B having a smoothing filter (a smoothing filter for an error). Absolute values (absolute value data) |dθa| and |dθb| of errors after smoothing (smoothed errors) dθa and dθb are obtained at absolute value processing sections 626A and 626B, respectively. The judgment processing section 627 judges three kinds of judgment that "manual input is performed" and one kind of judgment that "manual input is not performed" to the absolute values |dθa| and |dθb| by using plural predetermined thresholds (error thresholds) θthA1, θthA2, θthA3 and θthB (0≤θthA1≤θthA2≤θthA3≤θthB). The smoothing filter sections 625A and 625B have a smoothing filter C and a smoothing filter D respectively. As with the case of the smoothing filter A and the smoothing filter B, the smoothing filter C has a slower response to the outputted signal than the smoothing filter D, and has a more excellent characteristic in removing the noise components in the high frequency band than the smoothing filter D. The smoothing filter D has a higher response to the outputted signal than the smoothing filter C, and has a little inferior characteristic in removing the noise components in the high frequency band to the smoothing filter C. Simply, the characteristic of the smoothing filter C may be the same as that of the smoothing filter A, and the characteristic of the smoothing filter D may be the same as that of the smoothing filter B. The judgment result is outputted as a manual input judgment signal Jh2.

Although the judgment processing sections 527 and 627 perform the judgments by using the four thresholds, the number of the thresholds is not limited to four, and the judgment may be performed by using the thresholds whose number is not four. Thereby, the flexible judgment can be performed.

The steering state judging section 624 judges a steering state by the switch signal SW from the vehicle-side ECU 100 and the manual input judgment signals Jh1 and Jh2. As with the second embodiment, the steering state has "first automatic steering", "second automatic steering" and "manual steering". The "first automatic steering" is corresponding to a normal automatic steering state. The latest steering state is judged based on the switch signal SW, the manual input judgment signals Jh1 and Jh2, and the previous steering state. When judging, the manual input judgment signals Jh1 is assigned to one of the judgment signals α and β, and the manual input judgment signals Jh2 is assigned to the other of the judgment signals α and β. For example, in the case that the manual input judgment signal Jh1 is the judgment signal α, the manual input judgment signal Jh2 is assigned to the judgment signal β. In the case that the manual input judgment signal Jh2 is the judgment signal α, the manual input judgment signal Jh1 is assigned to the judgment signal β. In the present embodiment, the manual input judgment signal Jh1 is the judgment signal α, and the manual input judgment signal Jh2 is the judgment signal β. The judgment is performed as follows.

[Condition A]

In the case that the previous steering state is "first automatic steering" or "second automatic steering", and the switch signal SW is "assist control mode" or the judgment signal α is "third level manual input is performed", the steering state is judged as "manual steering".

[Condition B]

In the case that the previous steering state is "first automatic steering", the switch signal SW is "steering angle control mode", the judgment signal α is "second level manual input is performed", and the judgment signal β is not "third level manual input is performed", the steering state is judged as "second automatic steering".

[Condition C]

In the case that the previous steering state is "second automatic steering", the switch signal SW is "steering angle control mode", the judgment signal α is "first level manual input is performed" or "second level manual input is performed", and the judgment signal β is not "third level manual input is performed", the steering state is judged as "second automatic steering".

[Condition D]

In the case that the previous steering state is "second automatic steering", the switch signal SW is "steering angle control mode", the judgment signal α is "manual input is not performed", and the judgment signal β is "manual input is not performed", the steering state is judged as "first automatic steering".

[Condition E]

In the case that the previous steering state is "manual steering", the switch signal SW is "steering angle control mode", the judgment signal α is "manual input is not performed", and the judgment signal β is "manual input is not performed", the steering state is judged as "first automatic steering".

In detail, the above conditions A to E are represented by the following tables 2 to 4. In the table 2, "-" means any value (that is, this value is not involved in the judgment), and "continue" means that the steering state is not changed. The conditions in the respective columns are coupled with the "AND" condition, and the steering state is judged. The table 3 shows the judgment results in the case that the previous steering state is "first automatic steering" and the switch signal SW is "steering angle control mode" in the table 2. The table 4 shows the judgment results in the case that the previous steering state is "second automatic steering" and the switch signal SW is "steering angle control mode" in the table 2. In the tables 3 and 4, "α" indicates the "judgment signal α" and "β" indicates the "judgment signal β".

TABLE 2

| previous steering state | switch signal SW | judgment signal α | judgment signal β | judgment result |
|---|---|---|---|---|
| first automatic steering | assist control mode | — | — | manual steering |
| first automatic steering | steering angle control mode | | | Note: see table 3 |
| second automatic steering | assist control mode | — | — | manual steering |
| second automatic steering | steering angle control mode | | | Note: see table 4 |
| manual steering | assist control mode | — | — | (continue) |
| manual steering | steering angle control mode | manual input is not performed | manual input is not performed | first automatic steering |
| | | otherwise | otherwise | (continue) |

TABLE 3 previous steering state = "first automatic steering", switch signal SW = "steering angle control mode"

| α | β: third level manual input is performed | β: second level manual input is performed | β: first level manual input is performed | β: manual input is not performed |
|---|---|---|---|---|
| third level manual input is performed | manual steering | manual steering | manual steering | manual steering |
| second level manual input is performed | manual steering | second automatic steering | second automatic steering | second automatic steering |
| first level manual input is performed | manual steering | second automatic steering | (continue) | (continue) |
| manual input is not performed | manual steering | second automatic steering | (continue) | (continue) |

TABLE 4 previous steering state = "second automatic steering", switch signal SW = "steering angle control mode"

| α | β: third level manual input is performed | β: second level manual input is performed | β: first level manual input is performed | β: manual input is not performed |
|---|---|---|---|---|
| third level manual input is performed | manual steering | manual steering | manual steering | manual steering |
| second level manual input is performed | manual steering | (continue) | (continue) | (continue) |

TABLE 4-continued previous steering state = "second automatic steering",
switch signal SW = "steering angle control mode"

| | β | | | |
|---|---|---|---|---|
| α | third level manual input is performed | second level manual input is performed | first level manual input is performed | manual input is not performed |
| first level manual input is performed | manual steering | (continue) | (continue) | (continue) |
| manual input is not performed | manual steering | (continue) | (continue) | first automatic steering |

The steering state is judged in accordance with the above table 2 to table 4, and the judgment result is outputted to the gradual-change gain generating section 222 and the steering angle control section 700 as the steering state judgment signal Js. As with the second embodiment, the steering state may be judged without using the switch signal SW.

Compared with the operating example of the second embodiment, in an operating example of the third embodiment, the steering angle control section 700 outputs the target steering angle θt to the switch judging and gradual-change gain generating section 620. Other than the above operation, an operation of the switch judging and gradual-change gain generating section is different.

Figure 38:
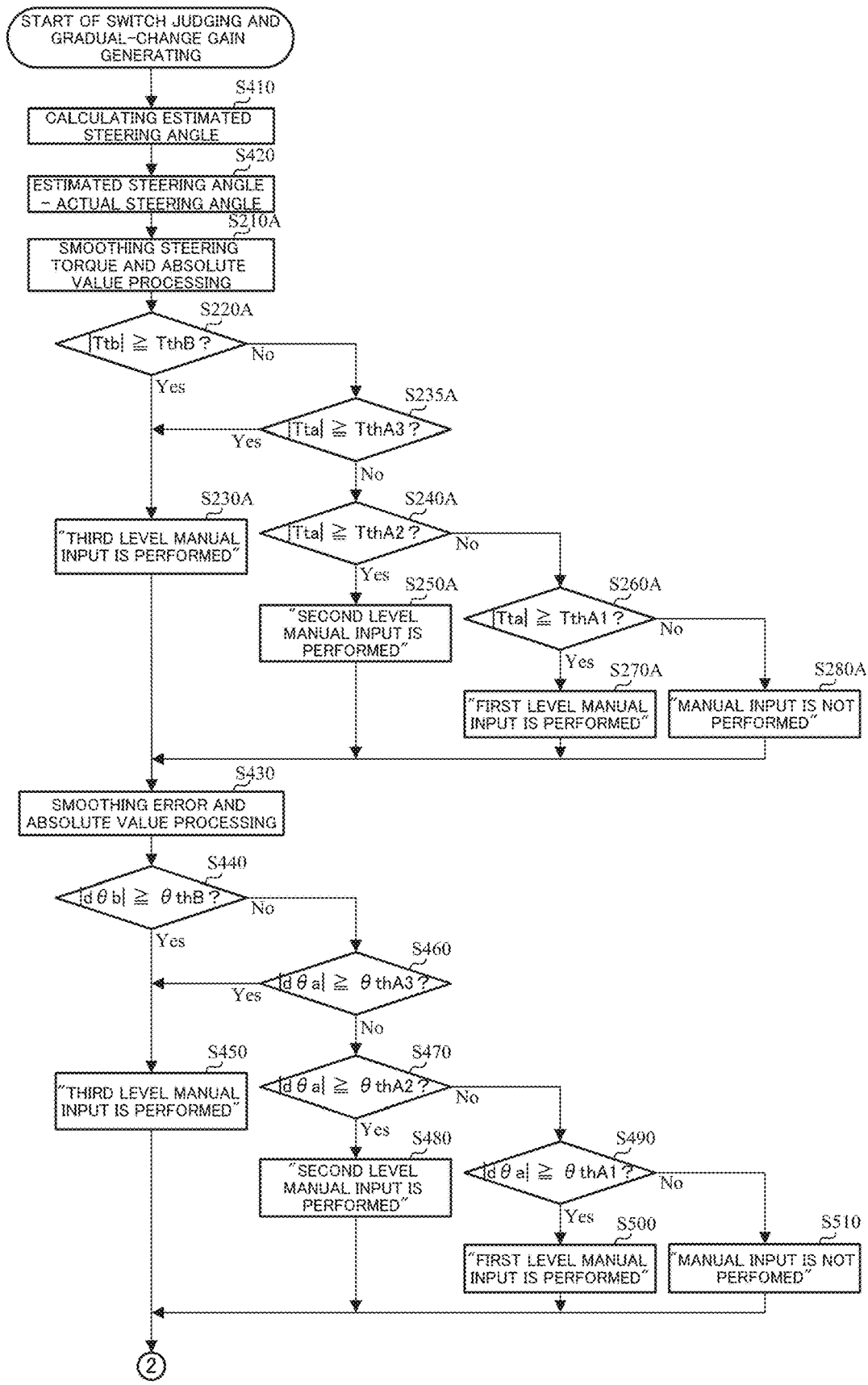
FIG. 38 is a flowchart showing a part of an operating example (the third embodiment) of the switch judging and gradual-change gain generating section.
Figure 39:
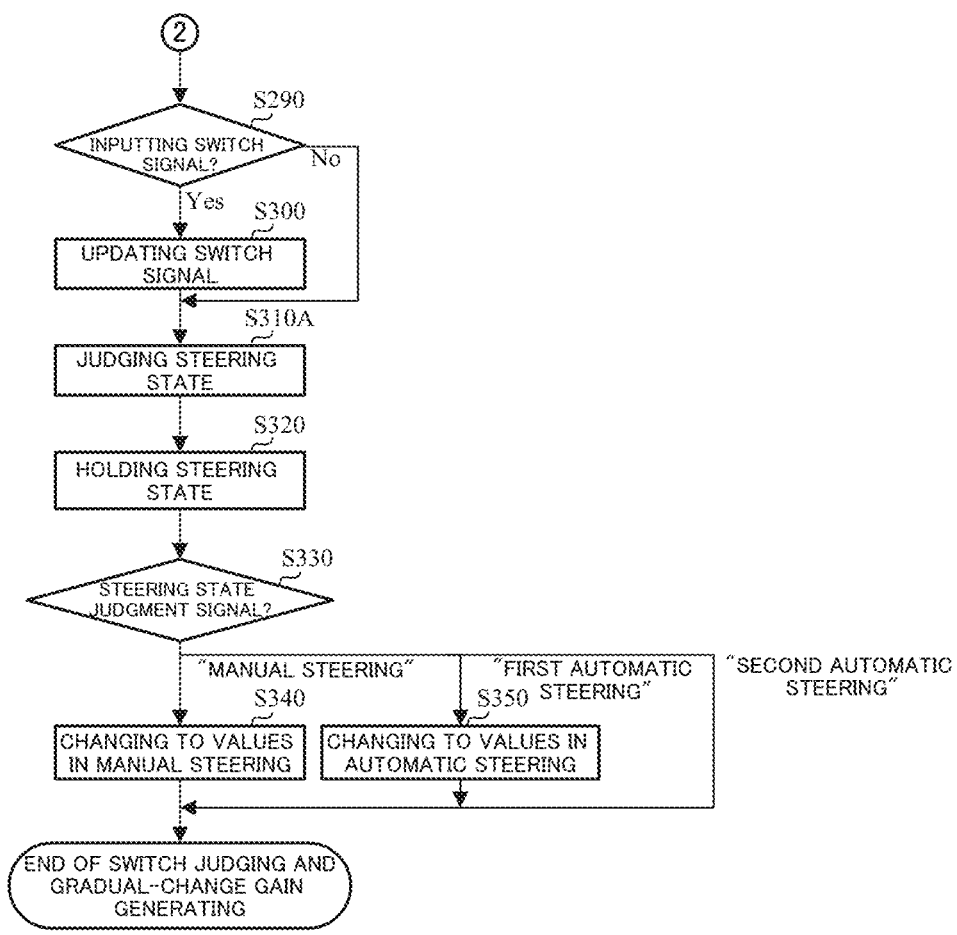
FIG. 39 is a flowchart showing a part of the operating example (the third embodiment) of the switch judging and gradual-change gain generating section.

An operating example of the switch judging and gradual-change gain generating section 620 in the third embodiment will be described with reference to the flowcharts of FIGS. 38 and 39. Moreover, the "manual steering", the "assist control mode" and the "manual steering" are set on the previous steering state, the held switch signal SW and the steering state judgment signal Js as an initial value in the steering state judging section 624, respectively.

The inputted steering torque Tt, the target steering angle θt and the actual steering angle θr are inputted into the manual input judging section 623 in the switch judging section 621. In the manual input judging section 623, the steering torque Tt is inputted into the judging section 623A, the target steering angle θt is inputted into the steering angle control model section 628 and the actual steering angle θr is inputted into the subtracting section 629.

The steering angle control model section 628 calculates the estimated steering angle θi from the target steering angel θt (Step S410). The estimated steering angle θi is addition-inputted into the subtracting section 629, and the actual steering angle θr is subtracted from the estimated steering angle θi (Step S420). The error dθ (=θi−θr) is inputted into the judging section 623A.

The judging section 523A performs the manual input judgment by the same operation as the manual input judging section 523 in the second embodiment, and the judgment result is outputted to the steering state judging section 624 as the manual input judgment signal Jh1 (Steps S210A to S280A).

The error dθ is smoothed at the smoothing filter sections 625A and 625B in the manual input judging section 623A, and the absolute values |dθa| and |dθb| of the errors dθa and dθb after smoothing are obtained at the absolute value processing sections 626A and 626B in the manual input judging section 623A (Step S430). The absolute values |dθa| and |dθb| are inputted into the judgment processing section 627. In the case that "the absolute value |dθb| is equal to or more than the threshold θthB" (Step S440), the judgment processing section 627 judges "third level manual input is performed" (Step S450). In the case that "the absolute value |dθb| is less than the threshold θthB" (Step S440), and "the absolute value |dθa| is equal to or more than the threshold |θthA3|" (Step S460), the judgment processing section 627 judges "third level manual input is performed" (Step S450). In the case that "the absolute value |dθb| is less than the threshold θthB" (Step S440), and "the absolute value |dθa| is equal to or more than the threshold θthA2 and is less than the threshold θthA3" (Step S470), the judgment processing section 627 judges "second level manual input is performed" (Step S480). In the case that "the absolute value |dθb| is less than the threshold θthB" (Step S440), and "the absolute value |dθa| is equal to or more than the threshold θthA1 and is less than the threshold θthA2" (Step S490), the judgment processing section 627 judges "first level manual input is performed" (Step S500). In the case that "the absolute value |dθb| is less than the threshold θthB" (Step S440), and "the absolute value |dθa| is less than the threshold θthA1" (Step S490), the judgment processing section 627 judges "manual input is not performed" (Step S510). The judgment result is outputted to the steering state judging section 624 as the manual input judgment signal Jh2. The order of the operation of the judging section 523A and the operation of the judging section 623A may be reversed, or the operations may be performed in parallel.

The steering state judging section 624 confirms whether the switch signal SW is inputted or not (Step S290). In the case of inputting the switch signal SW, the steering state judging section 624 updates the value of the held switch signal SW (Step S300). The inputted manual input judgment signals Jh1 and Jh2 are set as the judgment signals α and β, respectively. Using the judgment signals α and β, the previous steering state and the switch signal SW, the judgment of the steering state is performed in accordance with the condition judgments of the table 2 to the table 4 (Step S310A). The operations (from Step S320 to Step S350) after that are the same as the second embodiment.

A fourth embodiment of the present invention will be described.

In the fourth embodiment, an aspect for changing the steering angle command gradual-change gain Gfa4 is partially different from those of other gradual-change gains. The limit value that is used at the variable rate limiting section in the steering angle control section is not set depending on the steering state judgment signal Js, but is set depending on the steering angle command gradual-change gain Gfa4. In the present embodiment, the above changes are applied to the third embodiment.

Figure 40:
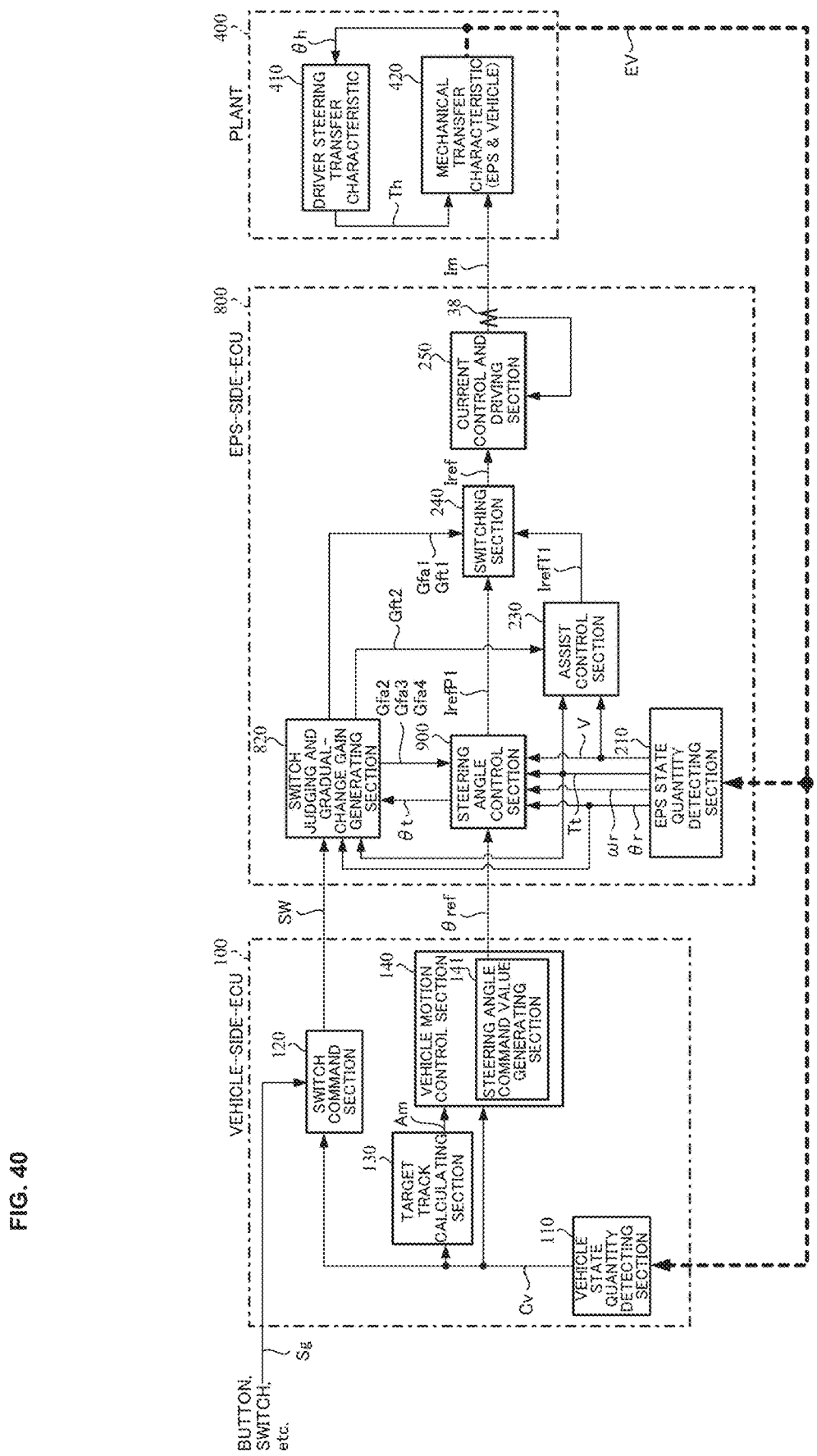
FIG. 40 is a block diagram showing a configuration example (a fourth embodiment) of a whole vehicle system relating to the present invention.

FIG. 40 shows the configuration example of the whole vehicle system in the fourth embodiment. Compared with the configuration example of the third embodiment shown in FIG. 35, the switch judging and gradual-change gain generating section and the steering angle control section of the fourth embodiment are different from those of the third embodiment. The steering state judging signal Js is not outputted from a switch judging and gradual-change gain generating section 820 to a steering angle control section 900.

As with the third embodiment, in the switch judging and gradual-change gain generating section 820, the gradual-change gain generating section judges the steering state by the steering state judgment signal Js, and the gradual-change gains are set to different values depending on the steering state. The judgment of the steering state is partially different from that of the third embodiment. That is, values of the gradual-change gains are set by judging "first automatic steering" as the automatic steering state, however, the value of the steering angle command gradual-change gain Gfa4 is set by judging "second automatic steering" as the manual steering state, and the values of other gradual-change gains are set to the previous values in the "second automatic steering". "Manual steering" is judged as the manual steering state. Since the steering state is judged by the above manner, the change timing of the steering angle command gradual-change gain Gfa4 shown in FIG. 6A is different from those of other gradual-change gains. That is, in the case of transferring from the automatic steering state to the manual steering state, at the time point t1, the gradual-change gains Gfa1 to Gfa3 begin to decrease when the steering state judgment signal Js is changed to the "manual steering", and the gradual-change gain Gfa4 begins to decrease when the steering state judgment signal Js is changed to the "manual steering" or the "second automatic steering". In the case of transferring from the manual steering state to the automatic steering state, the gradual-change gain Gfa4, as well as the gradual-change gains Gfa1 to Gfa3, begins to increase when the steering state judgment signal Js is changed to the "first automatic steering". In the switching state, when the steering state judgment signal Js is changed to the "manual steering" or the "first automatic steering", the operation of the gradual-change gain Gfa4 is the same as those of the gradual-change gains Gfa1 to Gfa3. However, when the steering state judgment signal Js is changed to the "second automatic steering", the gradual-change gains Gfa1 to Gfa3 are not changed and the gradual-change gain Gfa4 decreases.

Figure 41:
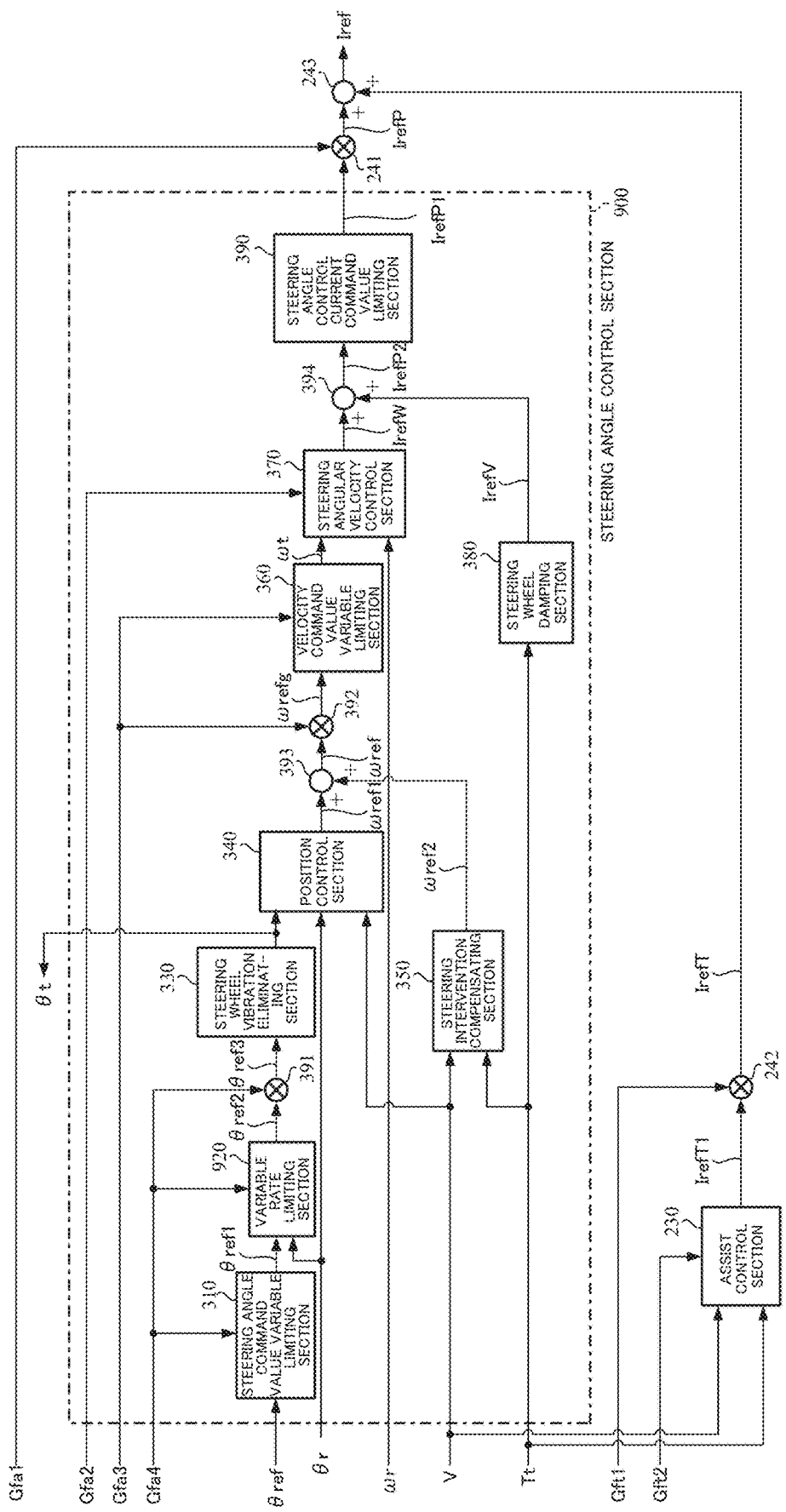
FIG. 41 is a block diagram showing a configuration example (the fourth embodiment) of a steering angle control section and a switching section.

FIG. 41 shows the configuration example of the steering angle control section 900. Not the steering state judgment signal Js but the steering angle command gradual-change gain Gfa4 is inputted into a variable rate limiting section 920 in the steering angle control section 900.

The variable rate limiting section 920 defines a difference between the previous and the present steering angle command values θref1 as the change amount. In the case that the absolute value of the change amount is larger than a predetermined value (a limit value), the variable rate limiting section 920 performs addition or subtraction to the steering angle command value θref1 so that the absolute value of the change amount becomes the limit value, and outputs the result as the steering angle command value θref2. In the case that the absolute value of the change amount is smaller than or equal to the limit value, the variable rate limiting section 920 outputs the steering angle command value θref1 as the steering angle command value θref2 without changing it. In order that the appropriate limit value is set in the automatic steering state and the manual steering state, the limit value is set depending on the steering angle command gradual-change gain Gfa4. The steering state is judged by the steering angle command gradual-change gain Gfa4. In the automatic steering state, the limit value is set to a predetermined value. In the manual steering state, the limit value is set to zero, so that the steering angle command value θref2 is not changed and becomes constant. In the switching state, the limit value is set to zero when the steering angle command gradual-change gain Gfa4 is decreased, and the limit value is set to the predetermined value when the steering angle command gradual-change gain Gfa4 is increased. Moreover, it is possible to limit the change amount by setting an upper limit value and a lower limit value instead of setting the limit value for the absolute value of the change amount in the automatic steering state.

Here, the judgment of the steering state in the switch judging and gradual-change gain generating section 820, and an effect of the setting of the limit value in the variable rate limiting section 920, the setting performed depending on the steering angle command gradual-change gain Gfa4 which is determined based on the above judgment result, will be described with reference to an example. It is assumed that the judgment of the judging section 523A in the manual input judging section 623 is the same as that of the judging section 623A in the manual input judging section 623.

Figure 42:
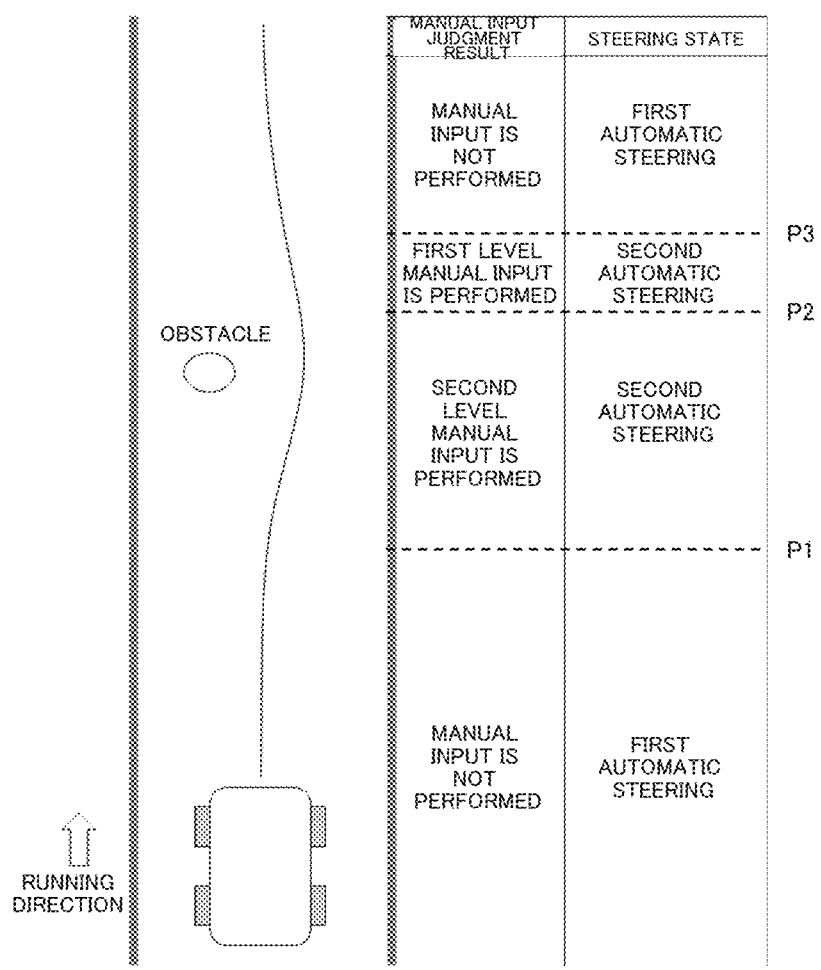
FIG. 42 is an image diagram showing an example of changing behaviors of a manual input judging result and a steering state when steering intervention is performed by a driver.

FIG. 42 shows the manual input judgement result and the change behavior of the steering state in the case that the steering intervention by a driver occurs in order to avoid an obstacle such as an object, a puddle and an ice on a road in automatic driving.

In the case that the steering intervention by which the vehicle slightly avoids the obstacle to the right, and the manual input is smaller than the level where the judgment result is that "third level manual input is performed", the steering state is not transited to the "manual steering" and the steering angle control is continued. Therefore, because the vehicle-side ECU 100 updates the steering angle command value so as to steer a steering wheel to the left for returning the vehicle, which pulls to the right by the steering intervention of the driver, to the center, the conflict occurs between the steering intervention by the driver who desires the vehicle to pull to the right and the steering by the steering angle command value from the vehicle-side ECU 100 which keeps the vehicle running in the center. From a viewpoint of prioritizing safety, in order to prioritize the steering intervention by the driver, the manual input judgment is changed to "second level manual input is performed" at the point P1, the steering state becomes the state of the "second automatic steering", the limit value of the variable rate limiting section 920 is set to zero through the steering angle command gradual-change gain Gfa4, and the steering angle command value is set to a constant value. This enables smooth steering intervention without an influence by update of the steering angle command value.

After avoiding the obstacle, the steering intervention of the driver is weakened. Even when the manual input judgment is changed to "first level manual input is performed" at the point P2, the steering state is still the "second automatic steering". When the steering intervention of the driver is further weakened and the manual input judgment is changed to "manual input is not performed" at the point P3, the steering state is transited to the "first automatic steering". Accordingly, chattering caused by switching between the "first automatic steering" and the "second automatic steering", or the like can be prevented by changing once the manual input judgment to "first level manual input is performed". After transiting to the "first automatic steering", the steering angle command value is changed to the normal value, and the vehicle is returned to the automatic driving.

Even when the steering intervention by the driver is performed in order to avoid the obstacle, the steering state is not transited to the "manual steering", and seamless steering can be realized.

Compared with the operating example of the third embodiment, in an operating example of the fourth embodiment, operations of the gradual-change gain section and the variable rate limiting section are different.

Figure 43:
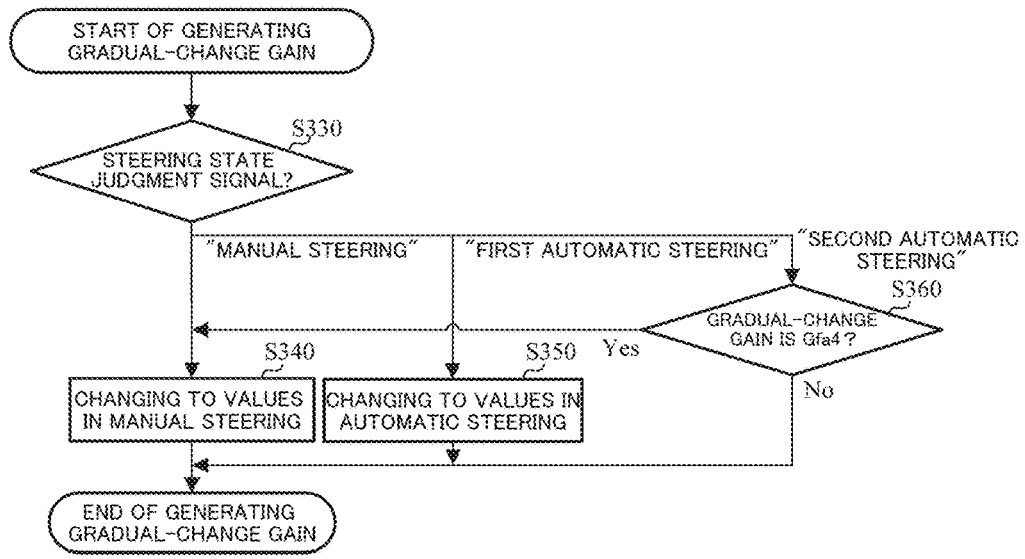
FIG. 43 is a flowchart showing an operating example (the fourth embodiment) of a gradual-change gain generating section.

An operating example of the gradual-change gain generation in the gradual-change generating section of the fourth embodiment will be described with reference to the flowchart of FIG. 43.

The gradual-change generating section confirms the value of the steering state judgment signal Js (Step S330). When the steering state judgment signal Js is the "manual steering", the gradual-change gain generating section changes the respective gradual-change gains (Gfa1 to Gfa4, Gft1 and Gft2) to the values in the manual steering state (0% for Gfa1 to Gfa4, and 100% for Gft1 and Gft2) (Step S340). When the steering state judgment signal Js is the "first automatic steering", the gradual-change gain generating section changes the respective gradual-change gains to the values in the automatic steering state (100% for Gfa1 to Gfa4, αt1 for Gft1, and αt2 for Gft2) (Step S350). When the steering state judgment signal Js is the "second automatic steering", the gradual-change gain generating sect ion performs the same operation as in the "manual steering" (Step S340) if the gradual-change gain is the steering angle command gradual-change gain Gfa4 (Step S360), and the respective gradual-change gains are not changed if the gradual-change gain is other than the steering angle command gradual-change gain Gfa4 (Step S360).

Figure 44:
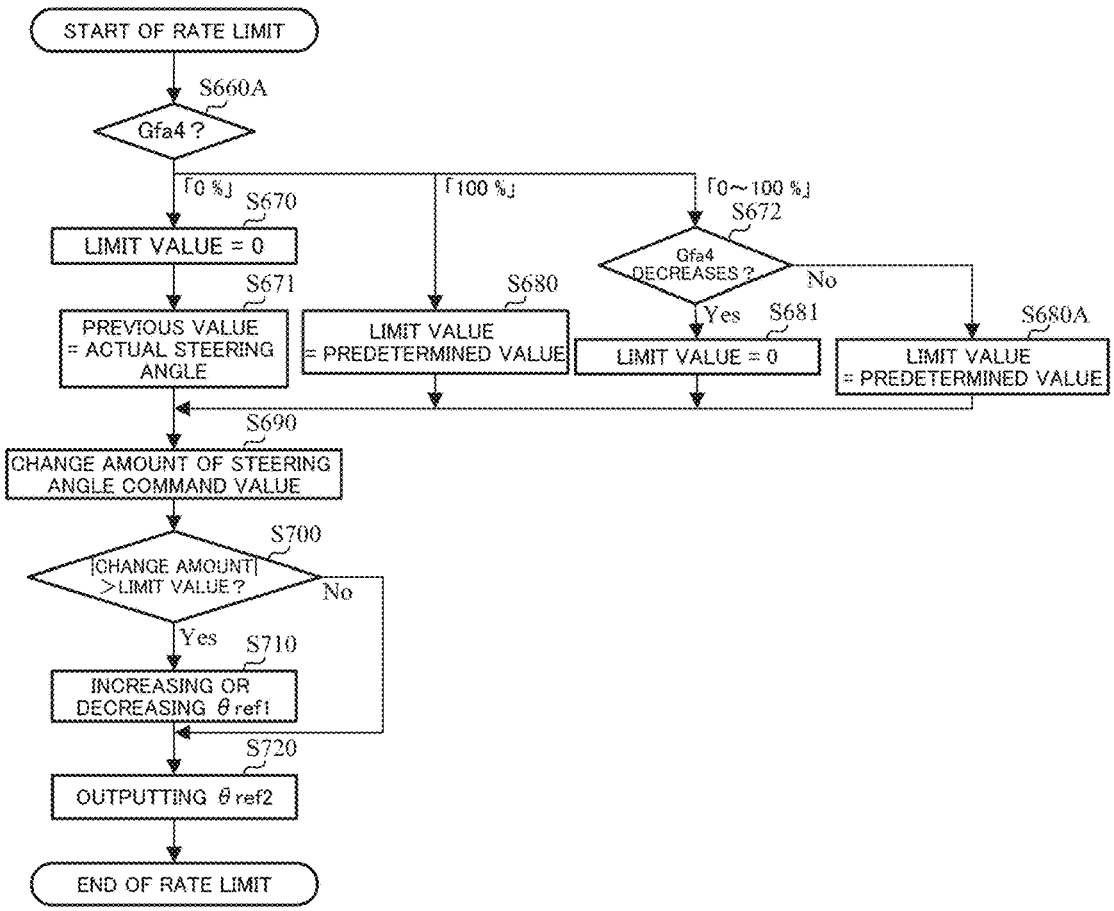
FIG. 44 is a flowchart showing an operating example (the fourth embodiment) of a variable rate limiting section.

An operating example of the rate limit in the variable rate limiting section 920 of the fourth embodiment will be described with reference to the flowchart of FIG. 44.

The variable rate limiting section 920 confirms the value of the steering angle command gradual-change gain Gfa4 (Step S660A). In the case that the Gfa4 is 0%, the limit value is set to zero (Step S670), and the value of the stored previous steering angle command value θref1 is set to the value of the actual steering angle θr (Step S671). In the case that the Gfa4 is 100%, the limit value is set to the predetermined value (Step S680). In the case that the Gfa4 is between 0% and 100%, when the present Gfa4 decreases from the previous Gfa4 (Step S672), the limit value is set to zero (Step S681), and otherwise (Step S672), the limit value is set to the predetermined value (Step S680A). The difference (the change amount) between the present steering angle command value θref1 and the previous steering angle command value θref1 is calculated (Step S690). When the absolute value of the change amount is larger than the limit value (Step S700), the variable rate limiting section 920 increases or decreases the steering angle command value θref1 so that the absolute value of the change amount becomes the limit value (Step S710), and outputs the result as the steering angle command value θref2 (Step S720). When the absolute value of the change amount is smaller than or equal to the limit value (Step S700), the variable rate limiting section 920 outputs the steering angle command value θref1 as the steering angle command value θref2 (Step S720).

Other embodiments of the present invention will be described.

Although the multiplication of the velocity control gradual-change gain Gfa2 at the steering angular velocity control section 370 is performed to the control amount Ir1 outputted from the integrating section 373 in the first embodiment, it can be performed to the steering angle control current command value IrefW outputted from the subtracting section 375.

Figure 45:
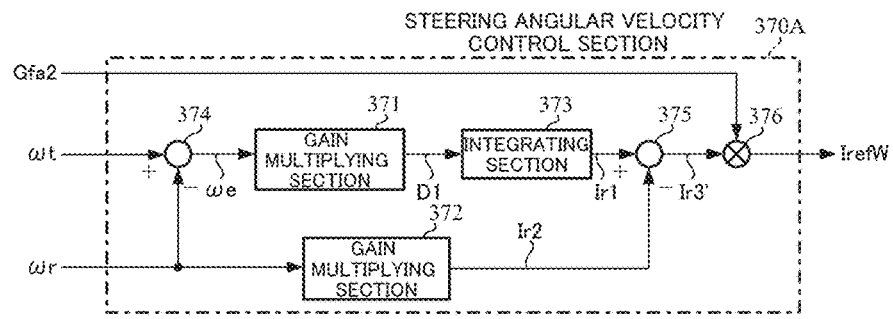
FIG. 45 is a block diagram showing a configuration example (a fifth embodiment) of a steering angular velocity control section.

FIG. 45 shows a configuration example (a fifth embodiment) of the steering angular velocity control section in the case of multiplying the steering angle control current command value IrefW by the velocity control gradual-change gain Gfa2. Compared with the steering angular velocity control section 370 in the first embodiment shown in FIG. 15, in a steering angular velocity control section 370A of the fifth embodiment, the multiplying section 376 is provided not behind the integrating section 373 but behind the subtracting section 375, and the other configurations are the same.

Figure 21:
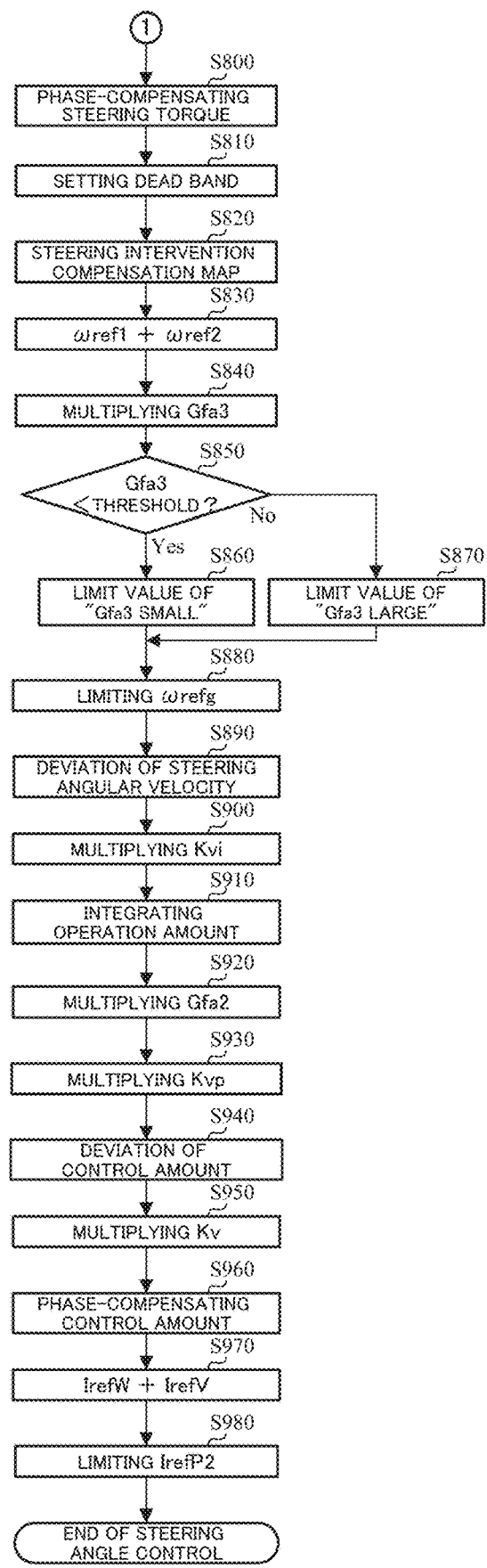
FIG. 21 is a flowchart showing a part of the operating example (the first embodiment) of the steering angle control section.

An operating example of the steering angular velocity control section 370A in the fifth embodiment performs the same operations as the operating example of the first embodiment shown in FIG. 21 until the step S910 where the integrating section 373 integrates the operation amount D1 and calculates the control amount Ir1, after that, the control amount Ir1 is inputted into the subtracting section 375, and a control amount Ir3' is calculated as a deviation (Ir1−Ir2) between the control amounts Ir1 and Ir2 at the subtracting section 375. The multiplying section 376 multiplies the control amount Ir3' by the velocity control gradual-change gain Gfa2, and outputs the multiplied result as the steering angle control current command value IrefW to the adding section 394. The operations (from Step 950) after that are the same as the first embodiment.

It is possible to perform the multiplication of the velocity control gradual-change gain Gfa2 at another position in the steering angular velocity control section 370.

Figure 46:
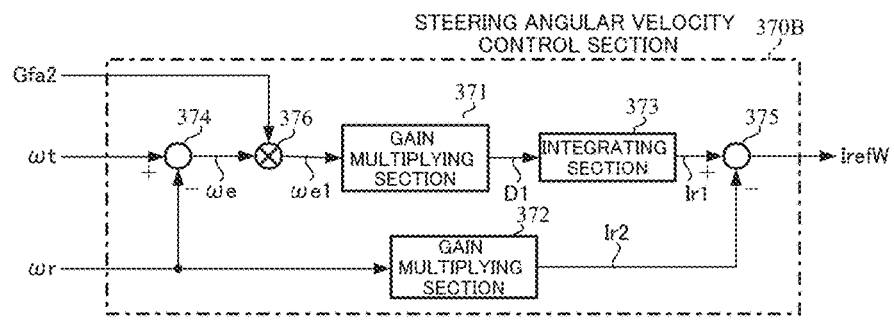
FIG. 46 is a block diagram showing a configuration example (a sixth embodiment) of a steering angular velocity control section.

A configuration example (a sixth embodiment) of a steering angular velocity control section shown in FIG. 46 multiplies the deviation ωe outputted from the subtracting section 374 by the velocity control gradual-change gain Gfa2. Compared with the steering angular velocity control section 370 in the first embodiment shown in FIG. 15, in a steering angular velocity control section 370B of the sixth embodiment, the multiplying section 376 is provided not behind the integrating section 373 but behind the subtracting section 374, and the other configurations are the same.

An operating example of the steering angular velocity control section 370B in the sixth embodiment performs the same operations as the operating example of the first embodiment shown in FIG. 21 until the step S890 where the subtracting section 374 calculates the deviation ωe between the target steering angular velocity ωt and the actual steering angular velocity ωr, and the deviation ωe is inputted into not the gain multiplying section 371 but the multiplying section 376. The multiplying section 376 multiplies the deviation ωe by the velocity control gradual-change gain Gfa2, and outputs the multiplied result as a deviation ωet to the gain multiplying section 371. The operations after that are the same as the first embodiment except to remove the step S920.

Figure 47:
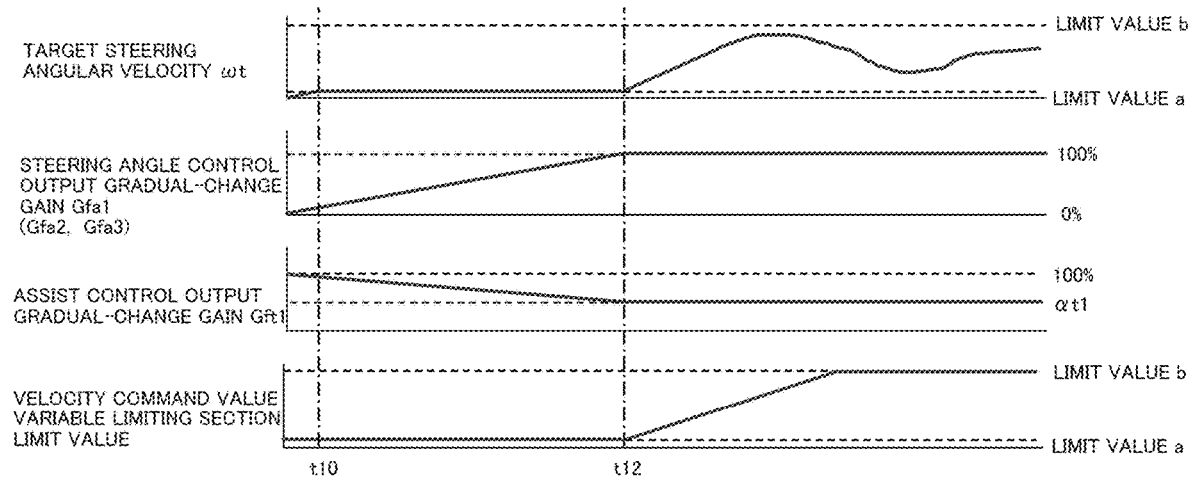
FIG. 47 is a graph showing an example (a seventh embodiment) of changing a target steering angular velocity, gradual-change gains and a limit value in the case of transferring a steering state.

In the above embodiments (the first to the sixth embodiments), the velocity command value variable limiting section 360 sets the limit values depending on the velocity command gradual-change gain Gfa3, and switches the limit values when the Gfa3 becomes the predetermined threshold. However, a velocity command value variable limiting section may use the steering angle control output gradual-change gain Gfa1 instead of the Gfa3, and may switch the limit values when the Gfa1 becomes 100%. In a configuration (a seventh embodiment) of this case, the Gfa1 is inputted into the velocity command value variable limiting section instead of the Gfa3, and the other configurations are the same as the other embodiments. In an operation of the seventh embodiment, a judgment operation of determining limit values at the velocity command value variable limiting section (the step S850 shown in FIG. 21) is changed to a confirmation of whether or not the Gfa1 is smaller than 100%. In the seventh embodiment, time changes of the target steering angular velocity ωt, the gradual-change gains and the limit value of the velocity command value variable limiting section in the case of transferring from the manual steering state to the automatic steering state, become as shown in FIG. 47. Compared with the time changes shown in FIG. 32, the limit value of the velocity command value variable limiting section gradually increases from the time point t12 where the Gfa1 becomes 100%, and the target steering angular velocity ωt also increases correspondingly.

Moreover, with respect to the multiplications of the respective gradual-change gains (Gfa1 to Gfa4, Gft1 and Gft2) in the above embodiments (the first to the seventh embodiments), in such a case of focusing on a cost more than the effect by the multiplication of the gradual-change gain, it is possible to leave at least one multiplication and omit other multiplications. Further, the respective limiting sections (the steering angle command value variable limiting section, the variable rate limiting section, the velocity command value variable limiting section and the steering angle control current command value limiting section) are also possible to omit in the same case or the like. When the steering angle command value variable limiting section 310, the variable rate limiting section 320 (or 920) and the multiplying section 391, in addition, the steering wheel vibration eliminating section 330 are omitted, the steering angle command value θref is inputted into the position control section 340 as the target steering angle θt. When the multiplying section 392 and the velocity command value variable limiting section 360 are omitted, the steering angular velocity command value ωref is inputted into the steering angular velocity control section 370 as the target steering angular velocity ωt.

EXPLANATION OF REFERENCE NUMERALS 1 steering wheel
2 column shaft (steering shaft, handle shaft)
10 torque sensor
12 vehicle speed sensor
13 battery
20 motor
21 rotational angle sensor
30 control unit (ECU)
31 current command value calculating section
33 current limiting section
34 compensation signal generating section
35 PI-control section
36 PWM-control section
37 inverter
38 motor current detector
100 vehicle-side-ECU
110 vehicle state quantity detecting section
120 switch command section
130 target track calculating section
140 vehicle motion control section
141 steering angle command value generating section
200, 600, 800 EPS-side-ECU
210 EPS state quantity detecting section
220, 620, 820 switch judging and gradual-change gain generating section
221, 621 switch judging section
222 gradual-change gain generating section
223, 523, 623 manual input judging section
224, 624 steering state judging section
225, 525A, 525B, 625A, 625B smoothing filter section
226, 526A, 526B, 626A, 626B absolute value processing section
227, 527, 627 judgment processing section
230 assist control section
240 switching section
250 current control and driving section
300, 700, 900 steering angle control section
310 steering angle command value variable limiting section
320, 920 variable rate limiting section
330 steering wheel vibration eliminating section
340 position control section
341 reference model section
342 proportional gain section
343 filter section
350 steering intervention compensating section
351 steering intervention phase compensating section
352 dead band setting section
353 compensation map section
360 velocity command value variable limiting section
370, 370A, 370B, 470, 570 steering angular velocity control section
371, 372 gain multiplying section
373 integrating section
380 steering wheel damping section
381 gain section
382 damping phase compensating section
390 steering angle control current command value limiting section
400 plant
523A, 623A judging section
628 steering angle control model section

The invention claimed is:

1. An electric power steering apparatus that drives a motor based on a current command value, and performs assist control and steering angle control to a steering system by driving and controlling said motor, the electric power steering apparatus comprising:
at least one hardware processor configured to implement:
calculating a steering angle control current command value for said steering angle control based on at least a steering angle command value and an actual steering angle;
judging a steering state based on manual input judgment and performs switching of said steering state;
performing said manual input judgment by using a threshold to a steering torque or by using an error threshold to an error between an estimated steering angle, which is estimated based on said steering angle command value, and said actual steering angle;
calculating a steering angular velocity command value based on said steering angle command value and said actual steering angle;
calculating said steering angle control current command value based on said steering angular velocity command value and an actual steering angular velocity;
obtaining a compensatory steering angular velocity command value for steering intervention compensation depending on said steering torque;
compensating said steering angular velocity command value by using said compensatory steering angular velocity command value;
transforming said steering angle command value into a target steering angle by using a reference model;
calculating a first steering angular velocity command value by multiplying a deviation between said target steering angle and said actual steering angle by a proportional gain;
transforming said steering angle command value into a second steering angular velocity command value by using a feedforward (FF) filter;
calculating said steering angular velocity command value by adding said second steering angular velocity command value to said first steering angular velocity command value;

obtaining said compensatory steering angular velocity command value according to said steering torque based on a steering intervention compensation map, wherein said steering intervention compensation map defines a characteristic of said compensatory steering angular velocity command value corresponding to said steering torque;

calculating said current command value by using at least said steering angle control current command value; and controlling performance of the assist control and the steering angle control to the steering system by controlling driving of said motor.

2. The electric power steering apparatus according to claim 1, wherein the at least one hardware processor is further configured to implement performing said manual input judgment by using said threshold to said steering torque that is smoothed by a smoothing filter.

3. The electric power steering apparatus according to claim 2,
wherein the at least one hardware processor is further configured to implement applying a plurality of said thresholds to said steering torque and outputting a plurality of judgment results as a judgment result indicating that manual input is performed.

4. The electric power steering apparatus according to claim 3,
wherein the at least one hardware processor is further configured to implement:
judging said steering state based on a switch signal for switching an operation mode to an assist control mode or a steering angle control mode, and a judgment result of said manual input judgment; and
generating a gradual-change gain that adjusts a control amount of said assist control and a control amount of said steering angle control, depending on said steering state.

5. The electric power steering apparatus according to claim 4,
wherein the at least one hardware processor is further configured to implement judging that said steering state is manual steering in a case that said switch signal is said assist control mode, or in a case that a previous steering state is first automatic steering or second automatic steering and said judgment result is that third level manual input is performed.

6. The electric power steering apparatus according to claim 5,
wherein the at least one hardware processor is further configured to implement judging that said steering state is said first automatic steering in a case that said previous steering state is said manual steering or said second automatic steering, said switch signal is said steering angle control mode, and said judgment result is that manual input is not performed.

7. The electric power steering apparatus according to claim 6,
wherein the at least one hardware processor is further configured to implement setting said gradual-change gain to a predetermined first gain value in said first automatic steering, setting said gradual-change gain to a predetermined second gain value in said manual steering, changing said gradual-change gain to said first gain value in a case that said steering state changes to said first automatic steering, and changing said gradual-change gain to said second gain value in a case that said steering state changes to said manual steering.

8. The electric power steering apparatus according to claim 5,
wherein the at least one hardware processor is further configured to implement setting said gradual-change gain to a predetermined first gain value in said first automatic steering, setting said gradual-change gain to a predetermined second gain value in said manual steering, changing said gradual-change gain to said first gain value in a case that said steering state changes to said first automatic steering, and changing said gradual-change gain to said second gain value in a case that said steering state changes to said manual steering.

9. The electric power steering apparatus according to claim 5,
wherein the at least one hardware processor is further configured to implement limiting a change amount of said steering angle command value by a limit value that is set depending on said steering state.

10. The electric power steering apparatus according to claim 9,
wherein the at least one hardware processor is further configured to implement changing said limit value to zero in a case that said steering state changes from said first automatic steering to said second automatic steering or said manual steering.

11. The electric power steering apparatus according to claim 9,
wherein the at least one hardware processor is further configured to implement changing said limit value to a predetermined value in a case that said steering state changes from a state other than said first automatic steering to said first automatic steering.

12. The electric power steering apparatus according to claim 1,
wherein the at least one hardware processor is further configured to receive values from a plurality of smoothing filters that have a different characteristic, calculating a plurality of smoothed steering torques by smoothing said steering torque using said smoothing filters respectively, and performing said manual input judgment by using said threshold to said smoothed steering torques, and
wherein the electric power steering apparatus comprises the smoothing filters.

13. The electric power steering apparatus according to claim 12,
wherein the at least one hardware processor is further configured to implement applying a plurality of said thresholds to at least one of said smoothed steering torques and outputting a plurality of judgment results as a judgment result indicating that manual input is performed.

14. The electric power steering apparatus according to claim 1,
wherein said steering intervention compensation map has a characteristic where said compensatory steering angular velocity command value increases when said steering torque increases.

15. The electric power steering apparatus according to claim 1,
wherein said steering intervention compensation map has a characteristic where said compensatory steering angular velocity command value decreases when said vehicle speed increases.

16. The electric power steering apparatus according to claim 1, wherein the at least one hardware processor is further configured to implement:

phase compensation to said steering torque; and obtaining said compensatory steering angular velocity command value according to said steering torque.

17. The electric power steering apparatus according to claim 1, wherein a filter gain of said FF filter changes depending on a vehicle speed.

18. The electric power steering apparatus according to claim 1, wherein the at least one hardware processor is further configured to implement calculating said steering angle control current command value by a proportional preceding type PI (I-P) control by using said steering angular velocity command value and said actual steering angular velocity.

19. The electric power steering apparatus according to claim 1, wherein s the at least one hardware processor is further configured to implement:

calculating an assist control current command value for said assist control based on at least said steering torque; and calculating said current command value by said assist control current command value and said steering angle control current command value.

20. An electric power steering apparatus that drives a motor based on a current command value and performs assist control and steering angle control to a steering system by driving and controlling said motor, the electric power steering apparatus comprising:

at least one hardware processor configured to implement:

calculating a steering angle control current command value for said steering angle control based on at least a steering angle command value and an actual steering angle;

judging a steering state based on manual input judgment and performing switching of said steering state;

performing said manual input judgment by using an error threshold to an error between an estimated steering angle, which is estimated based on said steering angle command value, and said actual steering angle;

calculating a steering angular velocity command value based on said steering angle command value and said actual steering angle;

calculating said steering angle control current command value based on said steering angular velocity command value and an actual steering angular velocity;

obtaining a compensatory steering angular velocity command value for steering intervention compensation depending on a steering torque;

compensating said steering angular velocity command value by using said compensatory steering angular velocity command value;

transforming said steering angle command value into a target steering angle by using a reference model;

calculating a first steering angular velocity command value by multiplying a deviation between said target steering angle and said actual steering angle by a proportional gain;

transforming said steering angle command value into a second steering angular velocity command value by using a feedforward (FF) filter;

calculating said steering angular velocity command value by adding said second steering angular velocity command value to said first steering angular velocity command value;

obtaining said compensatory steering angular velocity command value according to said steering torque based on a steering intervention compensation map, wherein said steering intervention compensation map defines a characteristic of said compensatory steering angular velocity command value corresponding to said steering torque;

calculating said current command value by using at least said steering angle control current command value; and controlling performance of the assist control and the steering angle control to the steering system by controlling driving of said motor.

21. The electric power steering apparatus according to claim 20, wherein the at least one hardware processor is further configured to implement receiving values from a plurality of smoothing filters for an error that have a different characteristic, calculating a plurality of smoothed errors by smoothing said error using said smoothing filters for an error respectively, and performing said manual input judgment by using said error threshold to said smoothed errors, and wherein the electric power steering apparatus comprises the smoothing filters.

22. The electric power steering apparatus according to claim 21, wherein the at least one hardware processor is further configured to implement applying a plurality of said error thresholds to at least one of said smoothed errors and outputting a plurality of judgment results as a judgment result indicating that manual input is performed.

23. The electric power steering apparatus according to claim 20 wherein the at least one hardware processor is further configured to implement performing said manual input judgment by using a torque threshold to said steering torque.

24. The electric power steering apparatus according to claim 23, wherein the at least one hardware processor is further configured to implement receiving values from a plurality of smoothing filters for a torque that have a different characteristic, calculating a plurality of smoothed steering torques by smoothing said steering torque using said smoothing filters for a torque respectively, and performing said manual input judgment by using said torque threshold to said smoothed steering torques, and wherein the electric power steering apparatus comprises the smoothing filters.

25. The electric power steering apparatus according to claim 24, wherein the at least one hardware processor is further configured to implement applying a plurality of said torque thresholds to at least one of said smoothed steering torques, and outputting a plurality of judgment results as a judgment result indicating that manual input is performed.

26. The electric power steering apparatus according to claim 25, wherein the at least one hardware processor is further configured to implement:
judging said steering state based on a switch signal for switching an operation mode to an assist control mode or a steering angle control mode, a first judgment result, and a second judgment result, and
generating a gradual-change gain that adjusts a control amount of said assist control and a control amount of said steering angle control, depending on said steering state.

27. The electric power steering apparatus according to claim 26,
wherein the at least one hardware processor is further configured to implement judging that said steering state is manual steering in a case that said switch signal is said assist control mode, or in a case that a previous steering state is first automatic steering or second automatic steering, and said first judgment result or said second judgment result is that third level manual input is performed.

28. The electric power steering apparatus according to claim 27,
wherein the at least one hardware processor is further configured to implement judging that said steering state is said first automatic steering in a case that said previous steering state is said manual steering or said second automatic steering, said switch signal is said steering angle control mode, and said first judgment result and said second judgment result are that manual input is not performed.

29. The electric power steering apparatus according to claim 28,
wherein setting said gradual-change gain to a predetermined first gain value in said first automatic steering, setting said gradual-change gain to a predetermined second gain value in said manual steering, changing said gradual-change gain to said first gain value in a case that said steering state changes to said first automatic steering, and changing said gradual-change gain to said second gain value in a case that said steering state changes to said manual steering.

30. The electric power steering apparatus according to claim 27,
wherein the at least one hardware processor is further configured to implement setting said gradual-change gain to a predetermined first gain value in said first automatic steering, setting said gradual-change gain to a predetermined second gain value in said manual steering, changing said gradual-change gain to said first gain value in a case that said steering state changes to said first automatic steering, and changing said gradual-change gain to said second gain value in a case that said steering state changes to said manual steering.

31. The electric power steering apparatus according to claim 30,
wherein the at least one hardware processor is further configured to implement:
generating a steering angle command gradual-change gain by which said steering angle command value is multiplied, and
changing said steering angle command gradual-change gain to said second gain value in a case that said steering state is changed to said second automatic steering.

32. The electric power steering apparatus according to claim 27,
wherein the at least one hardware processor is further configured to implement limiting a change amount of said steering angle command value by a limit value that is set depending on said steering state.

33. The electric power steering apparatus according to claim 32,
wherein the at least one hardware processor is further configured to implement changing said limit value to zero in a case that said steering state changes from said first automatic steering to said second automatic steering or said manual steering.

34. The electric power steering apparatus according to claim 32,
wherein the at least one hardware processor is further configured to implement changing said limit value to a predetermined value in a case that said steering state changes from a state other than said first automatic steering to said first automatic steering.

35. The electric power steering apparatus according to claim 20,
wherein said steering intervention compensation map has a characteristic where said compensatory steering angular velocity command value increases when said steering torque increases.

36. The electric power steering apparatus according to claim 20,
wherein said steering intervention compensation map has a characteristic where said compensatory steering angular velocity command value decreases when said vehicle speed increases.

37. The electric power steering apparatus according to claim 20,
wherein the at least one hardware processor is further configured to implement:
phase compensation to said steering torque; and
obtaining said compensatory steering angular velocity command value according to said steering torque.

38. The electric power steering apparatus according to claim 20, wherein a filter gain of said FF filter changes depending on a vehicle speed.

39. The electric power steering apparatus according to claim 20,
wherein the at least one hardware processor is further configured to implement calculating said steering angle control current command value by a proportional preceding type PI (I-P) control by using said steering angular velocity command value and said actual steering angular velocity.

40. The electric power steering apparatus according to claim 20,
wherein the at least one hardware processor is further configured to implement:
calculating an assist control current command value for said assist control based on at least said steering torque; and
calculating said current command value by said assist control current command value and said steering angle control current command value.

* * * * *